(12) United States Patent
Tsai et al.

(10) Patent No.: US 10,582,418 B2
(45) Date of Patent: Mar. 3, 2020

(54) METHOD AND APPARATUS OF TRANSMITTING DATA DUPLICATION IN A WIRELESS COMMUNICATION SYSTEM

(71) Applicant: ASUSTek Computer Inc., Taipei (TW)

(72) Inventors: Hsin-Hsi Tsai, Taipei (TW); Li-Te Pan, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/969,707

(22) Filed: May 2, 2018

(65) Prior Publication Data

US 2018/0324641 A1  Nov. 8, 2018

Related U.S. Application Data

(60) Provisional application No. 62/502,430, filed on May 5, 2017.

(51) Int. Cl.
*H04W 28/06* (2009.01)
*H04L 29/08* (2006.01)
(Continued)

(52) U.S. Cl.
CPC ......... *H04W 28/065* (2013.01); *H04L 69/321* (2013.01); *H04L 69/322* (2013.01);
(Continued)

(58) Field of Classification Search
CPC .. H04L 69/321; H04L 69/322; H04W 28/065; H04W 36/0069; H04W 36/026; H04W 72/04; H04W 80/02
See application file for complete search history.

(56) References Cited

U.S. PATENT DOCUMENTS 6,904,016 B2 * 6/2005 Kuo .................. H04L 29/06
370/235
7,539,220 B2 * 5/2009 Jiang .................. H04L 47/14
370/522

(Continued)

FOREIGN PATENT DOCUMENTS

CN 109391639 A * 2/2019
GB 2449629 A * 12/2008 ............ H04W 36/02

(Continued)

OTHER PUBLICATIONS

Ericsson, Data duplication in lower layers (HARQ), Feb. 17, 2017, 3GPP TSG-RAN WG2 #97, Tdoc R2-1700833 (Year: 2017).*

(Continued)

*Primary Examiner* — Eric Nowlin
(74) *Attorney, Agent, or Firm* — Blue Capital Law Firm, P.C.

(57) ABSTRACT

Methods and apparatuses for transmitting data duplication in a wireless communication system are disclosed herein. In one method for a user equipment (UE) configured with data duplication. The UE duplicates a data unit into a first data unit and a second data unit. The UE constructs a second Radio Link Control (RLC) Packet Data Unit (PDU) used for transmitting the second data unit. The second data unit is a second RLC Service Data Unit (SDU). The UE receives a control command from a network node. The control command is used to deactivate the data duplication. The UE discards the second RLC PDU if the second RLC PDU includes the second RLC SDU.

20 Claims, 24 Drawing Sheets

(51) Int. Cl.
  *H04W 36/00* (2009.01)
  *H04W 72/04* (2009.01)
  *H04W 36/02* (2009.01)
  *H04W 80/02* (2009.01)

(52) U.S. Cl.
  CPC ....... *H04W 36/0069* (2018.08); *H04W 72/04* (2013.01); *H04W 36/026* (2013.01); *H04W 80/02* (2013.01)

(56) References Cited

U.S. PATENT DOCUMENTS

| | | | |
|---|---|---|---|
| 9,433,028 | B2 | 8/2016 | Terry |
| 10,004,098 | B2 * | 6/2018 | Kim ................ H04L 47/34 |
| 2005/0201353 | A1 * | 9/2005 | Lee ................ H04L 1/0018 370/349 |
| 2008/0170522 | A1 * | 7/2008 | Sammour ............ H04L 1/1812 370/310 |
| 2009/0016301 | A1 | 1/2009 | Sammour |
| 2009/0104890 | A1 * | 4/2009 | Wang ................ H04W 12/02 455/410 |
| 2009/0116490 | A1 * | 5/2009 | Charpentier ......... H04L 1/1841 370/395.1 |
| 2009/0290598 | A1 * | 11/2009 | Pani ................ H04L 1/0007 370/473 |
| 2010/0118781 | A1 * | 5/2010 | Petrovic ............ H04L 1/1887 370/328 |
| 2010/0195617 | A1 * | 8/2010 | Park ................ H04W 36/02 370/331 |
| 2011/0032877 | A1 * | 2/2011 | Pani ................ H04L 1/0007 370/328 |
| 2015/0023370 | A1 | 1/2015 | Sammour et al. |
| 2016/0183158 | A1 * | 6/2016 | Decarreau ........... H04W 36/02 370/328 |
| 2016/0323851 | A1 | 11/2016 | Kim et al. |
| 2018/0132220 | A1 * | 5/2018 | Jang ................ H04W 76/14 |
| 2018/0279168 | A1 * | 9/2018 | Jheng ............... H04W 76/20 |
| 2018/0309660 | A1 * | 10/2018 | Loehr ............... H04W 36/0066 |
| 2018/0324642 | A1 * | 11/2018 | Yu .................. H04W 76/15 |
| 2018/0367288 | A1 * | 12/2018 | Vrzic ............... H04L 12/403 |
| 2018/0367463 | A1 * | 12/2018 | Jose ................ H04L 47/32 |
| 2019/0053326 | A1 * | 2/2019 | Lee ................. H04W 4/70 |
| 2019/0098682 | A1 * | 3/2019 | Park ................ H04L 5/001 |
| 2019/0150217 | A1 * | 5/2019 | Kim ................. H04W 76/19 |

FOREIGN PATENT DOCUMENTS

| | | | | |
|---|---|---|---|---|
| KR | 20150090806 | | 8/2015 | |
| WO | WO-2017211417 | A1 * | 12/2017 | .......... H04W 28/065 |
| WO | WO-2018230849 | A1 * | 12/2018 | ............ H04W 28/02 |
| WO | WO-2019019150 | A1 * | 1/2019 | |
| WO | WO-2019024792 | A1 * | 2/2019 | |

OTHER PUBLICATIONS

LG Electronics Inc., Packet duplication in NR, Jan. 19, 2017, 3GPP, 3GPP TSG-RAN WG2 NR Ad Hoc, Tdoc: R2-1700423 (Year: 2017).*
Ericsson, Data duplication and link selection for URLLC in NR, Jan. 19, 2017, 3GPP, 3GPP TSG-RAN WG2 #AH, Tdoc: Tdoc R2-1700428 (Year: 2017).*
Samsung, Efficiency of Packet Duplication for NR, Jan. 19, 2017, 3GPP, 3GPP TSG-RAN WG2 NR Ad Hoc, Tdoc: R2-1700611 (Year: 2017).*
Ericsson, Further aspects of data duplication in PDCP layer, Feb. 17, 2017, 3GPP, 3GPP TSG-RAN WG2 #97, Tdoc R2-1700834 (Year: 2017).*
InterDigital Communications, Packet Duplication at PDCP, Feb. 17, 2017, 3GPP, 3GPP TSG-RAN WG2 Meeting #97, Tdoc: R2-1701186 (Year: 2017).*
Ericsson, Data duplication in lower layers (HARQ), Feb. 17, 2017, 3GPP, 3GPP TSG-RAN WG2 #97, Tdoc: R2-1702032 (Year: 2017).*
Vivo, Duplication data in CA for URLLC, Apr. 7, 2017, 3GPP, 3GPP TSG-RAN WG2 Meeting #97bis, Tdoc: R2-1702516 (Year: 2017).*
Nokia et al., Overview of Duplication Operation, Apr. 7, 2017, 3GPP, 3GPP TSG-RAN WG2 Meeting #97bis, Tdoc: R2-1702632 (Year: 2017).*
Nokia et al., Duplication Impacts to MAC, Apr. 7, 2017, 3GPP, 3GPP TSG-RAN WG2 Meeting #97bis, Tdoc: R2-1702639 (Year: 2017).*
Nokia et al., Duplication Impacts to RLC, Apr. 7, 2017, 3GPP, 3GPP TSG-RAN WG2 Meeting #97bis, Tdoc: R2-1702640 (Year: 2017).*
Ericsson, Handling of PDCP duplication for SRB in LTE-NR interworking, Apr. 7, 2017, 3GPP, 3GPP TSG-RAN WG2 #97bis, Tdoc: R2-1702706 (Year: 2017).*
Ericsson, Duplication in UL in Dual connectivity, Apr. 7, 2017, 3GPP, 3GPP TSG-RAN WG2 #97bis, Tdoc: R2-1702750 (Year: 2017).*
Ericsson, Controlling of duplication in case of CA, Apr. 7, 2017, 3GPP, 3GPP TSG-RAN WG2 #97bis, Tdoc: Tdoc R2-1702753 (Year: 2017).*
NTT Docomo, Inc., Activation/deactivation for NR, Apr. 7, 2017, 3GPP, 3GPP TSG-RAN WG2 Meeting 97bis, Tdoc: R2-1703169 (Year: 2017).*
LG Electronics Inc., Configurability of packet duplication in PDCP, Apr. 7, 2017, 3GPP, 3GPP TSG-RAN WG2 #97bis, Tdoc: R2-1703509 (Year: 2017).*
MediaTek Inc., PDCP configuration for packet duplication, Apr. 7, 2017, 3GPP, 3GPP TSG-RAN WG2 Meeting 97bis, Tdoc: R2-1703527 (Year: 2017).*
MediaTek Inc., MAC modeling for PDCP duplication in CA, Apr. 7, 2017, 3GPP, 3GPP TSG-RAN WG2 Meeting 97bis, Tdoc: R2-1703528 (Year: 2017).*
Huawei et al., Activating and deactivating packet duplication, Apr. 7, 2017, 3GPP, 3GPP TSG-RAN2 #97bis, Tdoc: R2-1703529 (Year: 2017).*
Samsung, Packet Duplication Operations, Apr. 7, 2017, 3GPP, 3GPP TSG-RAN WG2 Meeting #97bis, Tdoc: R2-1703731 (Year: 2017).*
Huwawei et al., Dynamic activation/deactivation of packet duplication, May 19, 2017, 3GPP, 3GPP TSG-RAN2 #98, Tdoc: R2-1704835 (Year: 2017).*
NEC, Activation and Deactivation of UL PDCP duplication, May 19, 2017, 3GPP, 3GPP TSG-RAN WG2 #98, Tdoc: R2-1705266 (Year: 2017).*
ASUSTeK, Activation and Deactivation of UL PDCP duplication, May 19, 2017, 3GPP, 3GPP TSG-RAN WG2 Meeting #98, Tdoc: R2-1705416 (Year: 2017).*
3GPP TSG-RAN2 Meeting #101 R2-1802716 Athens,Greece, Feb. 26-Mar. 2, 2017.
Office Action from Taiwan intellectual Property Office in corresponding TW Application No. 107114953, dated Jan. 29, 2019.
Nokia, Alcatel-Lucent Shanghai Bell, Duplication Impacts to PDCP[online], 3GPP TSG RAN WG2 #97bis R2-1702642, Internet<URL:http://www.3gpp.org/ftp/tsg_ran/WG2_RL2/TSGR2_97bis/Docs/R2-1702642.zip>, Apr. 3, 2017.
Japanese Office Action from Japan Patent Office in corresponding Japanese Patent Application No. 2018-088514 dated Mar. 5, 2019, 6 pages (including English translation).
3GPP TSG-RAN WG2 Meeting #97bis, R2-1702642, Spokane, USA, Apr. 3-7, 2017, agenda item: 10.3.3.2, source: Nokia, Alcatel-Lucent Shanghai Bell, title: Duplication impacts to PDCP, WID/SID: NR_newRAT—release 15 document for: discussion and decision.
Notice of Submission of Opinion received from Korean Intellectual Property Office in corresponding KR Application No. 10-2018-0050590, dated Jul. 22, 2019.
Ericsson: "TP for PDCP duplication", 3GPP TSG-RAN2 Meeting #101, Athens, Greece, Feb. 26-Mar. 2, 2017 vol. RAN2, No. #101, Athens, Greece; Feb. 26-Mar. 2, 2017 Feb. 26, 2017 (Feb. 26, 2017), XP051399884, Retrieved from the Internet: URL:https://portal.3gpp.org/ngppapp/CreateTdoc.aspx?mode=view&contributionId=867855# [retrieved on Sep. 17, 2018].

(56) References Cited

OTHER PUBLICATIONS

European Search Report in corresponding EP Applicaton No. 18170306.7, dated Sep. 27, 2018.
Ericsson: "Further aspects of dataduplication in PDCP layer", 3GPP Draft; R2-1700834—Further Aspects of Data Duplication in PDCP Layer, 3rd Generation Partnership Project (3GPP), Mobile Competence Centre; 650, Route des Lucioles; F-06921 Sophia-Antipolis CED vol. RAN WG2, No. Athens, Greece; Feb. 13-17, 2017 Feb. 13, 2017 (Feb. 13, 2017).
Ericsson: "Data duplication in lower layers (HARQ)", 3GPP TSG-RAN WG2 #97, Athens, Greece, Feb. 13-17, 2017, Revision of R2-1700833 vol. RAN WG2, No. #97, Athens, Greece; Feb. 13-17, 2017 Feb. 13, 2Q17 (Feb. 13, 2017)XP051212561.
Nokia et al: "Overview of Duplication Operation", 3GPP Draft; R2-1702632 Overview of Duplication Operation, 3rd Generation Partnership Project (3GPP), Mobile Competence Centre; 650, Route des Lucioles; F-06921 Sophia-Antipolis Cedex;France vol. RAN WG2, No. Spokane, USA; Apr. 3-7, 2017 Apr. 3, 2017 (Apr. 3, 2017), XP051244634.

\* cited by examiner

| TB Size | Modulation | Coding Rate | Required #REs | Required #RBs | | Required Minimum BW | |
|---|---|---|---|---|---|---|---|
| | | | | TTI: 1-symbol | TTI: 2-symbol | TTI: 1-symbol | TTI: 2-symbol |
| 50 Bytes | QPSK | 1/3 | 600 | 50 RBs | 25 RBs | 10 MHz | 5 MHz |
| | QPSK | 1/6 | 1200 | 100 RBs | 50 RBs | 20 MHz | 10 MHz |
| | QPSK | 1/12 | 2400 | 200 RBs | 100 RBs | 40 MHz | 20 MHz |
| 100 Bytes | QPSK | 1/3 | 1200 | 100 RBs | 50 RBs | 20 MHz | 10 MHz |
| | QPSK | 1/6 | 2400 | 200 RBs | 100 RBs | 40 MHz | 20 MHz |
| | QPSK | 1/12 | 4800 | 400 RBs | 200 RBs | 80 MHz | 40 MHz |

FIG. 8 (PRIOR ART)

| LogicalChannelConfig field descriptions |
|---|
| *bucketSizeDuration* |
| Bucket Size Duration for logical channel prioritization in TS 36.321 [6]. Value in milliseconds. Value ms50 corresponds to 50 ms, ms100 corresponds to 100 ms and so on. |
| *laa-Allowed* |
| Indicates whether the data of a logical channel is allowed to be transmitted via UL of LAA SCells. Value *TRUE* indicates that the logical channel is allowed to be sent via UL of LAA SCells. Value *FALSE* indicates that the logical channel is not allowed to be sent via UL of LAA SCells. |
| *logicalChannelGroup* |
| Mapping of logical channel to logical channel group for BSR reporting in TS 36.321 [6]. |
| *logicalChannelSR-Mask* |
| Controlling SR triggering on a logical channel basis when an uplink grant is configured. See TS 36.321 [6]. |
| *logicalChannelSR-Prohibit* |
| Value *TRUE* indicates that the *logicalChannelSR-ProhibitTimer* is enabled for the logical channel. E-UTRAN only (optionally) configures the field (i.e. indicates value *TRUE*) if *logicalChannelSR-ProhibitTimer* is configured. See TS 36.321 [6]. |
| *prioritisedBitRate* |
| Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2. |
| *priority* |
| Logical channel priority in TS 36.321 [6]. Value is an integer. |

FIG. 12 (PRIOR ART)

| Conditional presence | Explanation |
|---|---|
| SRmask | The field is optionally present if *ul-SpecificParameters* is present, need OR; otherwise it is not present. |
| UL | The field is mandatory present for UL logical channels; otherwise it is not present. |

FIG. 13 (PRIOR ART)

| Bit | Description |
|---|---|
| 000 | PDCP status report |
| 001 | Interspersed ROHC feedback packet |
| 010 | LWA status report |
| 011 | LWA end-marker packet |
| 100 | Data Duplication Activation/Deactivation |
| 101-111 | reserved |

Oct 1

| The RLC PDU is... | Not to be included in a TB | To be included in a TB |
|---|---|---|
| A complete RLC SDU | Discarded | Not discarded |
| A first segment RLC SDU | N/A | Not discarded |
| A remaining RLC SDU | Not discarded | Not discarded |

FIG. 25

| The RLC PDU is... | Not to be included in a TB | To be included in a TB |
|---|---|---|
| A complete RLC SDU | Duplicated | May be duplicated |
| A first segment RLC SDU | N/A | May be duplicated |
| A remaining RLC SDU | If the first segment RLC SDU had been duplicated, then duplicated; Otherwise, not duplicated | If the first segment RLC SDU had been duplicated, then duplicated; Otherwise, not duplicated |

FIG. 26

| The RLC PDU is... | Not to be included in a TB | To be included in a TB |
|---|---|---|
| A complete RLC SDU | Duplicated | May be duplicated |
| A first segment RLC SDU | N/A | May be duplicated |
| A remaining RLC SDU | If a RLC PDU containing the first segment RLC SDU had been duplicated, then duplicated; Otherwise, not duplicated | If a RLC PDU containing the first segment RLC SDU had been duplicated, then duplicated; Otherwise, not duplicated |

FIG. 27

| The RLC PDU is... | Not to be included in a TB | To be included in a TB |
|---|---|---|
| A complete RLC SDU | Not piggybacked | Piggybacked |
| A first segment RLC SDU | N/A | Piggybacked |
| A remaining RLC SDU | Not piggybacked | Piggybacked |

FIG. 28

METHOD AND APPARATUS OF TRANSMITTING DATA DUPLICATION IN A WIRELESS COMMUNICATION SYSTEM

CROSS-REFERENCE TO RELATED APPLICATIONS

The present application claims the benefit of U.S. Provisional Patent Application Ser. No. 62/502,430 filed on May 5, 2017, the entire disclosure of which is incorporated herein in its entirety by reference.

FIELD

This disclosure generally relates to wireless communication networks, and more particularly, to a method and apparatus of transmitting data duplication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for transmitting data duplication in a wireless communication system are disclosed herein. In one method for a user equipment (UE) configured with data duplication. The UE duplicates a data unit into a first data unit and a second data unit. The UE constructs a second Radio Link Control (RLC) Protocol Data Unit (PDU) used for transmitting the second data unit. The second data unit is a second RLC Service Data Unit (SDU). The UE receives a control command from a network node. The control command is used to deactivate the data duplication. The UE discards the second RLC PDU if the second RLC PDU includes the second RLC SDU.

BRIEF DESCRIPTION OF THE DRAWINGS

FIG. 8 illustrates a table showing the required number of RBs and minimum bandwidth for URLLC under LTE numerology (15 KHz subcarrier spacing, 1 ms subframe) taken from 3GPP R2-1703731.

FIG. 12 is a reproduction of a table from 3GPP TS36.331 V14.1.0 regarding Logical Channel Configuration field descriptions.

FIG. 13 is a reproduction of table from 3GPP TS36.331 V14.1.0 regarding Logical Channel Configuration conditional presence and explanations.

FIG. 25 is a table summarizing various embodiments for deactivating data duplication and discarding a RLC PDU.

FIG. 26 is a table summarizing various embodiments for activating data duplication and duplicating a RLC SDU.

FIG. 27 is a table summarizing various embodiments for activating data duplication and duplicating a RLC PDU.

FIG. 28 is a table summarizing various embodiments for activating data duplication and piggybacking a RLC PDU.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-1701542, Packet duplication in CA, RAN WG2 Meeting #97; R2-1702032, Data duplication in lower layers (HARM), RAN WG2 Meeting #97; TR 38.913 V14.1.0, Study on Scenarios and Requirements for Next Generation Access Technologies; TS 36.300 V14.1.0, Evolved Universal Terrestrial Radio Access (E-UTRA) and Evolved Universal Terrestrial Radio Access Network (E-UTRAN), Overall description, Stage 2; R2-1703731, Packet Duplication Operations; R2-1703529, Activating and deactivating packet duplication; TS 36.321 V14.0.0, Evolved Universal Terrestrial Radio Access (E-UTRA); Medium Access Control (MAC) protocol specification; TS 36.331 V14.1.0, Evolved Universal Terrestrial Radio Access (E-UTRA), Radio Resource Control (RRC), Protocol specification; TS 36.322 V13.1.0, "Evolved Universal Terrestrial Radio Access (E-UTRA), Radio Link Control (RLC) protocol specification"; R2-1702642, "Duplication Impacts to PDCP"; and TS 36.323 V11.2.0, "Evolved Universal Terrestrial Radio Access (E-UTRA), Packet Data Convergence Protocol (PDCP) specification". The standards and documents listed above are hereby expressly incorporated by reference in their entirety.

Figure 1:
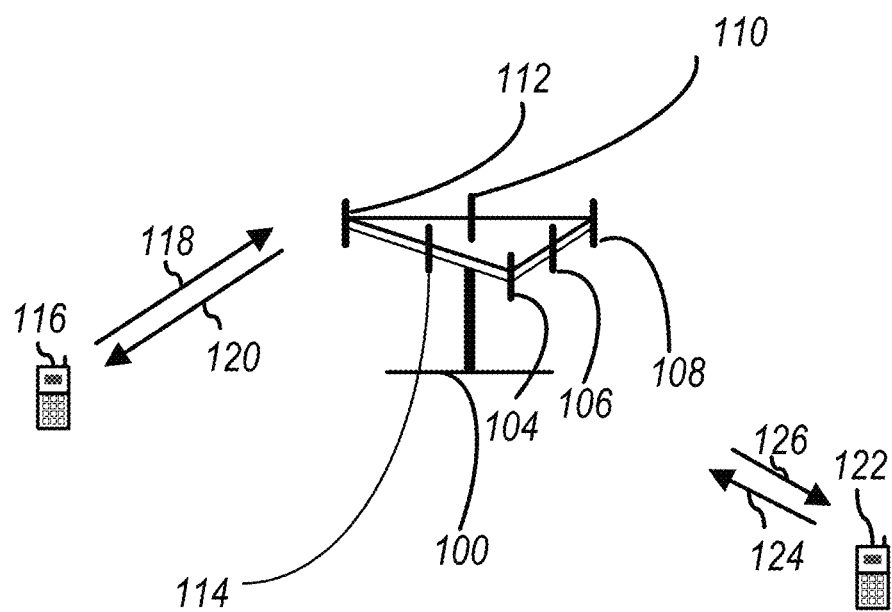
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
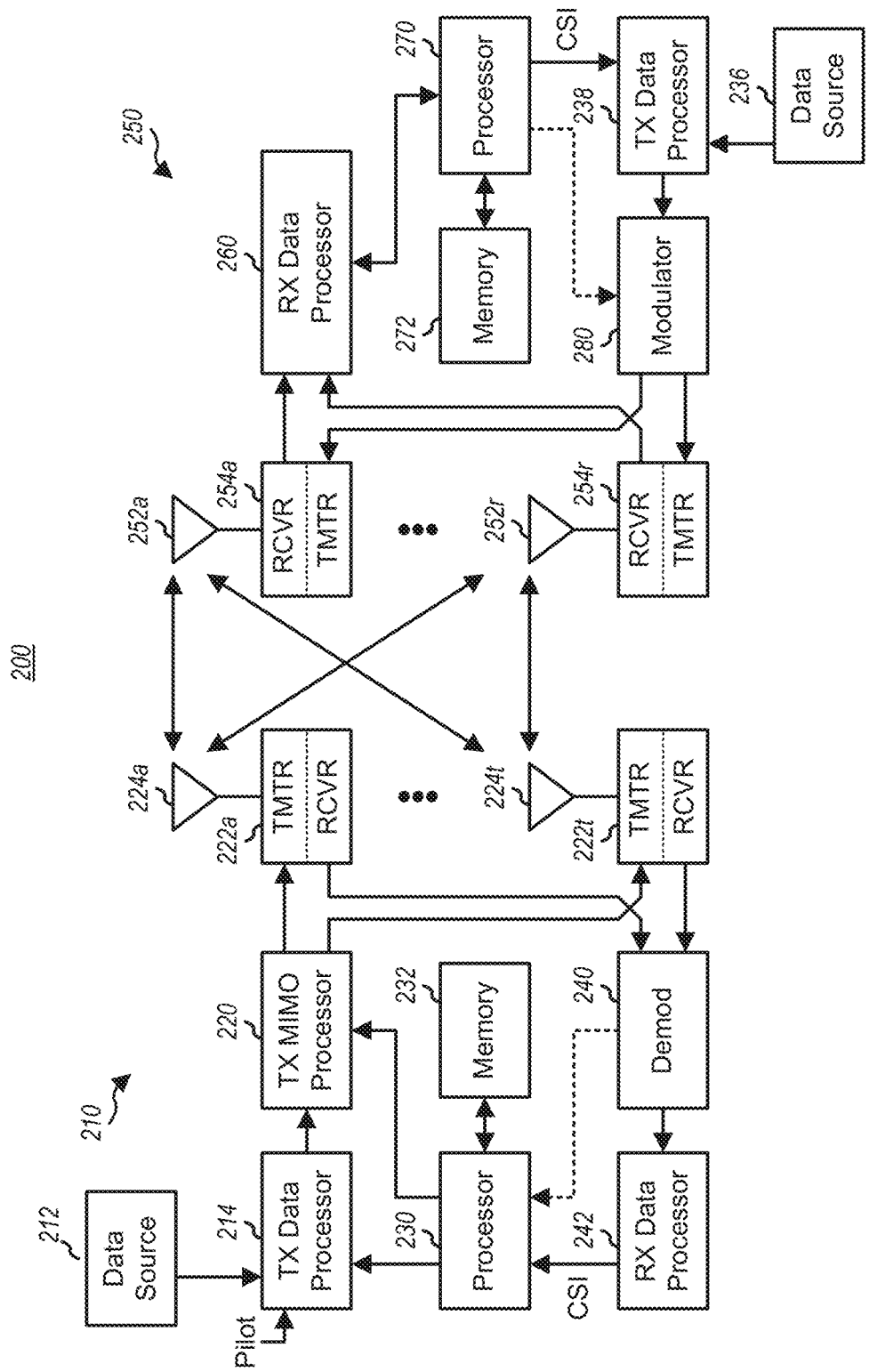
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
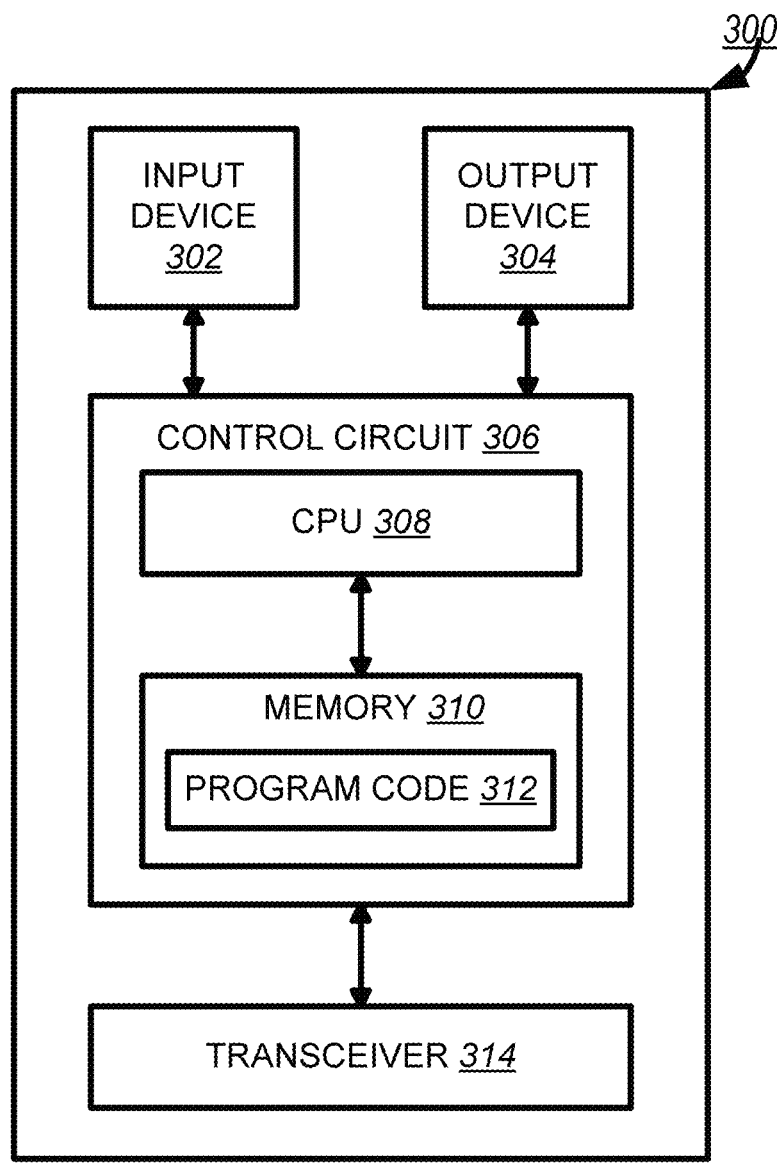
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
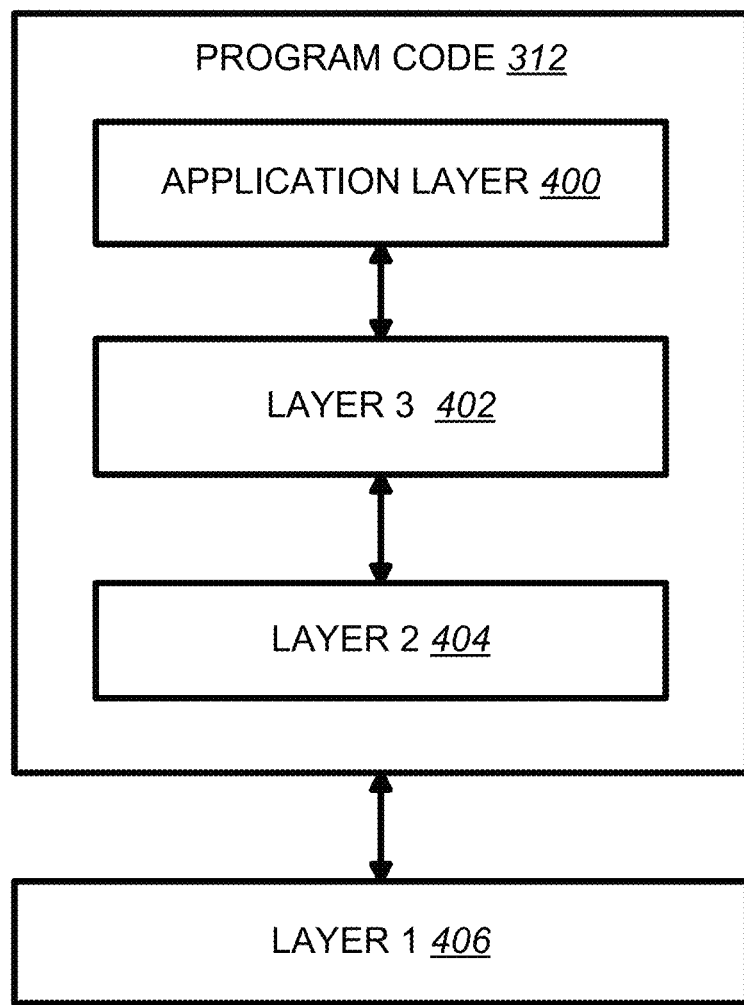
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

According to 3GPP R2-1701542, in LTE, erroneous data transmission has been guaranteed by Automatic Repeat request/Hybrid Automatic Repeat request (ARQ/HARQ) in Layer2 and Adaptive Modulation and Coding (AMC) in Layer 1 while latency generally relies on evolved Node B (eNB) scheduling. Considering that AMC in Layer 1 is tightly related to channel quality of the data path (i.e., one cell), Layer 2 would be able to offer a chance to use multiple data paths (i.e., multiple cells) effectively by using carrier aggregation (CA) or dual connectivity (DC).

According to 3GPP R2-1702032, multi-connectivity (MC) can include terminologies of dual-connectivity (DC) and carrier aggregation (CA) from a system architecture perspective in New RAT/Radio (NR). Characteristically, MC can contribute to URLLC in at least two aspects: (i) boosting reliability without sacrificing latency-wise performance; and (2) removing the interruption time otherwise caused by mobility. The concept to emphasize is MC as a kind of diversity scheme that can obtain a large magnitude of gains in reliability and latency that any link-level diversity scheme by its own cannot achieve. Both downlink (DL) and uplink (UL) MC may be of special interests to Ultra-Reliable and Low Latency Communications (URLLC), though UL MC may have limiting factors, such as a UE's power.

According to 3GPP TR 38.913 V14.1.0, a URLLC packet satisfies the following two requirements:

Reliability can be evaluated by the success probability of transmitting X bytes within a certain delay, which is the time it takes to deliver a small data packet from the radio protocol layer 2/3 Service Data Unit (SDU) ingress point to the radio protocol layer 2/3 SDU egress point of the radio interface, at a certain channel quality (e.g., coverage-edge).

A general URLLC reliability requirement for one transmission of a packet is $1\text{-}10^{-5}$ for 32 bytes with a user plane latency of 1 ms.

UP latency: The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by Discontinuous Reception (DRX).

For URLLC the target for user plane latency should be 0.5 ms for UL, and 0.5 ms for downlink (DL). Furthermore, if possible, the latency should also be low enough to support the use of the next generation access technologies as a wireless transport technology that can be used within the next generation access architecture. The value above should be considered an average value and does not have an associated high reliability requirement.

According to 3GPP TS 36.300 V14.1.0, Layer 2 is split into the following sublayers: Medium Access Control (MAC), Radio Link Control (RLC), and Packet Data Convergence Protocol (PDCP).

The multiplexing of several logical channels (i.e. radio bearers) on the same transport channel (i.e. transport block) is performed by the MAC sublayer.

In both uplink and downlink, when neither CA nor DC are configured, only one transport block is generated per Transmission Time Interval (TTI) in the absence of spatial multiplexing.

Figure 5:
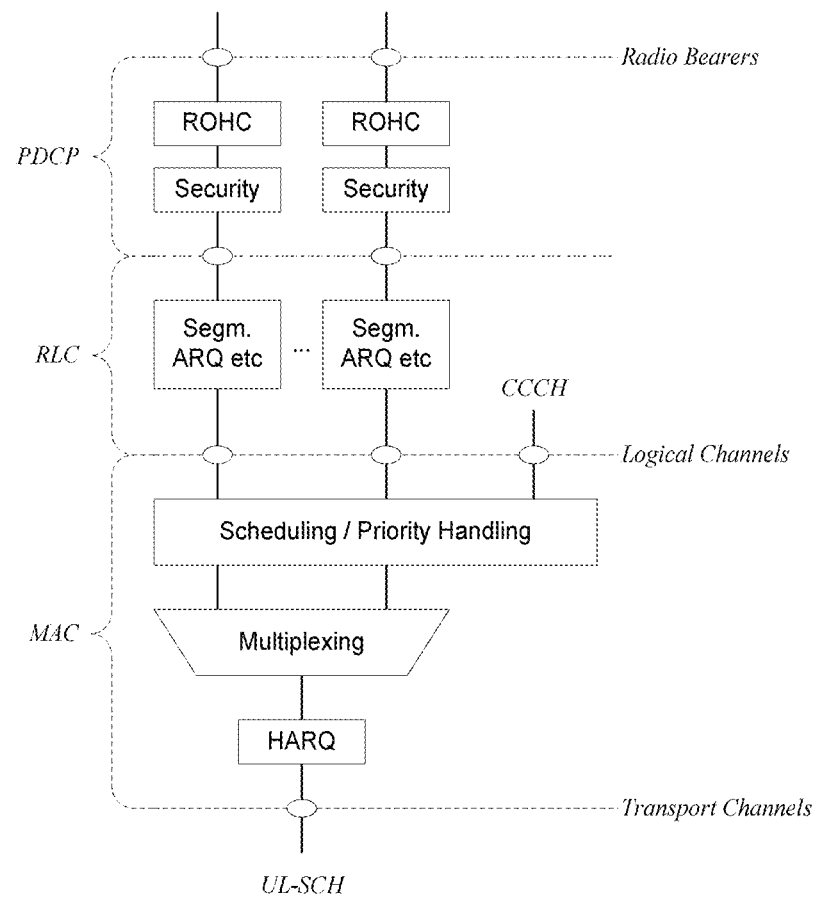
FIG. 5 illustrates a Layer 2 structure for Uplink (UL) as described in 3GPP TS 36.300 V14.1.0.

FIG. 5 illustrates a Layer 2 structure for UL.

In case of CA, the multi-carrier nature of the physical layer is only exposed to the MAC layer for which one HARQ entity is required per serving cell.

In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell.

Figure 6:
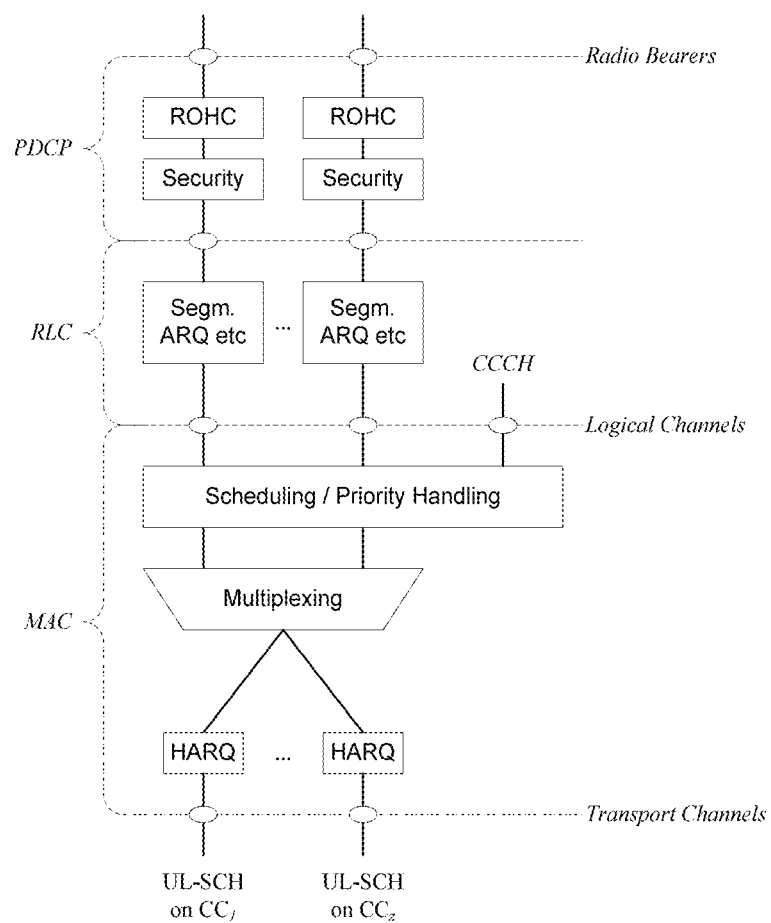
FIG. 6 illustrates a Layer 2 structure for UL as described in 3GPP TS 36.300 V14.1.0.

FIG. 6 illustrates Layer 2 Structure for UL with CA configured. In the case of DC, the UE is configured with two MAC entities: one MAC entity for Master evolved Node B (MeNB) and one MAC entity for Secondary eNB (SeNB).

Figure 7:
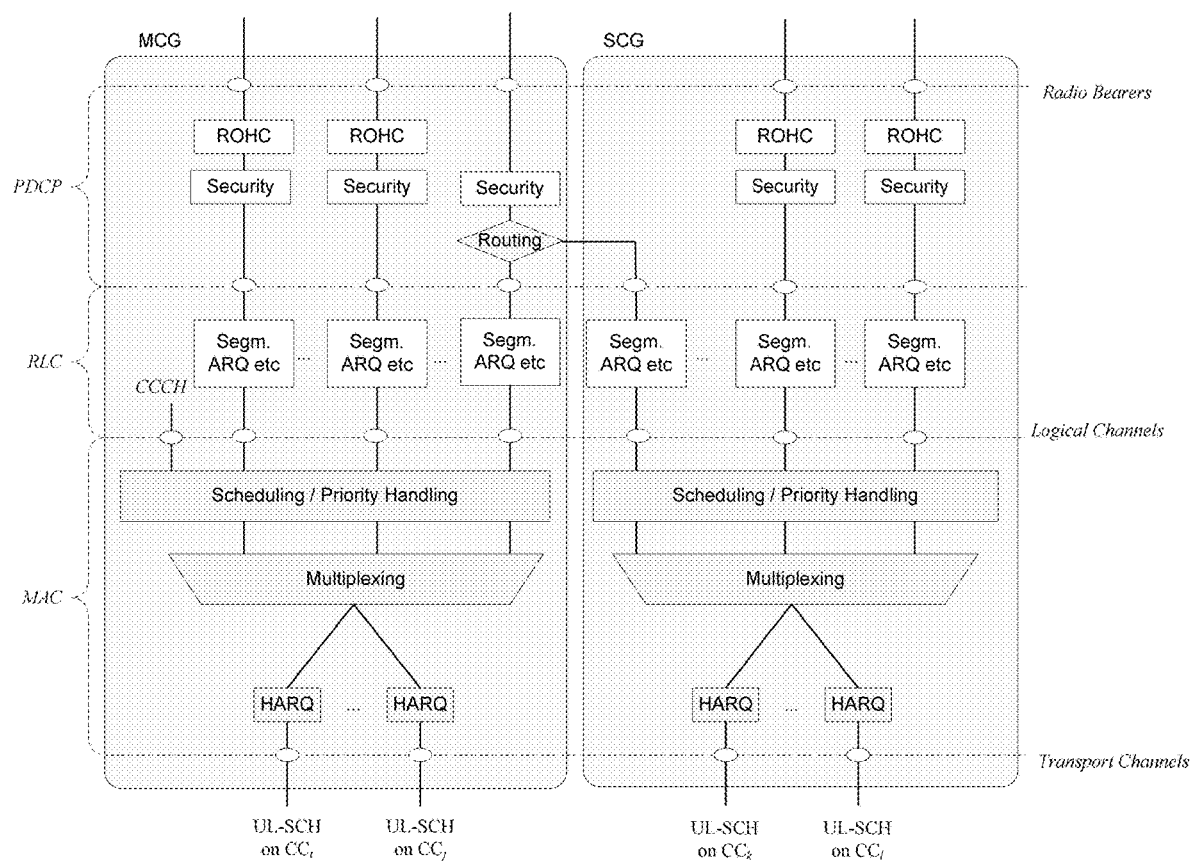
FIG. 7 illustrates a Layer 2 structure for UL when both CA and DC are configured as described in 3GPP TS 36.300 V14.1.0.

FIG. 7 describes the Layer 2 structure for the uplink when both CA and DC are configured. As explained in section 4.9.2 of 3GPP TS 36.300 V14.1.0, SRBs are always handled by the MeNB and as a result, Common Control Channel (CCCH) is only shown for the MeNB. For a split bearer, the UE is configured over which link (or both links) the UE transmits UL Packet Data Convergence Protocol (PDCP) Protocol Data Units (PDUs) by the MeNB. The RLC layer only transmits corresponding ARQ feedback for the downlink data on the link which is not responsible for UL PDCP PDUs transmission.

According to 3GPP R2-1703731, Data duplication (Packet Duplication) is beneficial in the following cases:

1) URLLC Requirement Cannot be Fulfilled Without Packet Duplication:

Despite some efforts in the physical layer, single transmission without packet duplication may not satisfy the URLLC requirements in some scenarios. For example, the number of physical resource blocks for URLLC may not be sufficient, especially in below 6 GHz frequency with limited bandwidth. FIG. 8 shows the required number of resource elements (REs) and resource blocks (RBs) and corresponding minimum bandwidth according to TB size under LTE numerology and ideal cases (i.e., all of the orthogonal frequency-division multiplexing (OFDM) symbols can be used for data transmission). If Quadrature Phase Shift Keying (QPSK) and 1/3 coding rate are applied for 100 Bytes TB size under 1-symbol TTI, 1200 REs and at least 20 MHz bandwidth are required. It is not clear that more than 20 MHz bandwidth for URLLC can be always reserved per user. According to link-level simulation as described in 3GPP TR 38.913 V.14.1.0, $10^{-5}$ block error ratio (BLER) for the initial transmission can be achieved by QPSK and 1/3 coding rate at 1.5 dB signal-to-noise ration (SNR). Therefore, this scenario can happen in a realistic situation when the signal quality is below this value. Moreover, as the number of URLLC users increases, packet duplication with relatively higher Modulation Code Scheme (MCS) can be useful.

2) Channel Qualities for Both Links are Bad and Similar with Each Other.

When there are multiple links and channel qualities for both link are bad (e.g., cell edge), a single transmission consumes a large amount of physical resources or may not guarantee URLLC service. In this case, packet duplication can be an efficient solution to achieve a diversity gain from multiple links.

On the other hand, if channel qualities are asymmetric (i.e., one link is very good whereas the other link is bad), then a single transmission via good link with a robust MCS seems to be sufficient. In this case, not only does packet transmission via a bad link require a large amount of physical resources, but also transmission via the good link already meets the URLLC requirements. This case usually happens at a cell center or line-of-sight (LoS) region.

3) Xn Interface Between MgNB (or MeNB) and SgNB (or SeNB) is Almost Ideal.

As disclosed in 3GPP TS 36.300 V14.1.0, it was reported that, under non-ideal Xn (large Xn latency) between MgNB and SgNB, packet duplication does not have much latency improvement. The packet via SeNB leg experiencing Xn latency arrives late at the receiver. In this case, fast retransmission via MgNB may be much faster than initial transmission via SeNB. Therefore, we can say that almost ideal Xn interface will give the gain of packet duplication. By considering URLLC requirements, this Xn latency should be less than hundreds of microseconds.

4) Overall Channel Occupancy is Low.

In case of light traffic load (e.g. most of physical resource for data transmission (e.g. PUSCH or PDSCH) is not assigned to UEs.), the link may assist another link's reliable transmission by performing packet duplication. This gives scheduling flexibility to network.

Conversely, if the conditions above are not satisfied, packet duplication may not be necessary. Even in some cases, it may be wasteful. Therefore, packet duplication needs to be configured carefully to ensure its efficiency.

Logical channel prioritization (LCP) procedure and multiplexing of MAC control element and MAC SDUs are depicted in 3GPP TS 36.321 as quoted below.

3GPP R2-1703529 discloses signaling for data duplication (packet duplication).

The criteria for activating and deactivating packet duplication depend on the DL and UL channel conditions as well as on the loading in the different cells/carriers. In both DC/MC and CA architectures, the MgNB (PCell) makes the decision on whether or not to activate packet duplication for the UE.

Once packet duplication is activated, the MgNB can dynamically decide how many links (cells) are used for both DL and UL transmission to satisfy the required reliability. The UE may receive one or more DL assignments or UL grants for the transmission of a packet.

The number of links that are used for UL and DL may be different because the loading in the UL can DL can be significantly different.

The network may also provide the UE with criteria to determine when to use packet duplication, while the UE is configured for packet duplication. This allows the UE to decide when to use packet duplication.

Figure 9:
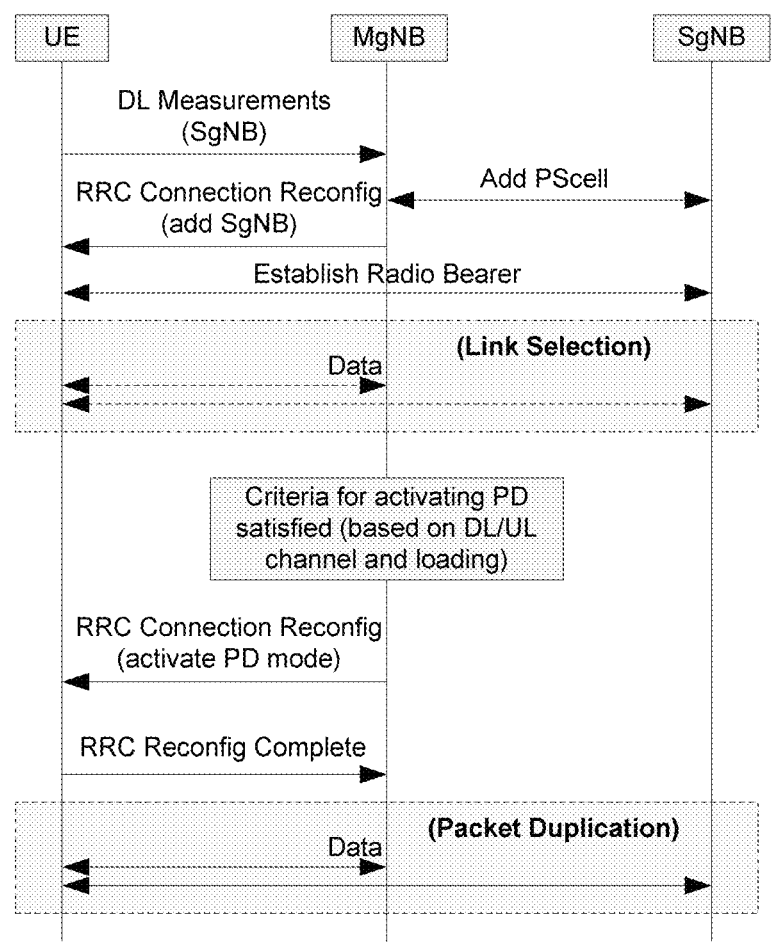
FIG. 9 illustrates signaling flow for activating packet duplication as shown in 3GPP R2-1703529.

The signal flow for activating packet duplication is illustrated in FIG. 9.

In the above procedure, new cells/carriers can be added for the UE based on the UE's measurement reports. The serving MgNB can use link selection to determine the best cell/carrier to send the packets. If the criteria for activating packet duplication (PD) are satisfied, then the serving MgNB sends a Radio Resource Control (RRC) connection Reconfiguration message to active the PD mode. Once the UE sends the RRC Reconfiguration Complete message, the packet duplication mode is activated. This means the UE can receive multiple DL assignment messages and multiple UL grants for the same packet.

Figure 10:
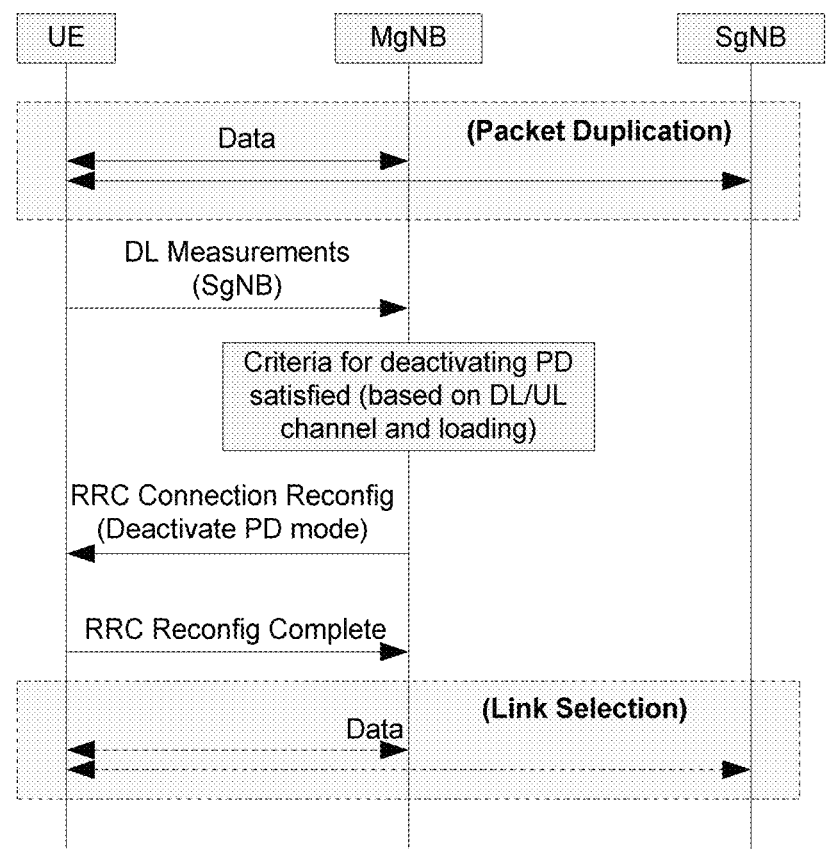
FIG. 10 illustrates signaling flow for deactivating packet duplication as shown in 3GPP R2-1703529.

The signaling flow for deactivating packet duplication is illustrated in FIG. 10.

In the above procedure, if the UE is in PD mode, the serving MgNB evaluates the criteria for deactivating PD based on the UE's channel measurements and on the loading in the cells/carriers. If the PD criteria is satisfied, the MgNB sends an RRC Connection Reconfiguration to deactivate the PD mode. Once the UE sends the RRC Reconfiguration Complete message, the PD mode is disabled and the serving MgNB uses link selection to transmit the packets.

Figure 11:
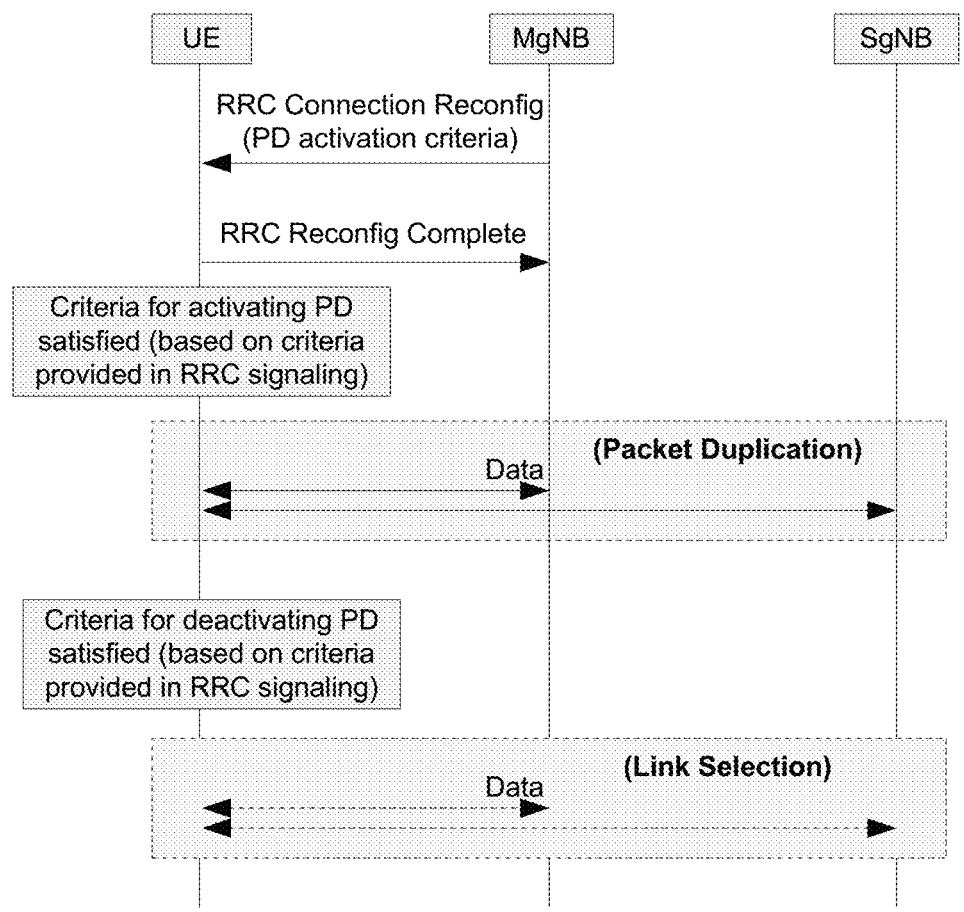
FIG. 11 illustrates signaling flow for activating and deactivating packet duplication based on criteria sent to the UE through RRC signaling as shown in 3GPP R2-1703529.

In some scenarios, the MgNB can provide the UE with the criteria to activate/deactivate packet duplication. The UE evaluates the criteria to determine when to use packet duplication. This procedure is illustrated in FIG. 11. In the above procedure, the MgNB sends an RRC Connection Reconfiguration message to configure the UE with the PD activation criteria. In this case, the UE is also configured with resources that can be used for packet duplication (e.g. grant free resources on multiple cells/carriers).

LTE Procedures of Medium Access Control (MAC) protocol specification are depicted in 3GPP TS 36.321 V.14.0.0 as quoted below.

5.1 Random Access Procedure 5.1.1 Random Access Procedure Initialization

The Random Access procedure described in this sub-clause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE and is configured with a non-anchor carrier, perform the Random Access procedure on the anchor carrier.

Before the procedure can be initiated, the following information for related Serving Cell is assumed to be available for UEs other than NB-IoT UEs, BL UEs or UEs in enhanced coverage [8], unless explicitly stated otherwise:
  the available set of PRACH resources for the transmission of the Random Access Preamble, prach-ConfigIndex.
  the groups of Random Access Preambles and the set of available Random Access Preambles in each group (SpCell only):
  The preambles that are contained in Random Access Preambles group A and Random Access Preambles group B are calculated from the parameters numberOfRA-Preambles and sizeOfRA-PreamblesGroupA:
  If sizeOfRA-PreamblesGroupA is equal to numberOfRA-Preambles then there is no Random Access Preambles group B. The preambles in Random Access Preamble group A are the preambles 0 to sizeOfRA-PreamblesGroupA—1 and, if it exists, the preambles in Random Access Preamble group B are the preambles sizeOfRA-PreamblesGroupA to numberOfRA-Preambles—1 from the set of 64 preambles as defined in [7].
  if Random Access Preambles group B exists, the thresholds, messagePowerOffsetGroupB and messageSizeGroupA, the configured UE transmitted power of the Serving Cell performing the Random Access Procedure, $P_{CMAX,c}$ [10], and the offset between the preamble and Msg3, deltaPreambleMsg3, that are required for selecting one of the two groups of Random Access Preambles (SpCell only).
  the RA response window size ra-ResponseWindowSize.
  the power-ramping factor powerRampingStep.
  the maximum number of preamble transmission preambleTransMax.
  the initial preamble power preambleInitialReceivedTargetPower.
  the preamble format based offset DELTA_PREAMBLE (see subclause 7.6).
  the maximum number of Msg3 HARQ transmissions maxHARQ-Msg3Tx (SpCell only).
  the Contention Resolution Timer mac-ContentionResolutionTimer (SpCell only).
  NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage [8]:
  if the UE is a BL UE or a UE in enhanced coverage:
    the available set of PRACH resources associated with each enhanced coverage level supported in the Serving Cell for the transmission of the Random Access Preamble, prach-ConfigIndex.
    the groups of Random Access Preambles and the set of available Random Access Preambles in each group (SpCell only):
    The preambles that are contained in Random Access Preamble groups for each enhanced coverage level, if it exists, are the preambles firstPreamble to lastPreamble.
    If sizeOfRA-PreamblesGroupA is not equal to numberOfRA-Preambles, Random Access Preambles group B exists for all enhanced coverage levels and is calculated as above.
    NOTE: If Random Access Preamble group B exists, the eNB should ensure that at least one Random Access Preamble is contained in Random Access Preamble group A and Random Access Preamble group B for all enhanced coverage level.
  if the UE is a NB-IoT UE:
    the available set of PRACH resources supported in the Serving Cell, nprach-ParametersList.
    for random access resource selection and preamble transmission:
      a PRACH resource is mapped into an enhanced coverage level.
      each PRACH resource contains a set of nprach-NumSubcarriers subcarriers which can be partitioned into one or two groups for single/multi-tone Msg3 transmission by nprach-SubcarrierMSG3-RangeStart. Each group is referred to as a Random Access Preamble group below in the procedure text.
        a subcarrier is identified by the subcarrier index in the range: [nprach-SubcarrierOffset, nprach-SubcarrierOffset+nprach-NumSubcarriers−1]
        each subcarrier of a Random Access Preamble group corresponds to a Random Access Preamble.
      when the subcarrier index is explicitly sent from the eNB as part of a PDCCH order ra-PreambleIndex shall be set to the signaled subcarrier index.
    the mapping of the PRACH resources into enhanced coverage levels is determined according to the following:
      the number of enhanced coverage levels is equal to one plus the number of RSRP thresholds present in RSRP-ThresholdsPrachInfoList.
      each enhanced coverage level has one PRACH resource present in nprach-ParametersList.
      enhanced coverage levels are numbered from 0 and the mapping of PRACH resources to enhanced coverage levels are done in increasing numRepetitionsPerPreambleAttempt order.
    the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX,c}$ [10].

the RA response window size ra-ResponseWindowSize and the Contention Resolution Timer mac-ContentionResolutionTimer (SpCell only) per enhanced coverage level supported in the Serving Cell.

the power-ramping factor powerRampingStep.

the maximum number of preamble transmission preambleTransMax-CE.

the initial preamble power preambleInitialReceivedTargetPower.

the preamble format based offset DELTA_PREAMBLE (see subclause 7.6). For NB-IoT the DELTA_PREAMBLE is set to 0.

The Random Access procedure shall be performed as follows:

Flush the Msg3 buffer;

set the PREAMBLE_TRANSMISSION_COUNTER to 1;

if the UE is an NB-IoT UE, a BL UE or a UE in enhanced coverage:

set the PREAMBLE_TRANSMISSION_COUNTER_CE to 1;

if the starting enhanced coverage level, or for NB-IoT the initial number of PRACH repetitions, has been indicated in the PDCCH order which initiated the Random Access procedure, or if the starting enhanced coverage level has been provided by upper layers:

the MAC entity considers itself to be in that enhanced coverage level regardless of the measured RSRP;

else:

if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:

the MAC entity considers to be in enhanced coverage level 3;

else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:

the MAC entity considers to be in enhanced coverage level 2;

else if the measured RSRP is less than the RSRP threshold of enhanced coverage level 1 as configured by upper layers in rsrp-ThresholdsPrachInfoList then:

the MAC entity considers to be in enhanced coverage level 1;

else:

the MAC entity considers to be in enhanced coverage level 0;

set the backoff parameter value to 0 ms;

for the RN, suspend any RN subframe configuration;

proceed to the selection of the Random Access Resource (see subclause 5.1.2).

NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

5.1.2 Random Access Resource selection

The Random Access Resource selection procedure shall be performed as follows:

If, except for NB-IoT, ra-PreambleIndex (Random Access Preamble) and ra-PRACH-MaskIndex (PRACH Mask Index) have been explicitly signaled and ra-PreambleIndex is not 000000:

the Random Access Preamble and the PRACH Mask Index are those explicitly signaled;

else, for NB-IoT, if ra-PreambleIndex (Random Access Preamble) and PRACH resource have been explicitly signaled:

the PRACH resource is that explicitly signaled;

if the ra-PreambleIndex signaled is not 000000:

the Random Access Preamble is set to nprach-SubcarrierOffset+(ra-PreambleIndex modulo nprach-NumSubcarriers), where nprach-SubcarrierOffset and nprach-NumSubcarriers are parameters in the currently used PRACH resource.

else:

select the Random Access Preamble group according to the PRACH resource and the support for multi-tone Msg3 transmission.

randomly select a Random Access Preamble within the selected group.

else the Random Access Preamble shall be selected by the MAC entity as follows:

If Msg3 has not yet been transmitted, the MAC entity shall, for NB-IoT UEs, BL UEs or UEs in enhanced coverage:

expect for NB-IoT, select the Random Access Preambles group and the PRACH resource corresponding to the selected enhanced coverage level;

for NB-IoT, select the PRACH resource corresponding to the selected enhanced coverage level, and select the Random Access Preambles group corresponding to the PRACH resource and the support for multi-tone Msg3 transmission;

If Msg3 has not yet been transmitted, the MAC entity shall, except for BL UEs or UEs in enhanced coverage in case preamble group B does not exists, or for NB-IoT UEs:

if Random Access Preambles group B exists and any of the following events occur:

the potential message size (UL data available for transmission plus MAC header and, where required, MAC control elements) is greater than messageSizeGroupA and the pathloss is less than $P_{CMAX,c}$ (of the Serving Cell performing the Random Access Procedure)—preambleInitialReceivedTargetPower—deltaPreambleMsg3—messagePowerOffsetGroupB;

the Random Access procedure was initiated for the CCCH logical channel and the CCCH SDU size plus MAC header is greater than messageSizeGroupA;

select the Random Access Preambles group B;

else:
  select the Random Access Preambles group A.
else, if Msg3 is being retransmitted, the MAC entity shall:
  select the same group of Random Access Preambles as was used for the preamble transmission attempt corresponding to the first transmission of Msg3.
randomly select a Random Access Preamble within the selected group. The random function shall be such that each of the allowed selections can be chosen with equal probability;
except for NB-IoT, set PRACH Mask Index to 0.
determine the next available subframe containing PRACH permitted by the restrictions given by the prach-ConfigIndex (except for NB-IoT), the PRACH Mask Index (except for NB-IoT, see subclause 7.3), physical layer timing requirements [2] and in case of NB-IoT, the subframes occupied by PRACH resources related to a higher enhanced coverage level (a MAC entity may take into account the possible occurrence of measurement gaps when determining the next available PRACH subframe);
if the transmission mode is TDD and the PRACH Mask Index is equal to zero:
  if ra-PreambleIndex was explicitly signaled and it was not 000000 (i.e., not selected by MAC):
    randomly select, with equal probability, one PRACH from the PRACHs available in the determined subframe.
  else:
    randomly select, with equal probability, one PRACH from the PRACHs available in the determined subframe and the next two consecutive subframes.
else:
  determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.
proceed to the transmission of the Random Access Preamble (see subclause 5.1.3).

5.1.3 Random Access Preamble Transmission

The random-access procedure shall be performed as follows:
set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
if the UE is a BL UE or a UE in enhanced coverage:
  the PREAMBLE_RECEIVED_TARGET_POWER is set to: PREAMBLE_RECEIVED_TARGET_POWER−10*log 10(numRepetitionPerPreambleAttempt);
if NB-IoT:
  for enhanced coverage level 0, the PREAMBLE_RECEIVED_TARGET_POWER is set to: PREAMBLE_RECEIVED_TARGET_POWER−10*log 10(numRepetitionPerPreambleAttempt)
  for other enhanced coverage levels, the PREAMBLE_RECEIVED_TARGET_POWER is set corresponding to the max UE output power;
if the UE is an NB-IoT UE, a BL UE or a UE in enhanced coverage:
  instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.
else:
  instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap or a Sidelink Discovery Gap for Transmission or a Sidelink Discovery Gap for Reception, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level. The RA-RNTI associated with the PRACH in which the Random Access Preamble is transmitted, is computed as:

$$\text{RA-RNTI}=1+t\_id+10*f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$) except for NB-IoT UEs, BL UEs or UEs in enhanced coverage. If the PRACH resource is on a TDD carrier, the f_id is set to $f_{RA}$, where $f_{RA}$ is defined in Section 5.7.1 of [7].

For BL UEs and UEs in enhanced coverage, RA-RNTI associated with the PRACH in which the Random Access Preamble is transmitted, is computed as:

$$\text{RA-RNTI}=1+t\_id+10*f\_id+60*(SFN\_id \bmod (W\max/10))$$

where t_id is the index of the first subframe of the specified PRACH ($0 \leq t\_id < 10$), f_id is the index of the specified PRACH within that subframe, in ascending order of frequency domain ($0 \leq f\_id < 6$), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{RA}$, where $f_{RA}$ is defined in Section 5.7.1 of [7].

For NB-IoT UEs, the RA-RNTI associated with the PRACH in which the Random Access Preamble is transmitted, is computed as:

$$\text{RA-RNTI}=1+\text{floor}(SFN\_id/4)$$

where SFN_id is the index of the first radio frame of the specified PRACH.

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:
 if the Random Access Response contains a Backoff Indicator subheader:
  set the backoff parameter value as indicated by the BI field of the Backoff Indicator subheader and Table 7.2-1, except for NB-IoT where the value from Table 7.2-2 is used.
  else, set the backoff parameter value to 0 ms.
 if the Random Access Response contains a Random Access Preamble identifier corresponding to the transmitted Random Access Preamble (see subclause 5.1.3), the MAC entity shall:
 consider this Random Access Response reception successful and apply the following actions for the serving cell where the Random Access Preamble was transmitted:
  process the received Timing Advance Command (see subclause 5.2);
  indicate the preambleInitialReceivedTargetPower and the amount of power ramping applied to the latest preamble transmission to lower layers (i.e., (PREAMBLE_TRANSMISSION_COUNTER−1)*powerRampingStep);
  process the received UL grant value and indicate it to the lower layers;
  if ra-PreambleIndex was explicitly signaled and it was not 000000 (i.e., not selected by MAC):
   consider the Random Access procedure successfully completed.
  else, if the Random Access Preamble was selected by the MAC entity:
   set the Temporary C-RNTI to the value received in the Random Access Response message no later than at the time of the first transmission corresponding to the UL grant provided in the Random Access Response message;
   if this is the first successfully received Random Access Response within this Random Access procedure:
    if the transmission is not being made for the CCCH logical channel, indicate to the Multiplexing and assembly entity to include a C-RNTI MAC control element in the subsequent uplink transmission;
    obtain the MAC PDU to transmit from the "Multiplexing and assembly" entity and store it in the Msg3 buffer.

NOTE: When an uplink transmission is required, e.g., for contention resolution, the eNB should not provide a grant smaller than 56 bits (or 88 bits for NB-IoT) in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the MAC entity shall:
 if the notification of power ramping suspension has not been received from lower layers:
  increment PREAMBLE_TRANSMISSION_COUNTER by 1;
 if the UE is an NB-IoT UE, a BL UE or a UE in enhanced coverage:
  if PREAMBLE_TRANSMISSION_COUNTER= preambleTransMax-CE+1:
   if the Random Access Preamble is transmitted on the SpCell:
    indicate a Random Access problem to upper layers;
   if NB-IoT:
    consider the Random Access procedure unsuccessfully completed;
 else:
  if PREAMBLE_TRANSMISSION_COUNTER= preambleTransMax+1:
   if the Random Access Preamble is transmitted on the SpCell:
    indicate a Random Access problem to upper layers;
   if the Random Access Preamble is transmitted on an SCell:
    consider the Random Access procedure unsuccessfully completed.
 if in this Random Access procedure, the Random Access Preamble was selected by MAC:
  based on the backoff parameter, select a random backoff time according to a uniform distribution between 0 and the Backoff Parameter Value;
  delay the subsequent Random Access transmission by the backoff time;
 if the UE is an NB-IoT UE, a BL UE or a UE in enhanced coverage:
  increment PREAMBLE_TRANSMISSION_COUNTER_CE by 1;
  if PREAMBLE_TRANSMISSION_COUNTER_CE=maxNumPreambleAttemptCE for the corresponding enhanced coverage level+1:
   reset PREAMBLE_TRANSMISSION_COUNTER_CE;
   consider to be in the next enhanced coverage level, if it is supported by the Serving Cell and the UE, otherwise stay in the current enhanced coverage level;
   select the Random Access Preambles group, ra-ResponseWindowSize, mac-ContentionResolutionTimer, and PRACH resource corresponding to the selected enhanced coverage level;
   if the UE is an NB-IoT UE:
    if the Random Access Procedure was initiated by a PDCCH order:
  consider the PRACH resource corresponding to the selected enhanced coverage level as explicitly signaled;
 proceed to the selection of a Random Access Resource (see subclause 5.1.2).

5.1.5 Contention Resolution

Contention Resolution is based on either C-RNTI on PDCCH of the SpCell or UE Contention Resolution Identity on DL-SCH. If the UE is an NB-IoT UE, a BL UE or a UE in enhanced coverage, the MAC entity shall use the mac-ContentionResolutionTimer for the corresponding enhanced coverage level if it exists.

Once Msg3 is transmitted, the MAC entity shall:
start mac-ContentionResolutionTimer and restart mac-ContentionResolutionTimer at each HARQ retransmission;
regardless of the possible occurrence of a measurement gap or Sidelink Discovery Gap for Reception, monitor the PDCCH until mac-ContentionResolutionTimer expires or is stopped;
if notification of a reception of a PDCCH transmission is received from lower layers, the MAC entity shall:
  if the C-RNTI MAC control element was included in Msg3:
    if the Random Access procedure was initiated by the MAC sublayer itself or by the RRC sublayer and the PDCCH transmission is addressed to the C-RNTI and contains an UL grant for a new transmission; or
    if the Random Access procedure was initiated by a PDCCH order and the PDCCH transmission is addressed to the C-RNTI:
      consider this Contention Resolution successful;
      stop mac-ContentionResolutionTimer;
      discard the Temporary C-RNTI;
      if the UE is an NB-IoT UE and is configured with a non-anchor carrier:
        the UL grant or DL assignment contained in the PDCCH transmission on the anchor carrier is valid only for the non-anchor carrier.
      consider this Random Access procedure successfully completed.
  else if the CCCH SDU was included in Msg3 and the PDCCH transmission is addressed to its Temporary C-RNTI:
    if the MAC PDU is successfully decoded:
      stop mac-ContentionResolutionTimer;
      if the MAC PDU contains a UE Contention Resolution Identity MAC control element; and
      if the UE Contention Resolution Identity included in the MAC control element matches the 48 first bits of the CCCH SDU transmitted in Msg3:
        consider this Contention Resolution successful and finish the disassembly and demultiplexing of the MAC PDU;
        set the C-RNTI to the value of the Temporary C-RNTI;
        discard the Temporary C-RNTI;
        consider this Random Access procedure successfully completed.
      else
        discard the Temporary C-RNTI;
        consider this Contention Resolution not successful and discard the successfully decoded MAC PDU.
if mac-ContentionResolutionTimer expires:
  discard the Temporary C-RNTI;
  consider the Contention Resolution not successful.
if the Contention Resolution is considered not successful the MAC entity shall:
  flush the HARQ buffer used for transmission of the MAC PDU in the Msg3 buffer;
  if the notification of power ramping suspension has not been received from lower layers:
    increment PREAMBLE_TRANSMISSION_COUNTER by 1;
  if the UE is an NB-IoT UE, a BL UE or a UE in enhanced coverage:
    if PREAMBLE_TRANSMISSION_COUNTER= preambleTransMax-CE+1:
      indicate a Random Access problem to upper layers.
    if NB-IoT:
      consider the Random Access procedure unsuccessfully completed;
  else:
    if PREAMBLE_TRANSMISSION_COUNTER=preambleTransMax+1:
      indicate a Random Access problem to upper layers.
  based on the backoff parameter, select a random backoff time according to a uniform distribution between 0 and the Backoff Parameter Value;
  delay the subsequent Random Access transmission by the backoff time;
  proceed to the selection of a Random Access Resource (see subclause 5.1.2).

5.1.6 Completion of the Random Access Procedure

At completion of the Random Access procedure, the MAC entity shall:
discard explicitly signaled ra-PreambleIndex and ra-PRACH-MaskIndex, if any;
flush the HARQ buffer used for transmission of the MAC PDU in the Msg3 buffer.

In addition, the RN shall resume the suspended RN subframe configuration, if any.

5.4.2 HARQ Operation

5.4.2.1 HARQ Entity

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

The number of parallel HARQ processes per HARQ entity is specified in [2], clause 8. NB-IoT has one UL HARQ process.

When the physical layer is configured for uplink spatial multiplexing [2], there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

In asynchronous HARQ operation, a HARQ process is associated with a TTI based on the received UL grant except for UL grant in RAR. Except for NB-IoT, each asynchronous HARQ process is associated with a HARQ process identifier. For UL transmission with UL grant in RAR, HARQ process identifier 0 is used. HARQ feedback is not applicable for asynchronous UL HARQ.

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle. TTI bundling is not supported when the MAC entity is configured with one or more SCells with configured uplink.

Uplink HARQ operation is asynchronous for serving cells operating according to Frame Structure Type 3, NB-IoT UEs, BL UEs or UEs in enhanced coverage except for the repetitions within a bundle.

For NB-IoT UEs, BL UEs or UEs in enhanced coverage, the parameter UL_REPETITION_NUMBER provides the number of transmission repetitions within a bundle. For each bundle, UL_REPETITION_NUMBER is set to a value provided by lower layers. Bundling operation relies on the HARQ entity for invoking the same HARQ process for each transmission that is part of the same bundle. Within a bundle HARQ retransmissions are non-adaptive and are triggered without waiting for feedback from previous transmissions according to UL_REPETITION_NUMBER. An uplink grant corresponding to a new transmission or a retransmission of the bundle is only received after the last repetition of the bundle. A retransmission of a bundle is also a bundle.

TTI bundling is not supported for RN communication with the E-UTRAN in combination with an RN subframe configuration.

For transmission of Msg3 during Random Access (see subclause 5.1.5) TTI bundling does not apply. For NB-IoT UEs, BL UEs or UEs in enhanced coverage, uplink repetition bundling is used for transmission of Msg3.

For each TTI, the HARQ entity shall:
 identify the HARQ process(es) associated with this TTI, and for each identified HARQ process:
  if an uplink grant has been indicated for this process and this TTI:
   if the received grant was not addressed to a Temporary C-RNTI on PDCCH and if the NDI provided in the associated HARQ information has been toggled compared to the value in the previous transmission of this HARQ process; or
   if the uplink grant was received on PDCCH for the C-RNTI and the HARQ buffer of the identified process is empty; or
   if the uplink grant was received in a Random Access Response:
    if there is a MAC PDU in the Msg3 buffer and the uplink grant was received in a Random Access Response:
     obtain the MAC PDU to transmit from the Msg3 buffer.
    else if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK:
     instruct the identified HARQ process to generate a non-adaptive retransmission.
    else:
     obtain the MAC PDU to transmit from the "Multiplexing and assembly" entity, if any;
    if a MAC PDU to transmit has been obtained:
     deliver the MAC PDU and the uplink grant and the HARQ information to the identified HARQ process;
     instruct the identified HARQ process to trigger a new transmission.
    else:
     deliver the uplink grant and the HARQ information (redundancy version) to the identified HARQ process;
     instruct the identified HARQ process to generate an adaptive retransmission.
  else, if the HARQ buffer of this HARQ process is not empty:
   instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

For synchronous HARQ, each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4. For BL UEs or UEs in enhanced coverage see subclause 8.6.1 in [2] for the sequence of redundancy versions and redundancy version determination. For NB-IoT UEs see subclause 16.5.1.2 in [2] for the sequence of redundancy versions and redundancy version determination.

For NB-IoT UEs, BL UEs or UEs in enhanced coverage for UL_REPETITION_NUMBER for Mode B operation, the same redundancy version is used multiple times before cycling to the next redundancy version as specified in Subclause 16.5.1.2, 8.6.1 and 7.1.7.1 in [2].

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

For synchronous HARQ, the MAC entity is configured with a maximum number of HARQ transmissions and a maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall:
 set HARQ_FEEDBACK to the received value.

If the HARQ entity requests a new transmission, the HARQ process shall:
 if UL HARQ operation is synchronous:
  set CURRENT_TX_NB to 0;
  set HARQ_FEEDBACK to NACK;

set CURRENT_IRV to 0;
else:
  set CURRENT_IRV to the index corresponding to the redundancy version value provided in the HARQ information, except for BL UEs and for UEs in enhanced coverage and for NB-IoT UEs (as described above);
store the MAC PDU in the associated HARQ buffer;
store the uplink grant received from the HARQ entity;
generate a transmission as described below.
If the HARQ entity requests a retransmission, the HARQ process shall:
  if UL HARQ operation is synchronous:
    increment CURRENT_TX_NB by 1;
  if the HARQ entity requests an adaptive retransmission:
    store the uplink grant received from the HARQ entity;
    set CURRENT_IRV to the index corresponding to the redundancy version value provided in the HARQ information;
    if UL HARQ operation is synchronous:
      set HARQ_FEEDBACK to NACK;
    generate a transmission as described below.
  else if the HARQ entity requests a non-adaptive retransmission:
    if UL HARQ operation is asynchronous or HARQ_FEEDBACK=NACK:
      generate a transmission as described below.
  NOTE: When receiving a HARQ ACK alone, the MAC entity keeps the data in the HARQ buffer.
  NOTE: When no UL-SCH transmission can be made due to the occurrence of a measurement gap or a Sidelink Discovery Gap for Transmission, no HARQ feedback can be received and a non-adaptive retransmission follows.
  NOTE: For asynchronous HARQ operation, UL retransmissions are triggered only by adaptive retransmission grants, except for retransmissions within a bundle.
To generate a transmission, the HARQ process shall:
  if the MAC PDU was obtained from the Msg3 buffer; or
  if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
  if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is no Sidelink Discovery Gap for Transmission in this TTI; or
  if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is a Sidelink Discovery Gap for Transmission, and there is no configured grant for transmission on SL-DCH in this TTI:
    instruct the physical layer to generate a transmission according to the stored uplink grant with the redundancy version corresponding to the CURRENT_IRV value;
    increment CURRENT_IRV by 1;
    if UL HARQ operation is synchronous and there is a measurement gap or Sidelink Discovery Gap for Reception at the time of the HARQ feedback reception for this transmission and if the MAC PDU was not obtained from the Msg3 buffer:
      set HARQ_FEEDBACK to ACK at the time of the HARQ feedback reception for this transmission.
After performing above actions, if UL HARQ operation is synchronous the HARQ process then shall:
  if CURRENT_TX_NB=maximum number of transmissions−1:
    flush the HARQ buffer;

5.4.3 Multiplexing and Assembly
5.4.3.1 Logical Channel Prioritization

The Logical Channel Prioritization procedure is applied when a new transmission is performed.

RRC controls the scheduling of uplink data by signaling for each logical channel: priority where an increasing priority value indicates a lower priority level, prioritisedBitRate which sets the Prioritized Bit Rate (PBR), bucketSizeDuration which sets the Bucket Size Duration (BSD). For NB-IoT, prioritisedBitRate, bucketSizeDuration and the corresponding steps of the Logical Channel Prioritisation procedure (i.e., Step 1 and Step 2 below) are not applicable.

The MAC entity shall maintain a variable Bj for each logical channel j. Bj shall be initialized to zero when the related logical channel is established, and incremented by the product PBR x TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR x BSD, where PBR and BSD are configured by upper layers.

The MAC entity shall perform the following Logical Channel Prioritization procedure when a new transmission is performed:
  The MAC entity shall allocate resources to the logical channels in the following steps:
    Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
    Step 2: the MAC entity shall decrement Bj by the total size of MAC SDUs served to logical channel j in Step 1;
    NOTE: The value of Bj can be negative.
    Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
  The UE shall also follow the rules below during the scheduling procedures above:
    the UE should not segment an RLC SDU (or partially transmitted SDU or retransmitted RLC PDU) if the whole SDU (or partially transmitted SDU or retransmitted RLC PDU) fits into the remaining resources of the associated MAC entity;
    if the UE segments an RLC SDU from the logical channel, it shall maximize the size of the segment to fill the grant of the associated MAC entity as much as possible;
    the UE should maximise the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);

for transmissions on serving cells operating according to Frame Structure Type 3, the MAC entity shall only consider logical channels for which laa-Allowed has been configured.

The MAC entity shall not transmit data for a logical channel corresponding to a radio bearer that is suspended (the conditions for when a radio bearer is considered suspended are defined in [8]).

If the MAC PDU includes only the MAC CE for padding BSR or periodic BSR with zero MAC SDUs and there is no aperiodic CSI requested for this TTI [2], the MAC entity shall not generate a MAC PDU for the HARQ entity in the following cases:

in case the MAC entity is configured with skipUplinkTx-Dynamic and the grant indicated to the HARQ entity was addressed to a C-RNTI; or in case the MAC entity is configured with skipUplinkTx-SPS and the grant indicated to the HARQ entity is a configured uplink grant;

For the Logical Channel Prioritization procedure, the MAC entity shall take into account the following relative priority in decreasing order:

MAC control element for C-RNTI or data from UL-CCCH;

MAC control element for SPS confirmation;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for BSR included for padding;

MAC control element for Sidelink BSR included for padding.

NOTE: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

5.4.3.2 Multiplexing of MAC Control Elements and MAC SDUs

The MAC entity shall multiplex MAC control elements and MAC SDUs in a MAC PDU according to subclauses 5.4.3.1 and 6.1.2.

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signaling logicalChannelGroup which allocates the logical channel to an LCG [8].

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

For Regular BSR:

if the BSR is triggered due to data becoming available for transmission for a logical channel for which logicalChannelSR-ProhibitTimer is configured by upper layers:

start or restart the logicalChannelSR-ProhibitTimer;

else:

if running, stop the logicalChannelSR-ProhibitTimer.

For Regular and Periodic BSR:

if more than one LCG has data available for transmission in the TTI where the BSR is transmitted: report Long BSR;

else report Short BSR.

For Padding BSR:

if the number of padding bits is equal to or larger than the size of the Short BSR plus its subheader but smaller than the size of the Long BSR plus its subheader:

if more than one LCG has data available for transmission in the TTI where the BSR is transmitted: report Truncated BSR of the LCG with the highest priority logical channel with data available for transmission;

else report Short BSR.

else if the number of padding bits is equal to or larger than the size of the Long BSR plus its subheader, report Long BSR.

If the Buffer Status reporting procedure determines that at least one BSR has been triggered and not cancelled:

if the MAC entity has UL resources allocated for new transmission for this TTI:

instruct the Multiplexing and Assembly procedure to generate the BSR MAC control element(s);

start or restart periodicBSR-Timer except when all the generated BSRs are Truncated BSRs;

start or restart retxBSR-Timer.

else if a Regular BSR has been triggered and logicalChannelSR-ProhibitTimer is not running:

if an uplink grant is not configured or the Regular BSR was not triggered due to data becoming available for transmission for a logical channel for which logical channel SR masking (logicalChannelSR-Mask) is setup by upper layers:
   a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR, except for NB-IoT. A Padding BSR is triggered for a specific MAC PDU only and the trigger is cancelled when this MAC PDU has been built.

5.10 Semi-Persistent Scheduling

When Semi-Persistent Scheduling is enabled by RRC, the following information is provided [8]:

Semi-Persistent Scheduling C-RNTI;
   Uplink Semi-Persistent Scheduling interval semiPersistSchedIntervalUL and number of empty transmissions before implicit release implicitReleaseAfter, if Semi-Persistent Scheduling is enabled for the uplink;
   Whether twoIntervalsConfig is enabled or disabled for uplink, only for TDD;
   Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the SpCell only.

Semi-Persistent Scheduling is not supported for RN communication with the E-UTRAN in combination with an RN subframe configuration.

NOTE: When eIMTA is configured for the SpCell, if a configured uplink grant or a configured downlink assignment occurs on a subframe that can be reconfigured through eIMTA L1 signaling, then the UE behaviour is left unspecified.

5.10.1 Downlink

After a Semi-Persistent downlink assignment is configured, the MAC entity shall consider sequentially that the $N^{th}$ assignment occurs in the subframe for which:

$$(10*SFN+\text{subframe}) = [(10*SFN_{start\ time} + \text{subframe}_{start\ time}) + N*\text{semiPersistSchedIntervalDL}]\ \text{modulo}\ 10240.$$

Where $SFN_{start\ time}$ and $\text{subframe}_{start\ time}$ are the SFN and subframe, respectively, at the time the configured downlink assignment were (re-)initialised.

For BL UEs or UEs in enhanced coverage $SFN_{start\ time}$ and $\text{subframe}_{start\ time}$ refer to SFN and subframe of the first transmission of PDSCH where configured downlink assignment was (re-)initialized.

5.10.2 Uplink

After a Semi-Persistent Scheduling uplink grant is configured, the MAC entity shall:
   if twoIntervalsConfig is enabled by upper layer:
     set the Subframe_Offset according to Table 7.4-1.
   else:
     set Subframe_Offset to 0.
   consider sequentially that the $N^{th}$ grant occurs in the subframe for which:

$$(10*SFN+\text{subframe}) = [(10*SFN_{start\ time} + \text{subframe}_{state\ time}) + N*\text{semiPersistSchedIntervalUL} + \text{Subframe\_Offset}*(N\ \text{modulo}\ 2)]\ \text{modulo}\ 10240.$$

Where $SFN_{state\ time}$ and $\text{subframe}_{start\ time}$ are the SFN and subframe, respectively, at the time the configured uplink grant were (re-)initialised.

For TDD, the MAC entity is configured with semiPersistSchedIntervalUL shorter than 10 subframes, the $N^{th}$ grant shall be ignored if it occurs in a downlink subframe or a special subframe.

If the MAC entity is not configured with skipUplinkTx-SPS, the MAC entity shall clear the configured uplink grant immediately after implicitReleaseAfter [8] number of consecutive new MAC PDUs each containing zero MAC SDUs have been provided by the Multiplexing and Assembly entity, on the Semi-Persistent Scheduling resource.

If SPS confirmation has been triggered and not cancelled:
     if the MAC entity has UL resources allocated for new transmission for this TTI:
       instruct the Multiplexing and Assembly procedure to generate an SPS confirmation MAC Control Element as defined in subclause 6.1.3.11;
       cancel the triggered SPS confirmation.

The MAC entity shall clear the configured uplink grant immediately after first transmission of SPS confirmation MAC Control Element triggered by the SPS release.

* NOTE: Retransmissions for Semi-Persistent Scheduling can continue after clearing the configured uplink grant.

For BL UEs or UEs in enhanced coverage $SFN_{start\ time}$ and $\text{subframe}_{start\ time}$ refer to SFN and subframe of the first transmission of PUSCH where configured uplink grant was (re-)initialized.

5.13 Activation/Deactivation of SCells

If the MAC entity is configured with one or more SCells, the network may activate and deactivate the configured SCells. The SpCell is always activated. The network activates and deactivates the SCell(s) by sending the Activation/Deactivation MAC control element described in subclause 6.1.3.8. Furthermore, the MAC entity maintains a sCellDeactivationTimer timer per configured SCell (except the SCell configured with PUCCH, if any) and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

The MAC entity shall for each TTI and for each configured SCell:
- if the MAC entity receives an Activation/Deactivation MAC control element in this TTI activating the SCell, the MAC entity shall in the TTI according to the timing defined in [2]:
  - activate the SCell; i.e. apply normal SCell operation including:
    - SRS transmissions on the SCell;
    - CQI/PMI/RI/PTI/CRI reporting for the SCell;
    - PDCCH monitoring on the SCell;
    - PDCCH monitoring for the SCell;
    - PUCCH transmissions on the SCell, if configured.
  - start or restart the sCellDeactivationTimer associated with the SCell;
  - trigger PHR according to subclause 5.4.6.
- else, if the MAC entity receives an Activation/Deactivation MAC control element in this TTI deactivating the SCell; or
- if the sCellDeactivationTimer associated with the activated SCell expires in this TTI:
  - in the TTI according to the timing defined in [2]:
    - deactivate the SCell;
    - stop the sCellDeactivationTimer associated with the SCell;
    - flush all HARQ buffers associated with the SCell.
- if PDCCH on the activated SCell indicates an uplink grant or downlink assignment; or
- if PDCCH on the Serving Cell scheduling the activated SCell indicates an uplink grant or a downlink assignment for the activated SCell:
  - restart the sCellDeactivationTimer associated with the SCell;
- if the SCell is deactivated:
  - not transmit SRS on the SCell;
  - not report CQI/PMI/RI/PTI/CRI for the SCell;
  - not transmit on UL-SCH on the SCell;
  - not transmit on RACH on the SCell;
  - not monitor the PDCCH on the SCell;
  - not monitor the PDCCH for the SCell;
  - not transmit PUCCH on the SCell.

HARQ feedback for the MAC PDU containing Activation/Deactivation MAC control element shall not be impacted by PCell interruption due to SCell activation/deactivation [9].

NOTE: When SCell is deactivated, the ongoing Random Access procedure on the SCell, if any, is aborted.

The Configuration of logical channel controlled by RRC is described in 3GPP TS36.331 V14.1.0 as quoted in the following:

LogicalChannelConfig

The IE LogicalChannelConfig is used to configure the logical channel parameters.

| LogicalChannelConfig information element |
| --- |
| -- ASN1START |
| LogicalChannelConfig ::=        SEQUENCE { |
|     ul-SpecificParameters         SEQUENCE { |
|         priority                          INTEGER (1..16), |
|         prioritisedBitRate                ENUMERATED { |
|             kBps0, kBps8, kBps16, kBps32, kBps64, kBps128, |
|             kBps256, infinity, kBps512-v1020, kBps1024-v1020, |
|             kBps2048-v1020, spare5, spare4, spare3, spare2, |
|             spare1}, |
|         bucketSizeDuration                ENUMERATED { |
|             ms50, ms100, ms150, ms300, ms500, ms1000, spare2, |
|             spare1}, |
|         logicalChannelGroup               INTEGER (0..3)           OPTIONAL    -- Need OR |
|     }                                 OPTIONAL,                                        -- Cond UL |
|     ..., |
|     [[ logicalChannelSR-Mask-r9       ENUMERATED {setup}  OPTIONAL   -- Cond SRmask |
|     ]], |
|     [[ logicalChannelSR-Prohibit-r12   BOOLEAN             OPTIONAL   -- Need ON |
|     ]], |
|     [[ laa-Allowed-r14                 BOOLEAN             OPTIONAL   -- Need ON |
|     ]] |
| } |
| -- ASN1STOP |

| LogicalChannelConfig field descriptions |
| --- |
| bucketSizeDuration |
| Bucket Size Duration for logical channel prioritization in TS 36.321 [6]. Value in milliseconds. Value ms 50 corresponds to 50 ms, ms 100 corresponds to 100 ms and so on. |
| laa-Allowed |
| Indicates whether the data of a logical channel is allowed to be transmitted via UL of LAA SCells. Value TRUE indicates that the logical channel is allowed to be sent via UL of LAA SCells. Value FALSE indicates that the logical channel is not allowed to be sent via UL of LAA SCells. |
| logicalChannelGroup |
| Mapping of logical channel to logical channel group for BSR reporting in TS 36.321 [6]. |
| logicalChannelSR-Mask |
| Controlling SR triggering on a logical channel basis when an uplink grant is configured. See TS 36.321 [6]. |
| logicalChannelSR-Prohibit |
| Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6]. |
| prioritisedBitRate |

| LogicalChannelConfig field descriptions |
| --- |
| Prioritized Bit Rate for logical channel prioritization in TS 36.321 [6]. Value in kilobytes/second. Value kBps 0 corresponds to 0 kB/second, kBps 8 corresponds to 8 kB/second, kBps 16 corresponds to 16 kB/second and so on. Infinity is the only applicable value for SRB1 and SRB2 priority |
| Logical channel priority in TS 36.321 [6]. Value is an integer. |

| Conditional presence | Explanation |
| --- | --- |
| SRmask | The field is optionally present if ul-SpecificParameters is present, need OR; otherwise it is not present. |
| UL | The field is mandatory present for UL logical channels; otherwise it is not present. |

3GPP R2-1702642 discussed duplication activation as follows:

2.1 Duplication Activation

According to existing procedures, PDCP normally delivers PDUs for transmission to lower layers [36.323]:

5.1.1 UL Data Transfer Procedures

At reception of a PDCP SDU from upper layers, the UE shall:

start the discardTimer associated with this PDCP SDU (if configured);

For a PDCP SDU received from upper layers, the UE shall:

associate the PDCP SN corresponding to Next_PDCP_TX_SN to this PDCP SDU;

perform header compression of the PDCP SDU (if configured) as specified in the subclause 5.5.4;

perform integrity protection (if applicable), and ciphering (if applicable) using COUNT based on TX_HFN and the PDCP SN associated with this PDCP SDU as specified in the subclause 5.7 and 5.6, respectively;

increment Next_PDCP_TX_SN by one;

if Next_PDCP_TX_SN>Maximum_PDCP_SN:

set Next_PDCP_TX_SN to 0;

increment TX_HFN by one;

submit the resulting PDCP Data PDU to lower layer.

When re-establishment occurs, PDCP re-submits for transmission to lower layers, all SDUs for which the successful delivery has not been confirmed:

5.2.1.1 Procedures for DRBs mapped on RLC AM

When upper layers request a PDCP re-establishment, the UE shall:

reset the header compression protocol for uplink (if configured);

apply the ciphering algorithm and key provided by upper layers during the re-establishment procedure;

from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:

perform header compression of the PDCP SDU (if configured) as specified in the subclause 5.5.4;

perform ciphering of the PDCP SDU using the COUNT value associated with this PDCP SDU as specified in the subclause 5.6;

submit the resulting PDCP Data PDU to lower layer.

This guarantees lossless delivery when lower layers are re-established e.g. during handover.

In addition, for dual connectivity, a PDCP data recovery procedure (which retransmits all PDUs for which the successful delivery has not been confirmed by lower layers) is triggered [36.323] [36.331] for split bearer, also to guarantee lossless delivery when lower layers are re-established e.g. during SCG change, or SCG release:

5.9 PDCP Data Recovery Procedure

When upper layers request a PDCP Data Recovery for a radio bearer, the UE shall:

if the radio bearer is configured by upper layers to send a PDCP status report in the uplink (statusReportRequired [3]), compile a status report as described in subclause 5.3.1, and submit it to lower layers as the first PDCP PDU for the transmission;

perform retransmission of all the PDCP PDUs previously submitted to re-established AM RLC entity in ascending order of the associated COUNT values from the first PDCP PDU for which the successful delivery has not been confirmed by lower layers.

After performing the above procedures, the UE shall follow the procedures in subclause 5.1.1.

5.3.10.10 SCG Reconfiguration

The UE shall:
1> if the received scg-Configuration is set to release or includes the mobilityControlInfoSCG (i.e. SCG release/ change):
2> if mobilityControlInfo is not received (i.e. SCG release/ change without HO):
3> reset SCG MAC, if configured;
3> for each drb-Identity value that is part of the current UE configuration:
4> if the DRB indicated by drb-Identity is an SCG DRB:
5> re-establish the PDCP entity and the SCG RLC entity or entities;
4> if the DRB indicated by drb-Identity is a split DRB:
5> petfortn PDCP data recovery and re-establish the SCG RLC entity;
4> if the DRB indicated by drb-Identity is an MCG DRB; and
4> drb-ToAddModListSCG is received and includes the drb-Identity value, while for this entry drb-Type is included and set to scg (i.e. MCG to SCG):
5> re-establish the PDCP entity and the MCG RLC entity or entities;
3> configure lower layers to consider the SCG SCell(s), except for the PSCell, to be in deactivated state;

The procedures above do not take the occurrence of duplicates into account. That is, when a leg is reconfigured and the lower layers of that leg are re-established, PDCP will try to retransmit all the PDCP PDUs of the leg, from the first PDCP SDU for which the successful delivery of the corresponding PDCP PDU has not been confirmed by lower layers, perform retransmission or transmission. If any of those PDUs are duplicates, there is no guarantee that they will end up on a different leg than the original PDUs. Another problem is the activation of PDCP PDU duplication: this feature is activated when more reliability is needed for the transmission, in case for example of bad radio conditions. If nothing specific is done, only the new PDU scheduled for transmission will be duplicated and the PDU that are already sent to lower layers will not be duplicated.

For AM mode, this would mean that the PDU awaiting in the buffers will not benefit from duplication although the radio conditions are already bad and would require duplication. We therefore propose that when PDCP PDU duplication is activated for the first time on existing legs or when a leg is added and PDCP PDU duplication is already enabled, the PDCP layer sends for transmission to lower layers the PDU that have been sent for transmission to one leg, (and not acknowledged) to the other leg. In other words, in addition to applying duplication to new PDCP PDUs, it is proposed to also duplicate PDCP PDUs that are still in the buffers awaiting acknowledgment from lower layers. This requires the transmitter to keep track of which PDU have been sent on which leg in order to guarantee that duplicates are sent on a different leg always.

Proposal 1: for AM mode, the activation of duplication applies to new PDCP PDUs and PDCP PDUs that are still in the buffers awaiting acknowledgment from lower layers.

For UM mode, there is no confirmation of the transmission of the Packets from RLC. But if we apply the same principle, when duplication is activated or when a new leg is added while duplication is activated, PDCP sends for transmission as duplicates some of the PDU that have been sent before the event. This could be for example the N last transmitted PDCP PDU.

Proposal 2: for UM mode, the activation of duplication applies to new PDCP PDUs and last N transmitted PDCP PDUs.

2.2 Duplication Success

Furthermore, when PDCP is informed of the reception of a duplicate via one leg, transmitting the duplicate via the other leg becomes a waste of resources. Thus, we propose that upon indication from any of the leg that a PDCP PDU has been correctly transmitted, PDCP should instruct the other legs not to transmit the other duplicates. The easiest way to perform such an action would be to rely on PDCP discard, which currently informs the corresponding RLC entity not to transmit the packet. In other words, indication of correct transmission via any of the legs, will trigger PDCP to signal a PDCP PDU discard to all the other legs.

Proposal 3: when PDCP is informed of the reception of a duplicate via one leg, the corresponding outdated duplicates are discarded on the other legs.

The following terminology may be used in the specification.

TRP: a transmission and reception point provides network coverage and directly communicates with UEs. TRP could also be referred to as distributed unit (DU). A TRP may use one or multiple beams to serve each UE.

Cell: a cell may contain one or multiple associated TRPs, i.e. coverage of the cell contains coverage of all associated TRP(s). One cell is controlled by one BS. Cell could also be referred to as TRP group (TRPG).

Original data: In mechanism of data duplication, data would be duplicated to two equivalent data, one is original data and the other is duplicate data. Original data is data which is not duplicated. Original data is used to duplicate. A logical channel used to transmit original data could be different from a logical channel used to transmit duplicate data. The cell(s)/TRP(s)/beam(s) used to handle transmission of original data may be different from the cell(s)/TRP(s)/beam(s) used to handle transmission of duplicate data.

Duplicate data: In mechanism of data duplication, data would be duplicated to two equivalent data, one is original data and the other is duplicate data. Duplicate data is data which is duplicated from original data. A logical channel used to transmit duplicate data could be different from a logical channel used to transmit original data. The cell(s)/TRP(s)/beam(s) used to handle transmission of duplicate data may be different from the cell(s)/TRP(s)/beam(s) used to handle transmission of original data.

Figure 14:
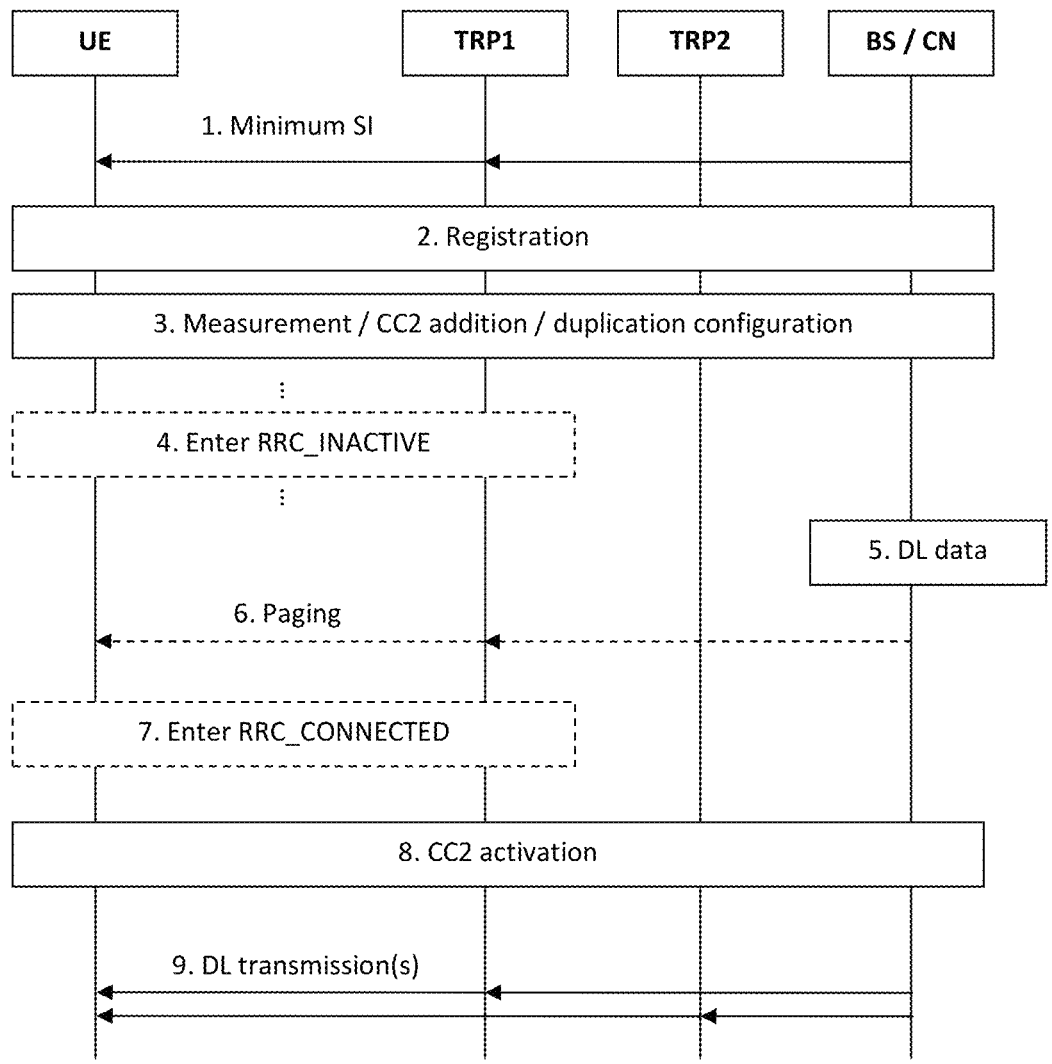
FIG. 14 is a flow chart illustrating one exemplary service flow.

In one scenario, it is assumed that TRP1 is controlled by a first cell and TRP2 is controlled by a second cell. Both the first cell and the second cell are controlled by a Base Station (BS). The first cell could be associated with a first component carrier (i.e. CC1). The second cell could be associated with a second component carrier (i.e. CC2). The service flow could be illustrated in FIG. 14 and described below:

Step 1. When the UE is powered on, it performs cell selection and then camps on a serving cell. The UE receives the Minimum SI from a BS of the serving cell. The serving cell could be a first cell controlled by the BS. The first cell is associated with component carrier #1 (CC1). The UE may receive the Minimum SI via TRP1. The TRP1 belongs to the first cell.

Step 2. The UE performs an initial attach to the network and enters RRC_CONNECTED, and the related registration and authorization/authentication could be completed.

Step 3. The BS may configure the UE to measure a second cell. The UE may measure on the second cell and report result of measurement to the BS. Based on the measurement report, the BS may configure the UE with CC2. In addition, the BS may configure the UE with a duplication configuration.

Step 4. The BS may send a RRC state change command to transition the UE from RRC_CONNECTED to RRC_INACTIVE, e.g., the UE may not have any ongoing unicast services.

Step 5. The BS receives a data, which is to send to the UE, from the core network (e.g., S-GW).

Step 6. The BS may send a signaling to page the UE.

Step 7. The UE enters RRC_CONNECTED.

Step 8. The BS activates CC2 on the UE.

Step 9. The UE receives DL data via CC1 and CC2 from the BS. Retransmission of the DL data may occur on CC1 and/or CC2.

Figure 15:
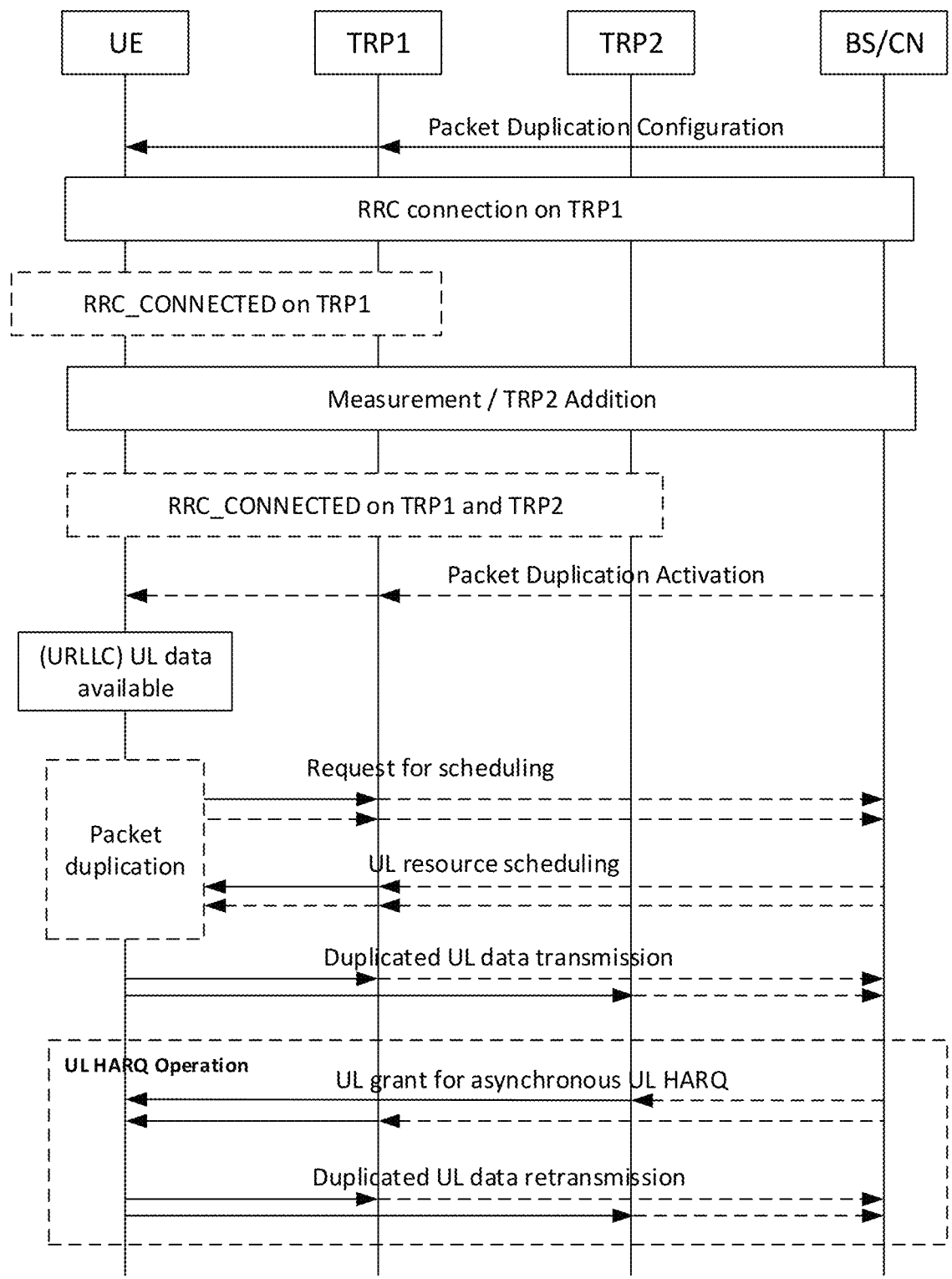
FIG. 15 is a flow chart illustrating one exemplary service flow.

In one scenario, it is assumed that TRP1 is controlled by a first cell and TRP2 is controlled by a second cell. Both the first cell and the second cell are controlled by a BS. The first cell could be associated with a first component carrier (i.e. CC1). The second cell could be associated with a second component carrier (i.e. CC2). The service flow could be illustrated in FIG. 15 and described below:

Packet Duplication Configuration

Packet duplication configuration could be transmitted in the system information or be transmitted anytime via RRC signaling. Packet Duplication configuration may be related to UE capability.

RRC Connection on TRP1

The UE performs a Random Access Channel (RACH) procedure to attach TRP1 within the first cell, then to enter a RRC_CONNECTED state. It is assumed that the first cell is a primary cell.

Measurement/TRP2 (CC2) Addition

For some conditions (e.g., UL/DL data transmission is overload or for packet duplication usage), TRP2 within the second cell would be added based on the measurement. The UE may perform a RACH procedure to attach TRP2, and TRP2 is activated to be available for data transmission for the UE.

Packet Duplication Activation

Request for scheduling

Basically, the UE performs a Scheduling Request (SR)/Buffer Status Report (BSR) procedure to request a transmission resource.

Transmission Resource Scheduling

The BS allocates a transmission resource for the UE. The BS may transmit an UL grant via one TRP or both TRPs.

Duplicated UL Data Transmission

The UE transmits duplicated UL data to two TRPs.

UL HARQ Operation

New RAT (NR) only may be supported by asynchronous HARQ operation in UL. If the BS needs the UE to retransmit UL data, the BS would transmit the UL grant for the UE.

Figure 16:
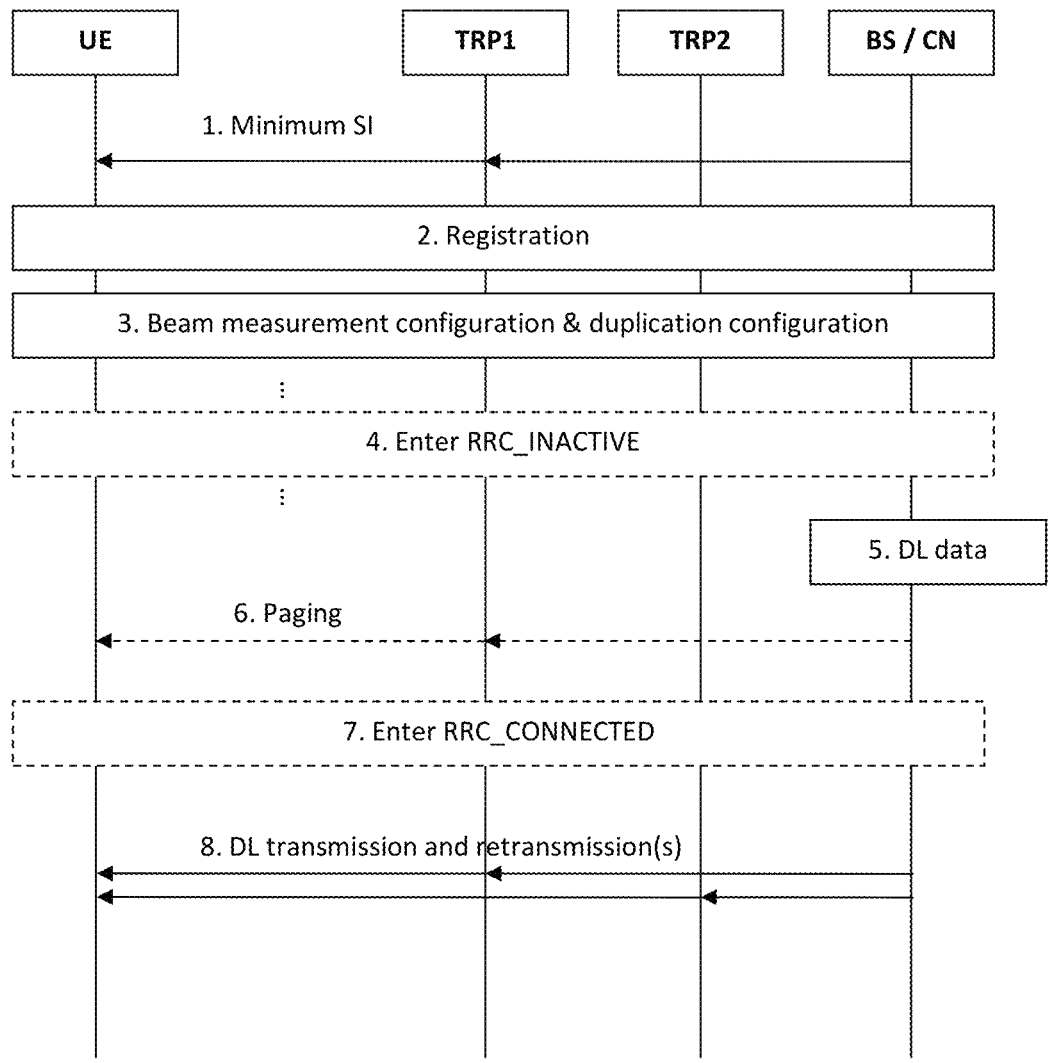
FIG. 16 is a flow chart illustrating one exemplary service flow.

In one scenario, it is assumed that TRP1 and TRP2 belong to the same cell. The cell is controlled by a BS. The UE may be served by one or multiple beams of the TRP1. The UE may be served by one or multiple beams of the TRP2. The service flow could be illustrated in FIG. 16 and described below:

Step 1. When the UE is powered on, it performs a cell selection and then camps on a serving cell. The UE receives Minimum SI from a BS of the serving cell. The UE may receive the Minimum SI via TRP1. The TRP1 may or may not be transparent to the UE.

Step 2. The UE performs an initial attach to the network based on the Minimum SI and enters RRC_CONNECTED, and the related registration and authorization/authentication could be completed. During the initial attach procedure, a default TRP beam of the TRP1 could be determined. During the initial attach procedure, a default UE beam could be determined.

Step 3. The BS may configure the UE to report beam measurement result. Based on the beam measurement report, the BS may consider to use both TRP1 and TRP2 to serve the UE. The BS may configure the UE to establish related data radio bearer, EPS bearer and/or logical channel. In addition, the BS may configure the UE with duplication configuration. Based on the duplication configuration, the UE establishes related logical channels for duplication reception.

Step 4. The BS may send a RRC state change command to transit the UE from RRC_CONNECTED to RRC_INACTIVE, (e.g. because the UE may not have any ongoing unicast services temporarily).

Step 5. The BS receives a data, which is to send to the UE, from the core network (e.g., S-GW).

Step 6. The BS may send a signaling to page the UE.

Step 7. The UE enters RRC_CONNECTED. The UE resumes the duplication configuration. The UE may perform a beam measurement and may report the beam measurement result to the BS. The BS may consider both TRP1 and TRP2 as still available on the UE.

Step 8. The UE receives DL data via any of the beam(s) of the TRP1 or the beam(s) of the TRP2 from the BS. Retransmission of the DL data may occur on any of the beam(s) of the TRP1 or the beam(s) of the TRP2.

Figure 17:
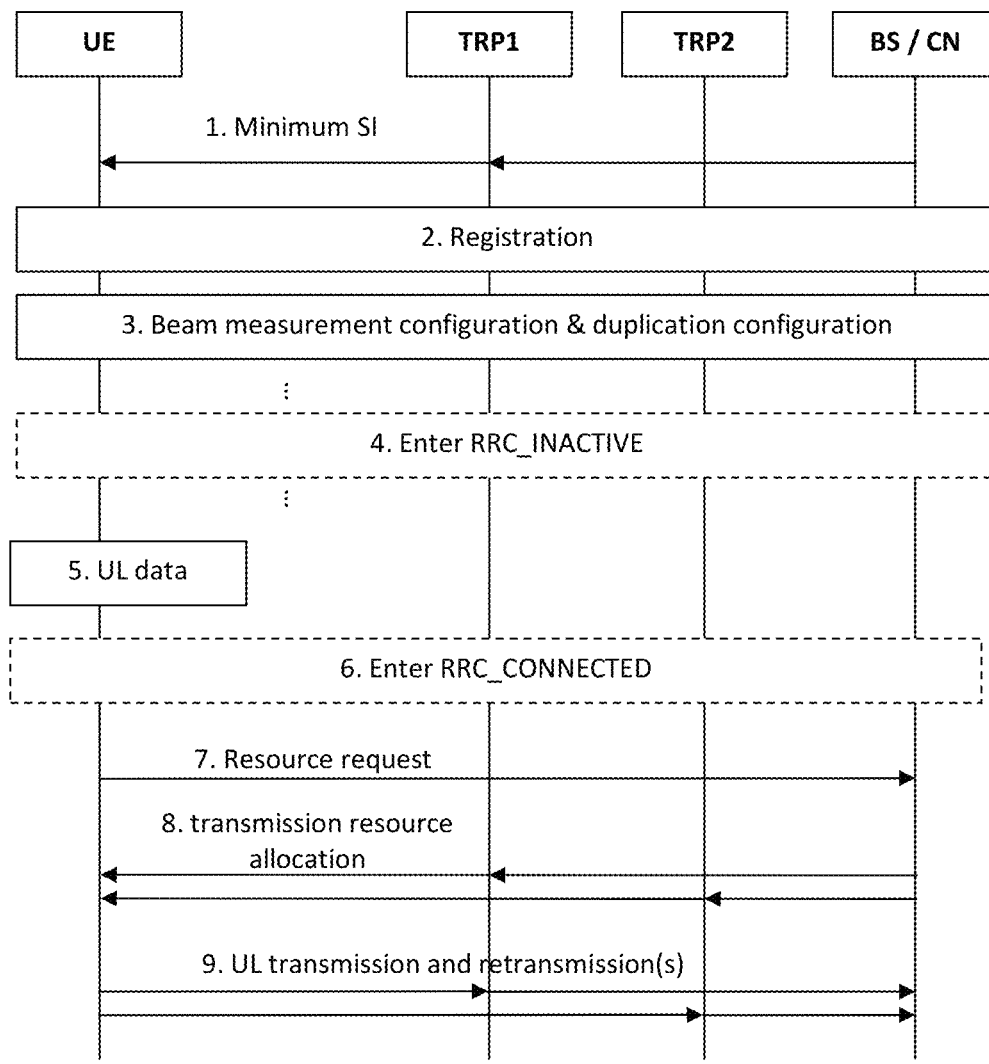
FIG. 17 is a flow chart illustrating one exemplary service flow.

In one scenario, it is assumed that TRP1 and TRP2 belong to same cell. The cell is controlled by a BS. The UE may be served by one or multiple beams of the TRP1. The UE may be served by one or multiple beams of the TRP2. The service flow could be illustrated in FIG. 17 and described below:

Step 1. When the UE is powered on, it performs a cell selection and then camps on a serving cell. The UE receives Minimum SI from a BS of the serving cell. The UE may receive the Minimum SI via TRP1. The TRP1 may or may not be transparent to the UE.

Step 2. The UE performs an initial attach to the network based on the Minimum SI and enters RRC_CONNECTED, and the related registration and authorization/authentication could be completed. During the initial attach procedure, a default TRP beam of the TRP1 could be determined. Alternatively, during the initial attach procedure, a default UE beam could be determined.

Step 3. The BS may configure the UE to report a beam measurement result. Based on the beam measurement report, the BS may consider using both TRP1 and TRP2 to serve the UE. The BS may configure the UE to establish a related data radio bearer, Evolved Packet System (EPS) bearer and/or logical channel. In addition, the BS may configure the UE with duplication configuration. Based on the duplication configuration, the UE establishes related logical channels for duplication reception.

Step 4. The BS may send a RRC state change command to transit the UE from RRC_CONNECTED to RRC_INACTIVE, (e.g., because the UE may not have any ongoing unicast services temporarily).

Step 5. The UE has data available for transmission.

Step 6. The UE may establish a RRC connection with the BS. The UE enters RRC_CONNECTED. The UE resumes the duplication configuration. The UE may perform a beam measurement and may report the beam measurement result to the BS. The BS may consider both TRP1 and TRP2 as still available on the UE.

Step 7. The UE transmits resource request to the BS for allocating transmission resources.

Step 8. The UE receives transmission resources from the BS.

Step 9. The UE uses the transmission resources to perform the UL transmission. The UL transmission may be via any of the beam(s) of the TRP1 or the beam(s) of the TRP2 from the BS. Retransmission of the UL data may occur on any of the beam(s) of the TRP1 or the beam(s) of the TRP2.

Figure 18:
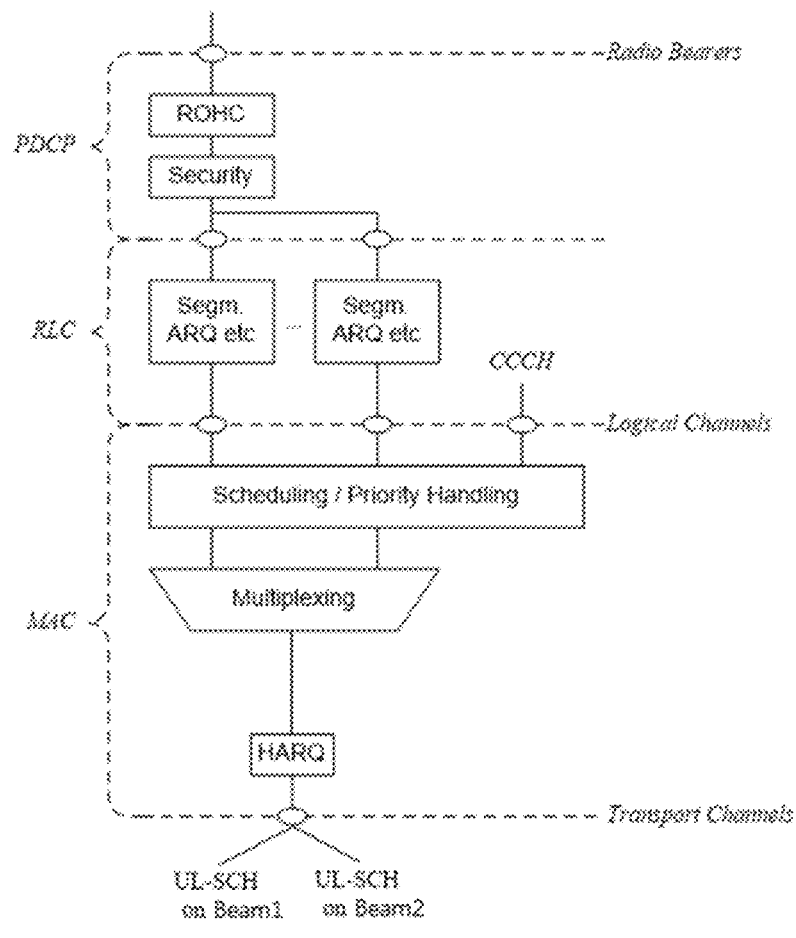
FIG. 18 is an exemplary embodiment of a UE stack model for duplication transmission.
Figure 19:
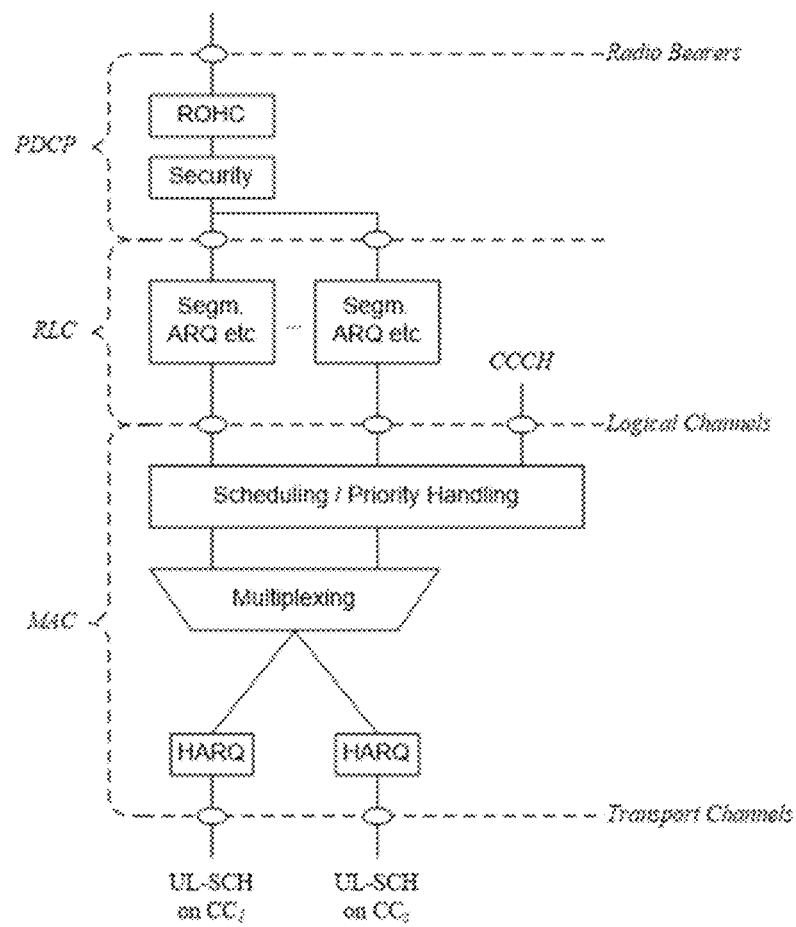
FIG. 19 an exemplary embodiment of a UE stack model for duplication transmission.

Duplicate data transmission via split radio bearer/logical channel and via different serving cells/TRPs/beams may be supported to provide diversity gain and increase reliability. In a NR system, a MAC entity may control transmission for different serving cells/TRPs/beams. Examples of UE stack models for duplication transmission (via any of CC(s) and/or beam(s)) are illustrated in FIGS. 18 and 19.

Data duplication is a mechanism used to boost transmission reliability since the data could be duplicated by a PDCP entity and transmitted on different Transport Blocks (TBs) to increase diversity gain. In some cases, data duplication is beneficial in the following examples: URLLC requirement cannot be fulfilled without data duplication, the channel qualities for both links (e.g., different cells) are bad (e.g., in cell edge), and overall channel occupancy is low. However, in other cases, data duplication may not be necessary as it would waste resources. As a consequence, activation/deactivation of data duplication is desirable. The decision whether to activate or deactivate data duplication may be controlled by the network (e.g., by RRC configuration, PDCP command, or MAC control element) or decided by the UE (e.g., an event trigger). Whether duplication is controlled by network or decided by UE, when the data duplication state is changed (e.g. data duplication is activated from deactivated state or data duplication is deactivated from an activated state), some mechanisms or procedures are required to react upon the change/update of the data duplication state. Normally, data duplication in an activated state may be one situation: upper layer data (e.g., PDCP PDUs) may be duplicated. However, data duplication in deactivated state may be achieved in two ways: (i) the upper layer data is not duplicated in the deactivated state or (ii) the upper layer data is duplicated in deactivated state. Data duplication in the deactivation state may be achieved by different methods. The details of such methods are disclosed in the following.

Duplicating PDCP PDU in Deactivation State

In this method, the UE may duplicate all PDCP PDU for a radio bearer if the UE is configured to use data duplication to serve the radio bearer. The UE may be configured to establish a first logical channel and a second logical channel for the radio bearer. Possibly, the first logical channel may be used for transmitting a packet on the radio bearer, and the second logical channel may be used for transmitting the duplicate of the packet. Alternatively, the first logical channel may be used for transmitting the duplicate of a packet on the radio bearer, and the second logical channel may be used for transmitting the packet. In addition, the UE may be configured with a first communication link and a second communication link for transmission of the data duplication. Furthermore, the UE may (be configured to) use the first communication link to serve the first logical channel and (be configured to) use the second communication link to serve the second logical channel. Each (first/second) communication link may be a component carrier/serving cell/TRP/serving beam/HARQ entity/HARQ process. The UE may establish a first Radio Link Control (RLC) entity used to serve the first logical channel and establish a second RLC entity used to serve the second logical channel. A Radio Resource Control (RRC) signaling or a Layer2 signaling may be used to control whether the UE serves the first logical channel or the second logical channel. The Layer2 signaling may be a PDCP control PDU or a MAC control element.

It is assumed that the UE is in deactivation state in the beginning. In the deactivation state, the second logical channel may be suspended due to the deactivation state. The first logical channel is not suspended whether or not it is in the activation state or the deactivation state. When a PDCP layer of the UE receives a packet from the upper layer (e.g., the application layer, TCP/IP layer, or the like), it may generate a PDCP PDU containing the packet and deliver the PDCP PDU into the first RLC entity and the second RLC entity. The PDCP layer may start a discardTimer associated with the packet. When the discardTimer expires, the PDCP layer may indicate to both the first RLC entity and the second RLC entity to discard the PDCP PDU containing the packet and/or any RLC PDU containing the PDCP PDU. In the deactivation state, the next generation Node B (gNB) may not schedule the UE to use the second communication link so that the UE would not serve the second logical channel for the transmission. In the deactivation state, the gNB may schedule the UE to use the second communication link, but the UE would not serve the second logical channel for transmission because the second logical channel is suspended. By this way, resource efficiency could be achieved because the resources would not be used for transmitting the second logical channel.

The gNB may transmit Layer2 signaling to the UE to switch from the deactivation state to the activation state. In the activation state, the UE may consider to not suspend the second logical channel. The gNB may schedule the UE to use the second communication link so that the UE would serve the second logical channel for transmission. By this way, resource efficiency would not be critical because the resources are used for transmitting the second logical channel in order to achieve the reliability requirement.

When receiving the Layer2 signaling for switching to activation state, the UE may perform re-establishment procedure for the second RLC entity. In the re-establishment procedure for the second RLC entity procedure, the UE may discard all PDCP PDUs (i.e., RLC SDUs) buffered in the second RLC entity. Besides, in the re-establishment procedure, the UE may duplicate/copy all PDCP PDUs (i.e., the RLC SDUs) buffered in the first RLC entity and deliver the PDCP PDUs (i.e., the RLC SDUs) duplicated from the first RLC entity into the second RLC entity. In the re-establishment procedure for the second RLC entity, discarding the PDCP PDUs (i.e., the RLC SDUs) buffered in the second RLC entity may be followed by duplicating the PDCP PDUs (i.e., the RLC SDUs) from the first RLC entity to the second RLC entity.

When receiving the Layer2 signaling for switching to the activation state, the UE does not perform the re-establishment procedure for the first RLC entity, (i.e., the UE does not discard all PDCP PDUs (i.e. RLC SDUs) buffered in the first RLC entity).

In case it needs to switch from activation state to deactivation state, the gNB may transmit the Layer2 signaling to the UE to switch from the activation state to the deactivation state. In the deactivation state, the gNB may not schedule the UE to use the second communication link so that the UE would not serve the second logical channel for transmission. In the deactivation state, the gNB may schedule the UE to use the second communication link, but the UE would not serve the second logical channel for transmission because the second logical channel is suspended. By this way, resource efficiency could be achieved because the resources would not be used for transmitting the second logical channel.

When receiving the Layer2 signaling for switching to the deactivation state, the UE may perform re-establishment procedure for the second RLC entity. In the re-establishment procedure for the second RLC entity, the UE may discard all PDCP PDUs (i.e., the RLC SDUs) buffered in the second RLC entity.

When receiving the Layer2 signaling for switching to the deactivation state, the UE does not perform re-establishment procedure for the first RLC entity, (i.e., the UE does not discard all PDCP PDUs (i.e., the RLC SDUs) buffered in the first RLC entity.

Data duplication may be achieved by reusing the PDCP split bearer architecture in LTE, so that the PDCP entity would duplicate the data and deliver the same PDCP PDUs via the split bearer. As mentioned above, the activation/deactivation of the data duplication is beneficial. Data duplication may be achieved by activating or deactivating the PDCP layer by a PDCP control command, (e.g., Activation/Deactivation corresponding indication(s) could be indicated via PDCP control PDU). For example, in FIG. 20, a new PDU type could be added for Data Duplication Activation/Deactivation. When the PDCP entity receives a PDCP control PDU, it includes the PDU type for Data Duplication Activation/Deactivation, and the PDCP entity has to enable/disable relevant functions (e.g., data could (or could not) be duplicated and/or transmitted via split bearer). In addition, data duplication associated timers (e.g., discardTimer) and/or parameters could be reset or set by the indication(s) of PDCP control command (e.g., PDCP control PDU).

On the other hand, when data duplication is in the deactivation state, the UE may only transmit the original data. In the event data duplication is needed, the network may transmit a PDCP control PDU to indicate to the UE to activate data duplication. In this case, the network could transmit the PDCP control PDU via different communication links to increase reliability (i.e., the PDCP control PDU could also be duplicated in case data duplication is switched from the deactivation state to the activation state). While the UE receives two of the PDCP control PDU, the UE could activate data duplication (and may ignore or discard the duplicated one).

Figures 20, 21:
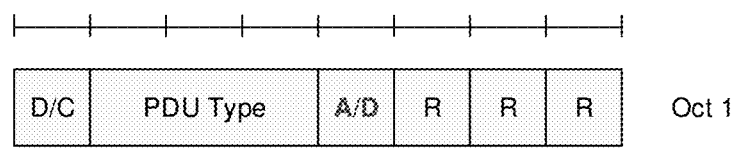
FIG. 20 is a table showing an exemplary embodiment of a PDU for data duplication activation or deactivation.
FIG. 21 illustrates an exemplary embodiment of a PDCP control PDU for data duplication activation or deactivation.

For example, FIG. 21 illustrates one example of a PDCP control PDU for data duplication. The PDCP control PDU for data duplication could contains an indication about data/control PDU, an indication about PDU type (for Data Duplication Activation/Deactivation), an indication indicates Activation or Deactivation, and/or other information related to data duplication. In this example, "activation/deactivation" means enable/disable. As shown in FIG. 21, "A/D" means Activation/Deactivation.

For each packet received from an upper layer (e.g., application layer, TCP/IP layer, or the like), the PDCP layer may deliver a PDCP PDU containing the packet into a RLC entity used for transmitting the original data of the packet and deliver the PDCP PDU containing the packet into a RLC entity used for transmitting the duplicate data of the packet.

Each RLC entity may be associated with a logical channel. For data duplication, there is a RLC entity used for serving a logical channel for transmitting the original data, and a RLC entity is used for serving a logical channel for transmitting the duplicate data. The logical channel for transmitting the original data and the logical channel for transmitting the duplicate data may be associated with a common/same radio bearer.

When the RLC entity used for serving the logical channel for transmitting duplicate data is indicated for performing a re-establishment procedure, the UE may discard all RLC SDUs (i.e. PDCP PDUs) buffered in the RLC entity for serving the logical channel for transmitting duplicate data.

When the RLC entity used for serving the logical channel for transmitting duplicate data is indicated for performing re-establishment procedure, the UE may discard each PDCP PDU (i.e., RLC SDU) if no segment of the RLC SDU has been mapped to a RLC PDU.

And then, all RLC SDUs (i.e. PDCP PDUs) buffered in the RLC entity for serving the logical channel for the original data may be duplicated/copied to the RLC entity for the logical channel for transmitting the duplicate data.

The RLC entity used for serving the logical channel for transmitting duplicate data may be indicated to trigger performing re-establishment procedure by the RRC layer, PDCP layer, MAC layer or physical layer. These alternatives may be applicable for AM RLC and UM RLC.

In a MAC entity, some mechanisms or procedures may be impacted when data duplication is activated/deactivated. The methods for solving impacts are divided into two cases in this specification, namely, Case 1 is for deactivation and Case 2 is for activation. Each case contains several bullets related to different mechanisms.

Case 1: When Data Duplication is Deactivated

The UE has to avoid allocating UL resources to the logical channel which is used to transmit duplicate data when data duplication is deactivated. For example, if the Logical Channel (LCH) used for transmitting duplicate data has data available for transmission, (e.g. PDCP entity is still duplicating PDCP PDUs and transmitting via both logical channels), one of these logical channels (e.g. for duplicate data transmission) could not be an allocated UL resource.

In one alternative, the LCH for duplicate data transmission may be prohibited/suspended when data duplication is deactivated. The LCH may be associated with a parameter (e.g., a flag). Whether to associate the LCH with the parameter may be configured by RRC signaling (e.g. LogicalChannelConfig). In addition, the network may use RRC signaling or Layer2 signaling to control the parameter to indicate the UE whether to prohibit/suspend the LCH for transmission. Alternatively, the parameter could be controlled by the UE, (e.g. the UE could change value of the parameter when the data duplication state changes).

In one embodiment, the logical channel for transmitting the original data may be associated with the parameter, and the network always controls the parameter in "not-prohibited" so that the UE serves the logical channel for transmitting the original data.

In one embodiment, the logical channel for transmitting the original data may not be associated with the parameter. A logical channel that is not associated with the parameter could mean that the logical channel would not be prohibited from transmission even if data duplication is in deactivation state.

In one embodiment, the logical channel for transmitting duplicate data may be associated with the parameter, and the parameter may be controlled by the network in need. More specifically, the logical channel for transmitting original data and the logical channel for transmitting duplicate data may be associated with a common/same radio bearer. When the logical channel for transmitting duplicate data is suspended/prohibited, the radio bearer associated with the logical channel for transmitting duplicate data may not be suspended/prohibited. If the radio bearer is suspended/prohibited for transmission, then both the logical channel for transmitting original data and the logical channel for transmitting duplicate data may be suspended/prohibited from transmission.

In another alternative, the priority of the LCH for duplicate data transmission could be deprioritized. If the LCH is deprioritized, the LCH would not be allocated UL resources until resources that are still remaining after data transmission are exhausted. If data of other LCHs which are not transmitting duplicate data is exhausted, and the UL resources are still remaining, these UL resources could be allocated for the LCH which is transmitting the duplicate data in order to avoid resources waste.

In one alternative, the HARQ buffer for duplicate data is flushed. If data duplication is deactivated and the HARQ buffer contains duplicate data, this HARQ buffer could be flushed since the duplicate data does not need to be transmitted/retransmitted.

In a second alternative, the HARQ entity for duplicate data transmission is released. If the HARQ entity is associated with (or configured for) duplicate data transmission, while data duplication is deactivated, the HARQ entity could be released since the HARQ entity may not be needed.

In a third alternative, the HARQ process for duplicate data transmission is released. If the HARQ process is associated with (or configured for) duplicate data transmission, while data duplication is deactivated, the HARQ process could be released since the HARQ entity may not be needed.

The BSR could be triggered to inform the network of an updated buffer status since a requirement of the UL resource is different from the activation state and the deactivation state. For example, when data duplication is deactivated, the amount of buffer size for the LCH which is transmitting duplicate data could be decreased or omitted. More specifically, the updated buffer status could only report the buffer status of the LCH(s) (or LCG(s)) which is/are used for data duplication.

The BSR may not take the LCH for transmitting duplicate data into account when data duplication is deactivated. The BSR may take the LCH for transmitting original data into account no matter whether data duplication is activated or deactivated.

In one embodiment, the logical channel for transmitting original data may be associated with the parameter (e.g., the above-mentioned flag), and the network may control the parameter in "not-prohibited" so that the UE reports the buffer status of the logical channel transmitting the original data in the BSR.

In one embodiment, the logical channel for transmitting original data may not be associated with the parameter. A logical channel not associated with the parameter would mean that the logical channel would not be prohibited from data transmission even if data duplication is in deactivation state. In this embodiment, the UE reports buffer status of that logical channel in the BSR.

In one embodiment, the logical channel for transmitting duplicate data may be associated with the parameter that is controlled by the network in need. If the parameter of the logical channel for transmitting duplicate data indicates that it is suspended/prohibited, the UE does not report buffer status of the logical channel for transmitting duplicate data in the BSR. More specifically, the logical channel for transmitting original data and the logical channel for transmitting duplicate data may be associated with a common/same radio bearer. When the logical channel for transmitting duplicate data is suspended/prohibited, the radio bearer associated with the logical channel for transmitting duplicate data may not suspended/prohibited. More specifically, if the radio bearer is suspended/prohibited for transmission, then both the logical channel for transmitting original data and the logical channel for transmitting duplicate data may be suspended/prohibited from data transmission. In that situation, the UE does not report buffer status of the logical channel for transmitting original data and the logical channel for transmitting duplicate data in the BSR.

When data duplication is deactivated, the corresponding beam/TRP/cell/gNB (used for duplicate data transmission) could be deactivated to save power. More specifically, the mechanism for deactivating data duplication is like Activation/Deactivation of SCells mechanism in LTE as disclosed in 3GPP TS 36.321 V14.0.0, Evolved Universal Terrestrial Radio Access (E-UTRA); Medium Access Control (MAC) protocol specification. In this embodiment, the network does not need to transmit Activation/Deactivation MAC Control Element. Other benefits also include reducing signaling overhead and delay.

With Semi-Persistent Scheduling (SPS), the UE has to clear the configured UL grant immediately since the configured uplink grant would not be utilized. If the configured UL grant is not cleared, the UL resource would be wasted.

Case 2: When Data Duplication is Activated

Logical Channel Prioritization (LCP) has to consider the logical channel which is used to transmit duplicate data when data duplication is activated.

In one alternative, if the LCH for duplicate data transmission is prohibited/suspended, the LCH has to be permitted (i.e. the LCH could not be prohibited). The network could configure a UE parameter (e.g., a flag) to represent whether the LCH is or is not prohibited. For example, the parameter could be indicated with LogicalChannelConfig via RRC signaling. Alternatively, the parameter could be controlled by the UE, e.g., the UE could change value of the parameter when data duplication is activated.

The LCH for duplicate data transmission may be prohibited/suspended when data duplication is deactivated. The LCH may be associated with a parameter (e.g. a flag). Whether to associate the LCH with the parameter may be configured by RRC signaling (e.g. LogicalChannelConfig). In addition, the network may use RRC signaling or Layer2 signaling to control the parameter to indicate whether the UE is prohibited/suspended for LCH transmission. Alternatively, the parameter could be controlled by the UE, e.g. the UE could change value of the parameter when data duplication changes state.

In one embodiment, the logical channel for transmitting original data may be associated with the parameter, and the network may always control the parameter in "not-prohibited" so that the UE serves the logical channel for transmitting original data.

In one embodiment, the logical channel for transmitting original data may not be associated with the parameter. A logical channel not associated with the parameter would mean that the logical channel would not be prohibited from data transmission even if data duplication is in deactivation state.

In one embodiment, the logical channel for transmitting duplicate data may be associated with a parameter that may be controlled by the network in need. More specifically, the logical channel for transmitting original data and the logical channel for transmitting duplicate data may be associated with a common/same radio bearer. When the logical channel for transmitting duplicate data is suspended/prohibited, the radio bearer associated with the logical channel for transmitting the duplicate data may not suspended/prohibited. More specifically, if the radio bearer is suspended/prohibited for transmission, then both the logical channel for transmitting original data and the logical channel for transmitting duplicate data may be suspended/prohibited from data transmission.

In another alternative, the priority of the LCH for duplicate data transmission could be altered and/or prioritized. For example, the priority of the LCH for duplicate data could be prioritized to the same priority of the LCH for transmitting original data.

According to another exemplary method, a network node provides an association of radio resources for a random access preamble transmission and a system information, wherein the radio resources indicates which set of system information is requested. In another exemplary method, a first radio resource for the random access preamble transmission is associated with a first set of system information.

In one alternative, the HARQ entity for duplicate data transmission could be added. A HARQ entity may be added for duplicate data transmission only while data duplication is activated. In another alternative, HARQ process for duplicate data transmission could be added. A HARQ process may be added for duplicate data transmission only while data duplication is activated.

In another alternative, a BSR could be triggered to inform the network of an updated buffer status since the requirement of a UL resource is different from the activation state and the deactivation state. For example, when data duplication is activated, the buffer size for the LCH which is transmitting duplicate data could be increased. More specifically, the updated buffer status could only report the buffer status of the LCH(s) (or LCG(s)) which is/are used for data duplication.

The BSR may take the LCH for transmitting duplicate data into account when data duplication is activated. The BSR may or always take the LCH for transmitting original data into account no matter whether data duplication is activated or deactivated.

In one embodiment, the logical channel for transmitting original data may be associated with a parameter (e.g. the above-mentioned flag), and the network may always control the parameter of the logical channel for transmitting original data in "not-prohibited" so that the UE reports the buffer status of the logical channel for transmitting original data in the BSR.

In one embodiment, the logical channel for transmitting original data may not be associated with a parameter. A logical channel not associated with the parameter would mean that the logical channel would not be prohibited for transmission so that the UE reports the buffer status of that logical channel in the BSR.

In one embodiment, the logical channel for transmitting duplicate data may be associated with a parameter that may be controlled by the network in need. If the parameter of the logical channel for transmitting duplicate data indicates "non-suspended/prohibited," the UE reports the buffer status of the logical channel transmitting the duplicate data in the BSR.

Since additional beam/TRP/cell/gNB is required for transmitting duplicate data, the beam/TRP/cell/gNB has to be activated. (It is assumed that the beam/TRP/cell/gNB for transmitting duplicate data is in a state of deactivation to reduce power consumption). More specifically, the mechanism for activating is like Activation/Deactivation of SCells mechanism in LTE as disclosed in 3GPP TS 36.321 V14.0.0. The benefit of this configuration is that the network does not need to transmit an Activation/Deactivation MAC Control Element. Other benefits include reducing signaling overhead and delay. In this embodiment, the beam/TRP/cell/gNB is used for transmitting duplicate data.

In another aspect, configuration for Random Access (RA) (e.g. dedicated preamble, time/frequency resource(s) for preamble) may be indicated together with an indication of data duplication activation on the same time (e.g., the same TTI) and/or via the same signaling for UE to access the TRP/cell/gNB used to duplicate data transmission. For example, it is assumed that a UE is connecting on a TRP/cell/gNB and performing data transmission. If reliability of data transmission should become enhanced, e.g. for URLLC service or the UE is near cell edge, the UE may be activated for data duplication. Hence, the UE could be indicated of a configuration for RA together with the indication of data duplication activation by the network. As a result, the UE could connect to another TRP/cell/gNB immediately for transmitting duplicate data. This method could reduce signaling overhead and delay compared to transmissions via two indications, i.e., one indication for RA and one indication for activating data duplication.

In one embodiment, the UE may only duplicate all PDCP PDU for a radio bearer if the UE is configured to use data duplication to serve the radio bearer and the UE is in the activation state of data duplication. The UE may be configured to establish a first logical channel and a second logical channel for the radio bearer. Possibly, the first logical channel may be used for transmitting a packet on the radio bearer, and the second logical channel may be used for transmitting duplicate of the packet. Possibly, the first logical channel may be used for transmitting the duplicate of a packet on the radio bearer, and the second logical channel may be used for transmitting the packet. In addition, the UE may be configured with a first communication link and a second communication link for transmission of data duplication. Furthermore, the UE may (be configured to) use the first communication link to serve the first logical channel and (be configured to) use the second communication link to serve the second logical channel. In various embodiments, each communication link may be a component carrier/serving cell/TRP/serving beam/HARQ entity/HARQ process. The UE may establish a first RLC entity used to serve the first logical channel and establish a second RLC entity used to serve the second logical channel. A RRC signaling or a Layer2 signaling may be used to control whether the UE duplicates a PDCP PDU when/after generating the PDCP PDU. The Layer2 signaling may be a PDCP control PDU or a MAC control element.

It is assumed that the UE is in deactivation state in the beginning. When a PDCP layer of the UE receives a packet from an upper layer (e.g., application layer, TCP/IP layer, or the like), the UE may generate a PDCP PDU containing the packet and deliver the PDCP PDU into the first RLC entity (and not deliver the PDCP PDU into the second RLC entity due to the deactivation state). The PDCP layer may start a discardTimer associated with the packet. When the discardTimer expires, the PDCP layer may indicate to the first RLC entity to discard the PDCP PDU containing the packet and/or any RLC PDU containing the PDCP PDU. In the deactivation state, the gNB may or may not schedule the UE to use the second communication link for transmission. As a result, resource efficiency could be achieved because the resources would not be used for serving an empty, second logical channel.

The gNB may also transmit the Layer2 signaling used to switch from deactivation state to activation state to the UE. In the activation state, the UE may consider to duplicate a PDCP PDU when/after generating the PDCP PDU and deliver the PDCP PDU into the first RLC entity and the second RLC entity. The gNB may schedule the UE to use the second communication link so that the UE would serve the second logical channel for transmission. By this way, resource efficiency would not be critical because the resources are used for transmitting the second logical channel in order to achieve reliability requirement.

When the UE receives the Layer2 signaling for switching to activation state, the UE may perform a re-establishment procedure for the second RLC entity. In the re-establishment procedure for the second RLC entity, the UE may discard all PDCP PDUs (i.e., RLC SDUs, if any) buffered in the second RLC entity. Besides, in the re-establishment procedure for the second RLC entity, the UE may duplicate/copy all PDCP PDUs (i.e. RLC SDUs) buffered in the first RLC entity and deliver the duplicated PDCP PDUs (i.e. RLC SDUs) into the second RLC entity. In the re-establishment procedure for the second RLC entity, after discarding the PDCP PDUs (i.e.

RLC SDUs) buffered in the second RLC entity, the PDCP PDUs (i.e. RLC SDUs) may be duplicated from the first RLC entity to the second RLC entity.

When receiving the Layer2 signaling to switch to an activation state, the UE does not perform a re-establishment procedure for the first RLC entity. That is, the UE does not discard all PDCP PDUs (i.e., RLC SDUs) buffered in the first RLC entity.

In case the gNB needs to switch from an activation state to a deactivation state, the gNB may transmit the Layer2 signaling to the UE, in which the Layer 2 signaling is used to switch from the activation state to the deactivation state. In the deactivation state, the UE may stop to duplicate a PDCP PDU when/after generating the PDCP PDU and deliver the copied PDCP PDU into the second RLC entity. In the deactivation state, the gNB may not schedule the UE to use the second communication link so that the UE would not serve the second logical channel for transmission. Alternatively, in the deactivation state, the gNB may schedule the UE to use the second communication link, but the UE would not serve the second logical channel for transmission because the second logical channel may not have data available for transmission.

When receiving the Layer2 signaling to switch to a deactivation state, the UE may perform a re-establishment procedure for the second RLC entity. In the re-establishment procedure for the second RLC entity, the UE may discard all PDCP PDUs (i.e., RLC SDUs) buffered in the second RLC entity.

When receiving the Layer2 signaling to switch to a deactivation state, the UE does not perform re-establishment procedure for the first RLC entity. That is, the UE does not discard all PDCP PDUs (i.e., RLC SDUs) buffered in the first RLC entity.

Data duplication may be achieved reusing the PDCP split bearer architecture in LTE, so PDCP entity would duplicate data and deliver the same PDCP PDUs via split bearer. As mentioned above, the activation/deactivation of data duplication is beneficial. According to one method, the PDCP layer could be activated/deactivated by means of a PDCP control command, (e.g., Activation/Deactivation could be indicated via PDCP control PDU). For example, as shown in FIG. 20, a new PDU type could be added for Data Duplication Activation/Deactivation. When a PDCP entity receives a PDCP control PDU that includes the PDU type for Data Duplication Activation/Deactivation, the PDCP entity has to enable/disable relevant functions (e.g., data may or may not be duplicated and/or transmitted via split bearer). In addition, data duplication-associated timers (e.g., discardTimer) and/or parameters could be reset or set by the indication(s) of the PDCP control command (e.g., PDCP control PDU).

On the other hand, when data duplication is in a deactivation state, the UE may only transmit the original data. In case that data duplication is needed, the network may transmit a PDCP control PDU to indicate to the UE to activate data duplication. In this scenario, the network could transmit the PDCP control PDU via different communication links to increase reliability. That is, the PDCP control PDU could also be duplicated in case of data duplication is switched from the deactivation state to the activation state. If the UE receives two PDCP control PDUs, the UE could activate data duplication and may ignore or discard the duplicated PDCP control PDU.

FIG. 21 illustrates one example of a PDCP control PDU for data duplication. The PDCP control PDU for data duplication could contain an indication about data/control PDU, an indication about PDU type (for Data Duplication Activation/Deactivation), an indication for Activation or Deactivation, and/or other information related to data duplication. In this example, "activate/deactivate" means enable/disable and "A/D" shown in FIG. 21 means Activation/Deactivation.

For each packet received from the upper layer (e.g., application layer, TCP/IP layer, or the like), the PDCP layer may generate a PDCP PDU containing a packet that may be delivered to the PDCP PDU into a RLC entity, in which the PDCP PDU is used for transmitting the original data of the packet. Also, the PDCP layer may deliver the PDCP PDU containing the packet into a RLC entity used for transmitting duplicate data of the packet when data duplication is in activation state. The PDCP layer may not deliver the PDCP PDU containing the packet into the RLC entity used for transmitting duplicate data of the packet when data duplication is in an deactivation state.

Figure 23:
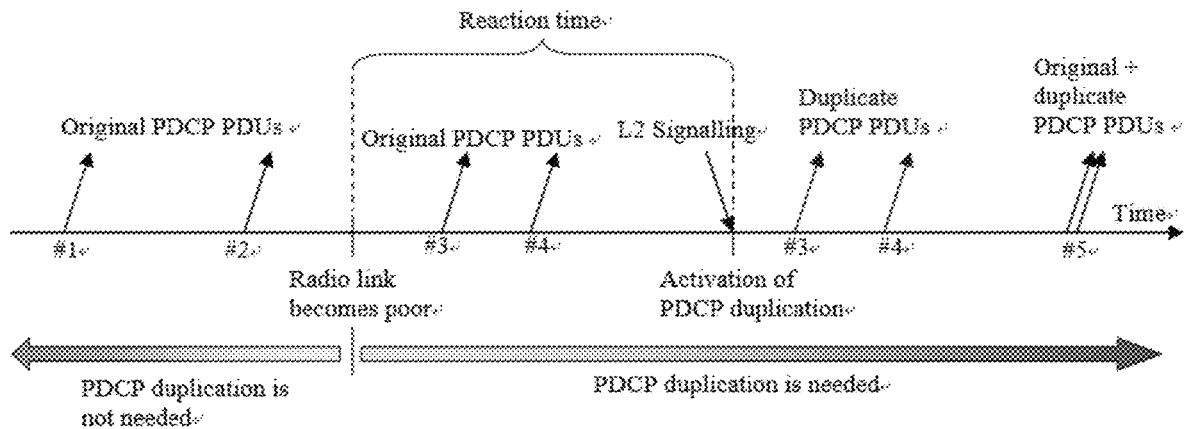
FIG. 23 illustrates a timeline of activation of PDCP duplication.

As shown in FIG. 23, during the deactivation of the UL PDCP duplication, the PDCP PDUs may be transmitted on a single carrier with good radio quality. When the network detects that the radio link is becoming poor (e.g., poor based on a measurement report), the network will indicate to the UE to activate UL PDCP duplication. It is not possible that UL PDCP duplication will be activated immediately when radio quality becomes poor. That is, there is a reaction time between detection of radio quality and activation of UL PDCP duplication. During the reaction time, the UE may have generated and transmitted several PDCP PDUs with lower reliability.

Figure 24:
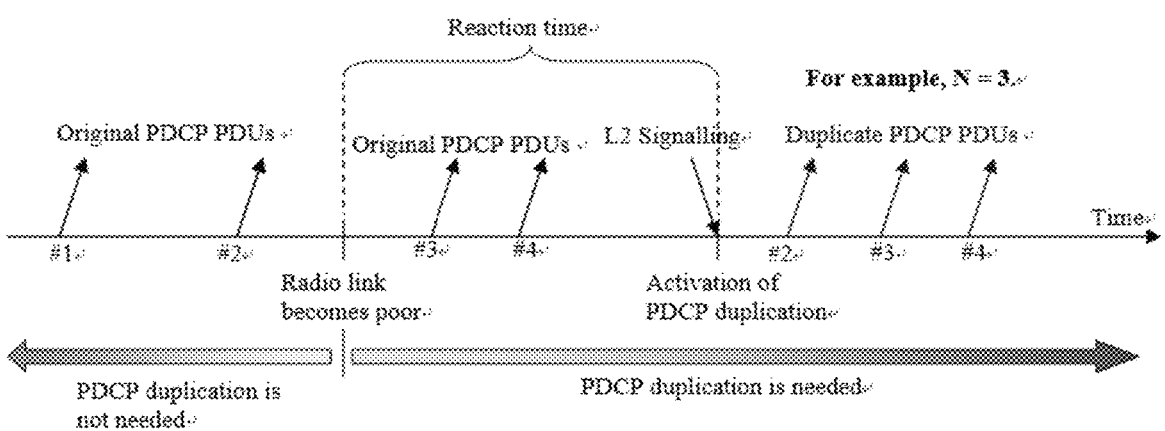
FIG. 24 is a reproduction of Proposal 2 from 3GPP R2-1702642.

According to 3GPP R2-1702642, activation of UL PDCP duplication was also discussed. It was proposed that the activation of duplication applies to new PDCP PDUs and last N transmitted PDCP PDUs for UM (Unacknowledged) mode. The concept of the Proposal 2 in 3GPP R2-1702642 is illustrated in FIG. 24. In the FIG. 24, it is assumed that N is set to three so that activation of UL PDCP duplication applies to last three transmitted PDCP PDUs. In this case, it is not necessary to duplicate and retransmit the PDCP PDU#2.

Compared with 3GPP R2-1702642, it seems better to duplicate and retransmit those PDCP PDUs transmitted within such reaction time in order to provide reliability for the transmission of those PDCP PDUs.

In one embodiment, UL PDCP duplication should be applied to the PDCP PDUs transmitted within a period before activation of UL PDCP duplication.

In one embodiment, the period for applying UL PDCP duplication before the activation of UL PDCP duplication can be configured by the gNB or the UE.

On the other hand, when the network detects the radio link becomes good, it will indicate to the UE to deactivate the PDCP duplication. It may not possible that UL PDCP duplication is deactivated immediately when the radio quality becomes good, i.e., there is a reaction time between the detection of the radio quality and the deactivation of PDCP duplication. During the reaction time, the UE may have generated several duplicate PDCP PDUs that are waiting for transmission. However, these duplicate PDCP PDUs would be a waste of resources if transmitted.

In order to avoid unnecessary transmission of duplicate PDCP PDUs, the UE should perform a re-establishment procedure on the RLC entity associated with a leg transmitting duplicate PDCP PDUs to discard those pending duplicate PDCP PDUs.

In one embodiment, deactivation of the UL PDCP duplication should trigger a RLC re-establishment procedure on the RLC entity associated with a leg transmitting duplicate PDCP PDUs.

Possibly, a buffer used to store PDCP PDUs in the PDCP layer may be considered. The PDCP PDUs stored in the buffer could be delivered into a RLC entity (e.g., RLC#1) used for serving a logical channel for transmitting the original data and/or a RLC entity (e.g. RLC#2) used for serving a logical channel for transmitting the duplicate data. Each PDCP PDU may be stored in the buffer for a duration or a period. The duration or the period could be configured/controlled by the gNB or preconfigured in the UE. At the end of the duration or the period, the UE may remove certain or all of the PDCP PDUs from the buffer so that these removed PDCP PDUs will not be delivered into RLC#1 and/or RLC#2.

In one embodiment, the duration or the period could be set or configured to zero. In this case, the UE could consider the data duplication is deactivated. On the other hand, if the duration or the period is not set or configured to zero, the UE could consider the data duplication is activated.

In one embodiment, the UE may start a timer to control the duration or the period. When the timer expires, the UE may remove all PDCP PDU stored in the buffer (i.e., clear the buffer). When the UE is indicated to activate data duplication, the UE may deliver any PDCP PDU stored in the buffer into the RLC#1 and/or the RLC#2. The UE may clear the buffer after it has delivered all PDCP PDUs stored in the buffer into the RLC#1 and/or the RLC#2. After clearing the buffer, the UE may restart the timer.

In one embodiment, each PDCP PDU (to be) stored in the buffer could run a timer. That is, the UE associates each PDCP PDU with a timer and runs each timer independently. When a timer associated with a PDCP PDU stored in the buffer expires, the UE may remove the PDCP PDU from the buffer. When the UE is indicated to activate data duplication, the UE may deliver any PDCP PDU stored in the buffer into the RLC#1 and/or the RLC#2. The UE may clear the buffer after it has delivered all PDCP PDUs stored in the buffer into the RLC#1 and/or the RLC#2.

In one embodiment, each PDCP PDU (to be) stored in the buffer could run a timer. That is, the UE associates each PDCP PDU with a timer and runs each timer independently. When a timer associated with a PDCP PDU stored in the buffer expires, the UE may remove the PDCP PDU from the buffer. When the UE is indicated with an expected period, the UE may deliver any PDCP PDU stored in the buffer into the RLC#1 and/or the RLC#2 if a timer associated with the any PDCP PDU is running and the timer has run a duration which is shorter than or equal to the expected period. The UE may clear the buffer after it has delivered all or certain PDCP PDUs, which satisfy the delivery criteria, stored in the buffer into the RLC#1 and/or the RLC#2.

In one embodiment, the gNB may send a control command to indicate the UE with the expected period. The control command could be a RRC signaling, a PDCP control PDU, a RLC signaling, a MAC control element, or a physical signaling. The control command could be used to deactivate data duplication.

In one embodiment, the timer used to determine the duration or the period may be a discardTimer.

Each RLC entity may be associated with a logical channel. For data duplication, there is a RLC entity (e.g. RLC#1) used for serving a logical channel for transmitting original data and a RLC entity (e.g. RLC#2) used for serving a logical channel for transmitting duplicate data. The logical channel for transmitting original data and the logical channel for transmitting duplicate data may be associated with a common/same radio bearer. The RLC#1 may be an UM RLC entity or an AM (Acknowledged) RLC entity. The RLC#2 may be an UM RLC entity or an AM RLC entity.

For example, there are three PDCP PDUs available for transmission: PDCP PDU#1, PDCP PDU#2, and PDCP PDU#3.

The UE may deliver these PDCP PDUs into RLC#1 and RCL#2 for transmission if data duplication is activated. The UE may deliver these PDCP PDUs into RLC#1 for transmission if data duplication is deactivated. The UE may be indicated to activate or deactivate data duplication via a RRC signaling, a PDCP signaling, a RLC signaling, a MAC control element, or a physical signaling.

Figure 22:
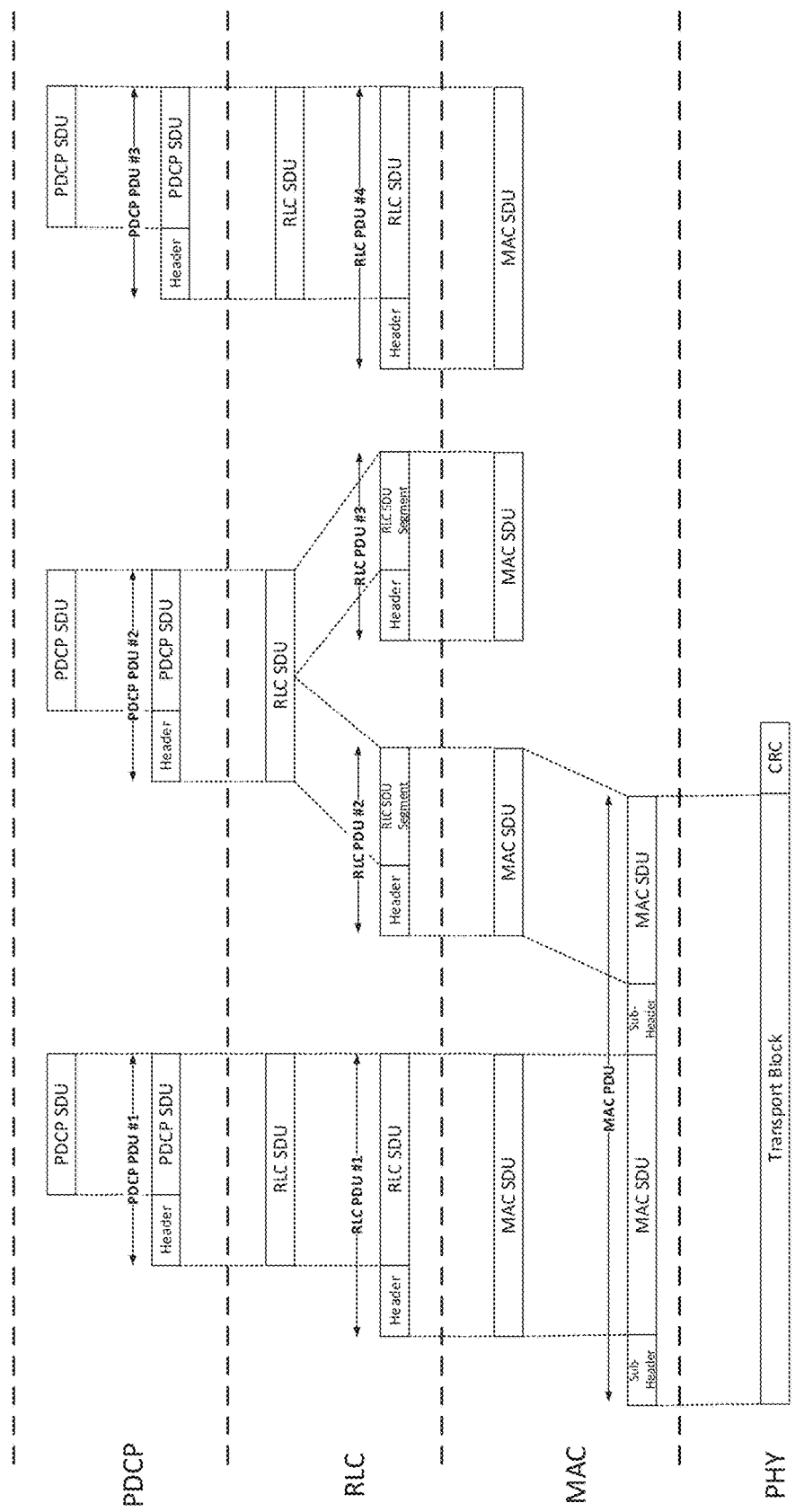
FIG. 22 illustrates an exemplary embodiment of a data flow.

The UE may generate several RLC PDUs for transmission of these PDCP PDUs. Potential cases of these RLC PDUs could be (i) RLC PDU#1 containing PDCP PDU#1, (ii) RLC PDU#2 containing a (first) segment of PDCP PDU#2, (iii) RLC PDU#3 containing remaining PDCP PDU#2, and (iv) RLC PDU#4 containing PDCP PDU#3. The above data flow is illustrated in FIG. 22.

Case 1: Deactivating Data Duplication and Discarding RLC PDU in RLC#2

In one embodiment, the UE may be indicated to deactivate data duplication before receiving a UL resource.

In one embodiment, the UE may discard a RLC PDU containing a complete PDCP PDU (e.g., RLC PDU#1, RLC PDU#4) if it is indicated to deactivate data duplication before receiving the UL resource. In this embodiment, the RLC PDU#1 (and RLC PDU#4) will be discarded in order to save resource because data duplication is not needed.

In one embodiment, the UE may not discard a RLC PDU containing a segment PDCP PDU which is not a first segment PDCP PDU (e.g., RLC PDU#3) if it is indicated to deactivate data duplication before receiving the UL resource. In this case, the RLC PDU#3 should not be discarded in order for the transmission of a complete PDCP PDU although data duplication is not needed.

Possibly, the UE may be indicated to deactivate data duplication while receiving a UL resource for serving the logical channel of the duplicate data. Based on the UL resource, the UE processes a transport block (TB) for the transmission of RLC PDU(s). An example is given that the TB is able to include the RLC PDU#1 and RLC PDU#2.

In one embodiment, the UE may not discard a RLC PDU containing a complete PDCP PDU (e.g. RLC PDU#1) if it is indicated to deactivate data duplication after receiving the UL resource (and before transmitting the TB). In this embodiment, the RLC PDU#1 may not be discarded because the resource has been allocated for the UE, and the UE will perform the transmission based on the resource. From a resource efficiency point of view, transmitting the RLC PDU#1 in the TB is meaningful as compared to transmitting padding in the TB.

In one embodiment, the UE may not discard a RLC PDU containing a segment PDCP PDU which is a first segment PDCP PDU (e.g. RLC PDU#2) if it is indicated to deactivate data duplication after receiving the UL resource (and before transmitting the TB). In this case, the RLC PDU#2 may not be discarded.

In one embodiment, the UE may not discard a RLC PDU containing a segment PDCP PDU which is not a first segment PDCP PDU (e.g. RLC PDU#3) if it is indicated to deactivate data duplication after receiving the UL resource (and before transmitting the TB). In this embodiment, the RLC PDU#3 should not be discarded in order for the transmission of a complete PDCP PDU.

In one embodiment, the UE may discard a RLC PDU containing a complete PDCP PDU (e.g. RLC PDU#4) which cannot be included in the TB if it is indicated to deactivate data duplication after receiving the UL resource (and before transmitting the TB). In this embodiment, the RLC PDU#4 may be discarded because data duplication is not needed.

The above-disclosed embodiments are summarized in the table shown in FIG. 25.

In one embodiment, upon an indication to deactivate data duplication, the UE may initiate a re-establishment procedure on the RLC#2. During the re-establishment procedure on the RLC#2, the UE may discard any RLC PDU (no matter containing a complete PDCP PDU or a partial PDCP PDU) buffered in the RLC#2.

In one embodiment, upon an indication to deactivate data duplication, the UE may discard any RLC PDU (no matter containing a complete PDCP PDU or a partial PDCP PDU) buffered in the RLC#2.

In one embodiment, upon an indication to deactivate data duplication, the UE may stop and/or reset a timer used by the (transmitting side of) the RLC#2 in order to retransmit a poll.

In one embodiment, upon an indication to deactivate data duplication, the UE may stop and/or reset a timer used by the (receiving side of) the RLC#2 in order to detect the loss of the RLC PDUs at a lower layer.

In one embodiment, upon an indication to deactivate data duplication, the UE may stop and/or reset a timer used by the (receiving side of) the RLC#2 in order to prohibit the transmission of a STATUS PDU.

In one embodiment, upon an indication to deactivate data duplication, the UE may reset any state variable used in the RLC#2 in order to specify the RLC protocol to their initial values.

In one embodiment, upon an indication to deactivate data duplication, the UE may initiate a re-establishment procedure on the RLC#2. During the re-establishment procedure on the RLC#2, the UE may discard each PDCP PDU (i.e., RLC SDU) if no segment of the RLC SDU has been mapped to a RLC PDU.

Case 2: Activating Data Duplication and Duplicating RLC SDU from RLC#1

In one embodiment, the UE may be indicated to activate data duplication before receiving a UL resource.

In one embodiment, the UE may duplicate a complete RLC SDU (i.e., a complete PDCP PDU) of a RLC PDU (e.g. RLC PDU#1, RLC PDU#4) if it is indicated to activate data duplication before receiving the UL resource. In this embodiment, the RLC SDU of the RLC PDU#1 (and/or the RLC SDU of the RLC PDU#4) may be duplicated from RLC#1 and delivered into RLC#2. The UE may generate a new RLC PDU containing a new header for RLC#2 and the RLC SDU duplicated from the RLC#1.

In one embodiment, the UE may duplicate a segment RLC SDU (which is not a first segment RLC SDU) of a RLC PDU (e.g. RLC PDU#3) if (the first segment RLC SDU had been duplicated before and) it is indicated to activate data duplication before receiving the UL resource. In this case, the RLC SDU of the RLC PDU#3 may be duplicated from RLC#1 and delivered into RLC#2. The UE may generate a new RLC PDU containing a new header for RLC#2 and the RLC SDU duplicated from the RLC#1.

In one embodiment, the UE may not duplicate a segment RLC SDU (which is not a first segment RLC SDU) of a RLC PDU (e.g. RLC PDU#3) if (the first segment RLC SDU had not been duplicated yet and) it is indicated to activate data duplication before receiving the UL resource. In this embodiment, the RLC SDU of the RLC PDU#3 may not be duplicated from RLC#1 and delivered into RLC#2.

In one embodiment, the UE may be indicated to activate data duplication while receiving a UL resource for serving the logical channel of duplicate data. Based on the UL resource, the UE processes a transport block (TB) for transmission of RLC PDU(s). For example, the TB is able to include the RLC PDU#1 and RLC PDU#2.

In one embodiment, the UE may duplicate a complete RLC SDU (i.e., a complete PDCP PDU) of a RLC PDU (e.g., RLC PDU#1) if it is indicated to activate data duplication after receiving the UL resource (and before transmitting the TB). In this embodiment, the RLC SDU of RLC PDU#1 may be duplicated from RLC#1 and delivered into RLC#2. The UE may generate a new RLC PDU containing a new header for RLC#2, and the RLC SDU duplicated from the RLC#1.

In one embodiment, the UE may duplicate a segment RLC SDU (which is a first segment RLC SDU) of a RLC PDU (e.g. RLC PDU#2) if it is indicated to activate data duplication after receiving the UL resource (and before transmitting the TB). In this case, the RLC SDU of the RLC PDU#2 may be duplicated from RLC#1 and delivered into RLC#2. The UE may generate a new RLC PDU containing a new header for RLC#2 and the RLC SDU duplicated from the RLC#1.

In one embodiment, the UE may duplicate a segment RLC SDU (which is not a first segment RLC SDU) of a RLC PDU (e.g., RLC PDU#3) if (the first segment RLC SDU had been duplicated before and) it is indicated to activate data duplication after receiving the UL resource (and before transmitting the TB). In this embodiment, the RLC SDU of the RLC PDU#3 may be duplicated from RLC#1 and delivered into RLC#2. The UE may generate a new RLC PDU containing a new header for RLC#2, and the RLC SDU duplicated from the RLC#1.

In one embodiment, the UE may not duplicate a segment RLC SDU (which is not a first segment RLC SDU) of a RLC PDU (e.g. RLC PDU#3) if (the first segment RLC SDU had not been duplicated yet and) it is indicated to activate data duplication after receiving the UL resource (and before transmitting the TB). In this embodiment, the RLC SDU of the RLC PDU#3 may not be duplicated from RLC#1 and delivered into RLC#2.

In one embodiment, the UE may duplicate a complete RLC SDU of a RLC PDU (e.g., RLC PDU#4) which cannot be included in the TB if it is indicated to activate data duplication after receiving the UL resource (and before transmitting the TB). In this embodiment, the RLC SDU of the RLC PDU#4 may be duplicated from RLC#1 and delivered into RLC#2. The UE may generate a new RLC PDU containing a new header for RLC#2 and the RLC SDU duplicated from the RLC#1.

The above-disclosed embodiments may be summarized in the table shown in FIG. 26.

In one embodiment, upon indication to activate data duplication, the UE may first initiate a re-establishment procedure on the RLC#2, perform duplication of RLC SDU from the RLC#1, and deliver the duplication of RLC SDU to the RLC#2.

Case 3: Activating Data Duplication and Duplicating RLC PDU from RLC#1

In one embodiment, the UE may be indicated to activate data duplication before receiving a UL resource.

In one embodiment, the UE may duplicate a RLC PDU (e.g., RLC PDU#1, RLC PDU#4) containing a complete RLC SDU if it is indicated to activate data duplication before receiving the UL resource. In this embodiment, the RLC PDU#1 (and/or the RLC PDU#4) may be duplicated from RLC#1 and delivered into RLC#2.

In one embodiment, the UE may duplicate a RLC PDU (e.g., RLC PDU#3) containing a segment RLC SDU (which is not a first segment RLC SDU) if (a RLC PDU containing the first segment RLC SDU had been duplicated before and) it is indicated to activate data duplication before receiving the UL resource. In this embodiment, the RLC PDU#3 may be duplicated from RLC#1 and delivered into RLC#2.

In one embodiment, the UE may not duplicate a RLC PDU (e.g., RLC PDU#3) containing a segment RLC SDU (which is not a first segment RLC SDU) if (a RLC PDU containing the first segment RLC SDU had not been duplicated yet and) it is indicated to activate data duplication before receiving the UL resource. In this embodiment, the RLC PDU#3 may not be duplicated from RLC#1 and delivered into RLC#2.

Possibly, the UE may be indicated to activate data duplication while receiving a UL resource for serving the logical channel of duplicate data. Based on the UL resource, the UE processes a transport block (TB) for transmission of RLC PDU(s). In one example, the TB is able to include the RLC PDU#1 and RLC PDU#2.

In one embodiment, the UE may duplicate a RLC PDU (e.g. RLC PDU#1) containing a complete RLC SDU if it is indicated to activate data duplication after receiving the UL resource (and before transmitting the TB). In this embodiment, the RLC PDU#1 may be duplicated from RLC#1 and delivered into RLC#2.

In one embodiment, the UE may duplicate a RLC PDU (e.g. RLC PDU#2) containing a segment RLC SDU (which is a first segment RLC SDU) if it is indicated to activate data duplication after receiving the UL resource (and before transmitting the TB). In this embodiment, the RLC PDU#2 may be duplicated from RLC#1 and delivered into RLC#2.

In one embodiment, the UE may duplicate a RLC PDU (e.g., RLC PDU#3) containing a segment RLC SDU (which is not a first segment RLC SDU) if (a RLC PDU containing the first segment RLC SDU had been duplicated before and) it is indicated to activate data duplication after receiving the UL resource (and before transmitting the TB). In this embodiment, the RLC PDU#3 may be duplicated from RLC#1 and delivered into RLC#2.

In one embodiment, the UE may not duplicate a RLC PDU (e.g. RLC PDU#3) containing a segment RLC SDU (which is not a first segment RLC SDU) if (a RLC PDU containing the first segment RLC SDU had not been duplicated yet and) it is indicated to activate data duplication after receiving the UL resource (and before transmitting the TB). In this embodiment, the RLC PDU#3 may not be duplicated from RLC#1 and delivered into RLC#2.

In one embodiment, the UE may duplicate a RLC PDU containing a complete RLC SDU (e.g. RLC PDU#4) which cannot be included in the TB if it is indicated to activate data duplication after receiving the UL resource (and before transmitting the TB). In this embodiment, the RLC PDU#4 may be duplicated from RLC#1 and delivered into RLC#2.

The above-disclosed embodiments are summarized in the table shown in FIG. 27.

In one embodiment, upon indicated to activate data duplication, the UE may first initiate re-establishment on the RLC#2 and then perform duplication of RLC PDU from the RLC#1 and deliver the duplication of RLC PDU to the RLC#2.

In one embodiment, the UE does not change/modify the Sequence Number (SN) of a RLC PDU, which is duplicated from the RLC#1, in the RLC#2.

In one embodiment, the UE may set a state variable (e.g. VT(US) or VT(S) as defined in 3GPP TS 36.22 V13.1.0) which holds the value of the SN to be assigned for the next newly generated RLC PDU in the RLC#2 based on the SN of a RLC PDU which is duplicated from the RLC#1. For example, the UE may set the state variable to the SN of the RLC PDU which is last one duplicated from the RLC#1 (and increment the state variable by one).

In one embodiment, the UE may set a state variable (e.g. VT(US) or VT(S) as defined in 3GPP TS 36.22 V13.1.0) which holds the value of the SN to be assigned for the next newly generated RLC PDU in the RLC#2 based on a control information received from the gNB. The control information is used to update/modify the state variable in the UE. The control information may be transmitted via RRC signaling, PDCP signaling, RLC signaling, MAC control element, or physical signaling.

Case 4: Activating Data Duplication and Piggybacking RLC PDU from RLC#1

In one embodiment, the UE may be indicated to activate data duplication before receiving a UL resource.

In one embodiment, (the RLC#2 of) the UE may not generate any special RLC PDU to piggyback any RLC PDU buffered in the RLC#1 if it is indicated to activate data duplication before receiving the UL resource.

Possibly, the UE may be indicated to activate data duplication while receiving a UL resource for serving the logical channel of duplicate data. Based on the UL resource, the UE processes a transport block (TB) for transmission of RLC PDU(s). For example, the TB is able to include the RLC PDU#1 and RLC PDU#2.

In one embodiment, (the RLC#2 of) the UE may generate a special RLC PDU to piggyback a RLC PDU (e.g. RLC PDU#1) containing a complete RLC SDU if it is indicated to activate data duplication after receiving the UL resource (and before transmitting the TB). The RLC PDU#1 may be contained in the special RLC PDU which will be delivered into RLC#2. In this embodiment, the header of the special RLC PDU may indicate the piggybacked RLC PDU#1. The UE may transmit the special RLC PDU to the gNB. The receiving side of the RLC#2 (e.g., in the gNB) may deliver the RLC PDU#1 piggybacked in the special RLC PDU into the receiving side of the RLC#1 (in the gNB).

In one embodiment, (the RLC#2 of) the UE may generate a special RLC PDU to piggyback a RLC PDU (e.g. RLC PDU#2) containing a segment RLC SDU (which is a first segment RLC SDU) if it is indicated to activate data duplication after receiving the UL resource (and before transmitting the TB). The RLC PDU#2 may be contained in the special RLC PDU which will be delivered into RLC#2. In this embodiment, the header of the special RLC PDU may indicate the piggybacked RLC PDU#2. The UE may transmit the special RLC PDU to the gNB. The receiving side of the RLC#2 (e.g. in the gNB) may deliver the RLC PDU#2 piggybacked in the special RLC PDU into the receiving side of the RLC#1 (in the gNB).

In one embodiment, (the RLC#2 of) the UE may generate a special RLC PDU to piggyback a RLC PDU (e.g. RLC PDU#3) containing a segment RLC SDU (which is not a first segment RLC SDU) if it is indicated to activate data duplication after receiving the UL resource (and before transmitting the TB). The RLC PDU#3 may be contained in the special RLC PDU which will be delivered into RLC#2. In this embodiment, the header of the special RLC PDU may indicate the piggybacked RLC PDU#3. The UE may transmit the special RLC PDU to the gNB. The receiving side of the RLC#2 (e.g., in the gNB) may deliver the RLC PDU#3 piggybacked in the special RLC PDU into the receiving side of the RLC#1 (in the gNB).

In one embodiment, (the RLC#2 of) the UE may not generate a special RLC PDU to piggyback a RLC PDU containing a complete RLC SDU (e.g. RLC PDU#4) which cannot be included in the TB if it is indicated to activate data duplication after receiving the UL resource (and before transmitting the TB).

The above-disclosed embodiments are summarized in the table shown in FIG. 28.

In one embodiment, upon indication to activate data duplication, the UE may first initiate a re-establishment procedure on the RLC#2 and then generate special RLC PDUs which will be buffered in the RLC#2. The special RLC PDUs piggyback RLC PDUs from the RLC#1 (if the RLC PDUs are to be transmitted). A RLC PDU coming from the RLC#1 could be a RLC SDU included in a special RLC PDU. The UE transmits the special RLC PDUs buffered in the RLC#2 to the gNB.

In one embodiment, the UE does not change the SN of a RLC PDU piggybacked in a special RLC PDU. The SN of the special RLC PDU may be different from the SN of the RLC PDU.

In a MAC entity, the upper layers (e.g. PDCP layer or RRC layer) may indicate an activation state or deactivation state for data duplication. Therefore, some mechanisms or procedures may be impacted when data duplication is activated/deactivated. The methods for solving impacts are divided into two cases in the following description, case 1 is for deactivation and case 2 is for activation. Each case contains several bullets related to different mechanisms.

Case 1: When Data Duplication is Deactivated

The UE has to avoid allocating UL resources to the logical channel which is used to transmit duplicate data when data duplication is deactivated. For example, if the LCH for transmitting duplicate data has data available for transmission (e.g., PDCP entity is still duplicating PDCP PDUs and transmitting via both logical channels), one of these logical channels (e.g. for duplicate data transmission) should not be allocated an UL resource.

In a first alternative, there is LCH prohibition and/or suspension. The LCH for duplicate data transmission may be prohibited/suspended when data duplication is deactivated. The LCH may be associated with a parameter (e.g., a flag). RRC signaling (e.g. LogicalChannelConfig) may be configured to determine whether to associate the LCH with the parameter. In addition, the network may use RRC signaling or Layer2 signaling to control the parameter to indicate whether the UE should prohibit/suspend the LCH for transmission. Alternatively, the UE could control the parameter. For example, the UE could change the value of the parameter when the data duplication state changes.

In one embodiment, the logical channel for transmitting original data may be associated with the parameter, and the network may always control the parameter in "not-prohibited" so that the UE serves the logical channel for transmitting the original data.

In one embodiment, the logical channel for transmitting original data may not be associated with the parameter. A logical channel not associated with the parameter means that the logical channel would not be prohibited for a transmission even if data duplication is in the deactivation state.

In one embodiment, the logical channel for transmitting duplicate data may be associated with the parameter, and the parameter may be controlled by the network in need. More specifically, the logical channel for transmitting the original data and the logical channel for transmitting duplicate data may be associated with a common/same radio bearer. When the logical channel for transmitting the duplicate data is suspended/prohibited, the radio bearer associated with the logical channel for transmitting duplicate data may not be suspended/prohibited. If the radio bearer is suspended/prohibited for transmission, then both the logical channel for transmitting original data and the logical channel for transmitting duplicate data may be suspended/prohibited for transmission.

In a second alternative, the priority of the LCH for duplicate data transmission could be deprioritized. If the LCH is deprioritized, the LCH would not be allocated UL resources until the resources still remaining after data of other LCH is exhausted. If the data of other LCHs which are not transmitting duplicate data is exhausted, and the UL resources are still remaining, these resources could be allocated for the LCH which is transmitting duplicate data in order to avoid waste of resources.

In a third alternative, the HARQ buffer for duplicate data could be flushed. If data duplication is deactivated and duplicate data exists in the HARQ buffer, the HARQ buffer could be flushed since the duplicate data does not need to be transmitted/retransmitted.

In a fourth alternative, the HARQ entity for duplicate data transmission could be released. If the HARQ entity is associated with (or configured for) duplicate data transmission, while data duplication is deactivated, the HARQ entity could be released since the HARQ entity may not be needed.

In a fifth alternative, the HARQ process for duplicate data transmission could be released. If the HARQ process is associated with (or configured for) duplicate data transmission, while data duplication is deactivated, the HARQ process could be released since the HARQ process may not be needed.

In another embodiment, a BSR could be triggered to inform the network of an updated buffer status since the requirement of UL resource is different from an activation state and an deactivation state. For example, when data duplication is deactivated, the buffer size for the LCH which is transmitting duplicate data could be decreased or omitted. For example, the updated buffer status may only report the buffer status of the LCH(s) (or LCG(s)) which is/are used for data duplication.

The BSR may not take the LCH for transmitting duplicate data into account when data duplication is deactivated. The BSR may (or always) take the LCH for transmitting original data into account no matter whether data duplication is activated or deactivated.

In one embodiment, the logical channel for transmitting original data may be associated with the parameter (e.g., a flag), and the network may (or always) control the parameter in "not-prohibited" so that the UE reports buffer status of the logical channel transmitting the original data in the BSR.

In one embodiment, the logical channel for transmitting original data may not be associated with the parameter. A logical channel not associated with the parameter means that the logical channel would not be prohibited for transmission even if data duplication is in deactivation state. As a result, the UE reports buffer status of that logical channel in the BSR.

In one embodiment, the logical channel for transiting duplicate data may be associated with the parameter, and the parameter may be controlled by the network in need. If the parameter of the logical channel for transmitting duplicate data indicates suspended/prohibited, the UE does not report buffer status of the logical channel for transmitting duplicate data in the BSR. More specifically, the logical channel for transmitting original data and the logical channel for transmitting duplicate data may be associated with a common/same radio bearer. When the logical channel for transmitting duplicate data is suspended/prohibited, the radio bearer associated with the logical channel for transmitting duplicate data may not suspended/prohibited. If the radio bearer is suspended/prohibited for transmission, then both the logical channel for transmitting original data and the logical channel for transmitting duplicate data may be suspended/prohibited for transmission. In this situation, the UE does not report buffer status of both the logical channel for transmitting original data and the logical channel for transmitting duplicate data in the BSR.

In another alternative, when data duplication is deactivated, the corresponding beam/TRP/cell/gNB (used for duplicate data transmission) could be deactivated for saving power. More specifically, the mechanism for deactivating data duplication is like the Activation/Deactivation of SCells mechanism in LTE. The benefit is that network does not need to transmit Activation/Deactivation MAC Control Element. Other benefits include reducing signaling overhead and delay. In the embodiment, the beam/TRP/cell/gNB is used for transmitting duplicate data.

When data duplication is deactivated, the UE has to clear the configured UL grant immediately since the configured uplink grant would not be utilized. If the configured UL grant is not cleared, the UL resource would be wasted.

Case 2: When Data Duplication is Activated

When data duplication is activated, Logical Channel Prioritization (LCP) has to consider which logical channel is used to transmit duplicate data. In a first alternative, if the LCH for duplicate data transmission is prohibited/suspended, the LCH has to be permitted (i.e. the LCH could not be prohibited). Network could configure UE a parameter (e.g. a flag) to represent the LCH is prohibited or not. For example, the parameter could be indicate with LogicalChannelConfig via RRC signaling. Alternatively, the parameter could be controlled by UE, e.g. the UE could change value of the parameter when data duplication is activated.

The LCH for duplicate data transmission may be prohibited/suspended when data duplication is deactivated. The LCH may be associated with a parameter (e.g. a flag). RRC signaling (e.g. LogicalChannelConfig) may be configured to determine whether to associate the LCH with the parameter. In addition, the network may use RRC signaling or Layer2 signaling to control the parameter to indicate to the UE whether to prohibit/suspend the LCH for transmission. Alternatively, the UE may control parameter. For example, the UE could change the value of the parameter when the data duplication state changes.

In one embodiment, the logical channel for transmitting the original data may be associated with the parameter. The network may control the parameter in "not-prohibited", and the UE serves the logical channel for transmitting the original data.

In one embodiment, the logical channel for transmitting original data may not be associated with the parameter. A logical channel not associated with the parameter means that the logical channel would not be prohibited for transmission even if data duplication is in the deactivation state.

In one embodiment, the logical channel for transmitting duplicate data may be associated with the parameter, and the parameter may be controlled by the network in need. The logical channel for transmitting original data and the logical channel for transmitting duplicate data may be associated with a common/same radio bearer. When the logical channel for transmitting duplicate data is suspended/prohibited, the radio bearer associated with the logical channel for transmitting duplicate data may not be suspended/prohibited. If the radio bearer is suspended/prohibited for transmission, then both the logical channel for transmitting original data and the logical channel for transmitting duplicate data may also be suspended/prohibited for transmission.

In a second alternative, when data duplication is activated, the priority of the LCH for duplicate data transmission could be prioritized. For example, the priority of the LCH for duplicate data could be prioritized to the same priority as the LCH for transmitting original data.

In a third alternative, a HARQ entity may be added for duplicate data transmission only while data duplication is activated.

In a fourth alternative, a HARQ process may be added for duplicate data transmission only while data duplication is activated.

In another alternative, when data duplication is activated, the BSR could be triggered to inform the network of the updated buffer status since requirement of the UL resource is different from an activation state and a deactivation state. For example, when data duplication is activated, the buffer size of the LCH which is transmitting duplicate data could be increased. More specifically, the updated buffer status could only report the buffer status of the LCH(s) (or LCG(s)) which is/are used for data duplication.

The BSR may take the LCH for transmitting duplicate data into account when data duplication is activated. The BSR may (or always) take the LCH for transmitting the original data into account no matter whether data duplication is activated or deactivated.

In one embodiment, the logical channel for transmitting the original data may be associated with the parameter. The network may control the parameter of the logical channel for transmitting the original data in "not-prohibited", and the UE reports buffer status of the logical channel for transmitting the original data in the BSR.

In one embodiment, the logical channel for transmitting original data may not be associated with the parameter. A logical channel not associated with the parameter means that the logical channel would not be prohibited for transmission so that the UE reports the buffer status of that logical channel in the BSR.

In one embodiment, the logical channel for transmitting duplicate data may be associated with the parameter that may be controlled by the network in need. If the parameter of the logical channel for transmitting duplicate data indicates "non-suspended/prohibited," the UE reports the buffer status of the logical channel for transmitting duplicate data in the BSR.

In another alternative, when data duplication is activated, a corresponding beam/TRP/cell/gNB may be activated. Since additional beam/TRP/cell/gNB is required for transmitting duplicate data, the beam/TRP/cell/gNB has to be activated. It is assumed that the beam/TRP/cell/gNB for transmitting duplicate data is in a state of deactivation for reducing power consumption. More specifically, the mechanism for activating is similar to the Activation/Deactivation of SCells mechanism in LTE as disclosed in 3GPP TS 36.321 V14.0.0. The benefit of the similar mechanism is that the network does not need to transmit an Activation/Deactivation MAC Control Element. Other benefits include reducing signaling overhead and delay. In these embodiments, the beam/TRP/cell/gNB is used for transmitting duplicate data.

In another alternative, when data duplication is activated, the configuration for RA (e.g. dedicated preamble, time/frequency resource(s) for preamble) may be indicated together with an indication of data duplication activation on the same time (e.g., the same TTI) and/or via the same signaling for the UE to access the TRP/cell/gNB used to duplicate data transmission. For example, it is assumed that a UE is connecting on a TRP/cell/gNB and performing data transmission. If reliability of data transmission should become enhanced (e.g., for the URLLC service or the UE is near a cell edge), data duplication is activated in a UE. Hence, the UE could be indicated a configuration for the RA together with the indication of data duplication activation by the network. The UE could then connect to another TRP/cell/gNB immediately for transmitting duplicate data. This method could reduce signaling overhead and delay as compared to transmitting two indications, one for RA and one for activating data duplication.

Figure 29:
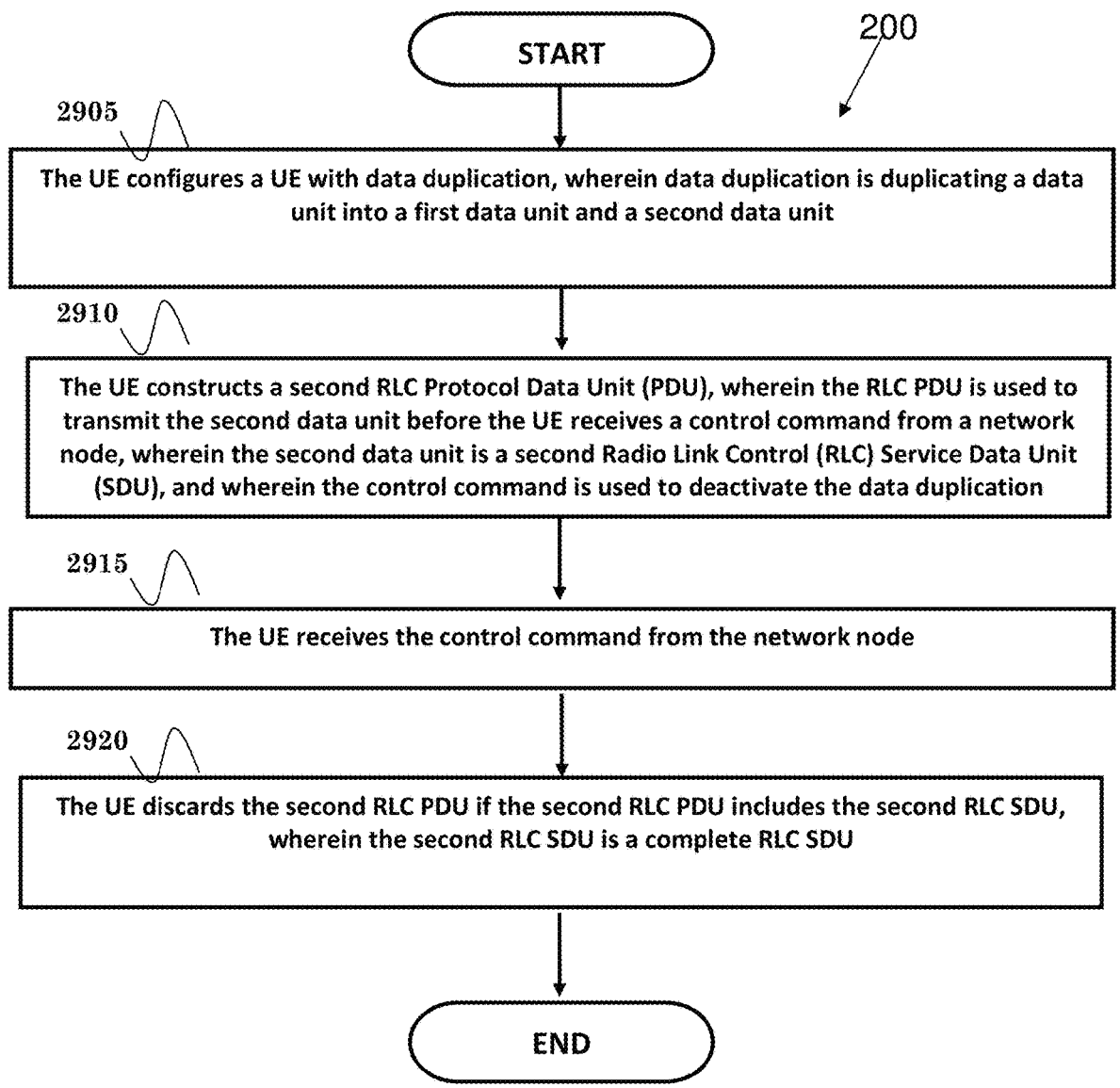
FIG. 29 is a flow diagram for one exemplary embodiment from the perspective of a UE.

FIG. 29 is a flow chart 2900 according to one exemplary embodiment from the perspective of a UE configured with data duplication. In step 2905, the UE duplicates a data unit into a first data unit and a second data unit. In step 2910, the UE constructs a second Radio Link Control (RLC) Protocol Data Unit (PDU) used for transmitting the second data unit, wherein the second data unit is a second RLC Service Data Unit (SDU). In step 2915, the UE receives a control command from a network node, wherein the control command is used to deactivate the data duplication. In step 2920, the UE discards the second RLC PDU if the second RLC PDU includes the second RLC SDU.

In another method, the UE does not discard the second RLC PDU if the second RLC PDU includes (only) a segment of the second RLC SDU. In this method, the segment of the second RLC SDU does not contain the beginning of the second RLC SDU. In this method, the segment of the second RLC SDU does not contain the first byte of the second RLC SDU. In this method, the first byte of the second RLC SDU is not included in the second RLC PDU.

In another method, the UE transmits the second RLC PDU to the network node if the second RLC PDU is not discarded.

In another method, the UE establishes a first logical channel and a second logical channel, in which the first logical channel and the second logical channel are associated with a radio bearer. The UE also establishes a first RLC entity and a second RLC entity, wherein the first RLC entity is associated with the first logical channel and the second RLC entity is associated with the second logical channel. In one method, the first RLC entity is a first Unacknowledged Mode (UM) RLC entity and the second RLC entity is a second UM RLC entity. In this method, the UE uses a first serving cell to serve the first logical channel, and uses a second serving cell to serve the second logical channel.

In another method, the UE constructs a first RLC PDU used for transmitting the first data unit, wherein the first data unit means a first RLC SDU. More specifically, the first data unit is a first RLC SDU. Additionally, the UE transmits the first RLC PDU to the network node. In this method, the first RLC PDU is constructed in a first RLC entity.

In one method, the second RLC PDU is an Unacknowledged Mode Data (UMD) PDU.

In one method, the second RLC PDU is constructed in a second RLC entity.

In one method, the data unit is a Packet Data Convergence Protocol (PDCP) PDU.

In one method, the content of the first data unit is the same as the content of the second data unit.

In one method, the control command is a Medium Access Control (MAC) control element. In another method, the control command is used to switch data duplication from an activated state to a deactivated state.

In one method, the UE does not discard RLC SDU(s) in a first RLC entity when the UE receives the control command from the network node. In an alternate method, the UE discards RLC SDU(s) in a second RLC entity when the UE receives the control command from the network node.

In one method, data duplication is a mechanism that a Packet Data Convergence Protocol (PDCP) entity of the UE duplicates a PDCP PDU into a first PDCP PDU and a second PDCP PDU, delivers the first PDCP PDU to a first RLC entity, and delivers the second PDCP PDU to a second RLC entity.

In another exemplary method, a UE establishes a first logical channel and a second logical channel, wherein the first logical channel and the second logical channel are associated with a radio bearer. The UE establishes a first RLC entity and a second RLC entity, wherein the first RLC entity is associated with the first logical channel and the second RLC entity is associated with the second logical channel. The UE generates a first RLC PDU and stores the first RLC PDU in a buffer of the first RLC entity before receiving a control command, wherein the first RLC PDU includes a first RLC SDU. The UE generates a second RLC PDU and stores the second RLC PDU in a buffer of the second RLC entity before receiving the control command, wherein the second RLC PDU includes a second RLC SDU. The UE receives the control command from a network node, wherein the control command is used to deactivate data duplication. The UE performs a re-establishment on the second RLC entity in response to the control command. The UE transmits the first RLC PDU to a network node.

In another exemplary method, a UE establishes a first logical channel and a second logical channel, wherein the first logical channel and the second logical channel are associated with a radio bearer. The UE also establishes a first RLC entity and a second RLC entity, wherein the first RLC entity is associated with the first logical channel and the second RLC entity is associated with the second logical channel. The UE generates a first RLC PDU and stores the first RLC PDU in a buffer of the first RLC entity before receiving a control command, wherein the first RLC PDU includes a first RLC SDU. The UE generates a second RLC PDU and stores the second RLC PDU in a buffer of the second RLC entity before receiving the control command, wherein the second RLC PDU includes a second RLC SDU. The UE receives the control command from a network node, wherein the control command is used to deactivate data duplication. The UE determines whether to discard the second RLC PDU stored in the buffer of the second RLC entity after receiving the control command based on whether the second RLC SDU is completed or not. The UE transmits the first RLC PDU to a network node.

In another exemplary method, the UE discards the second RLC PDU if the second RLC SDU is a completed RLC SDU. The UE does not discard the second RLC PDU if the second RLC SDU is a segment RLC SDU.

In another exemplary method, a UE establishes a first logical channel and a second logical channel, wherein the first logical channel and the second logical channel are associated with a radio bearer. The UE also establishes a first RLC entity and a second RLC entity, wherein the first RLC entity is associated with the first logical channel and the second RLC entity is associated with the second logical channel. The UE generates a first RLC PDU and stores the first RLC PDU in a buffer of the first RLC entity before receiving a control command, wherein the first RLC PDU includes a first RLC SDU. The UE generates a second RLC PDU and stores the second RLC PDU in a buffer of the second RLC entity before receiving the control command, wherein the second RLC PDU includes a second RLC SDU. The UE receives the control command from a network node, wherein the control command is used to deactivate data duplication. The UE determines whether to discard the second RLC PDU stored in the buffer of the second RLC entity after receiving the control command based on whether the second RLC SDU is to be transmitted. The UE transmits the first RLC PDU to a network node.

In another exemplary method, the UE does not discard the second RLC PDU if the second RLC PDU is to be transmitted based on a UL resource. The UE discards the second RLC PDU if the second RLC PDU is not to be transmitted based on the UL resource.

In one or more of the above-disclosed methods, the UE transmits the second RLC PDU to the network node if the second RLC PDU is not discarded. The UE generates a third RLC PDU and stores the third RLC PDU in the buffer of the first RLC entity after receiving the control command, wherein the third RLC PDU includes a third RLC SDU. The UE does not generate a fourth RLC PDU to be stored in the buffer of the second RLC entity after receiving the control command In one or more of the above-disclosed methods, the UE generates a first packet for transmission before receiving the control command, wherein the first packet is delivered into the first RLC entity and the second RLC entity.

In one or more of the above-disclosed methods, the UE generates a second packet for transmission after receiving the control command, wherein the second packet is delivered into only the first RLC entity.

In one or more of the above-disclosed methods, the first RLC SDU and the second RLC SDU contain the first packet.

In one or more of the above-disclosed methods, the third RLC SDU contains the second packet.

In another exemplary method, a UE establishes a first logical channel and a second logical channel, wherein the first logical channel and the second logical channel are associated with a radio bearer and the second logical channel is in a first state. The UE serves the second logical channel for transmission if the second logical channel is in the first state. The UE receives a control command from a network node, wherein the control command is used to change the second logical channel from the first state to a second state. The UE does not serve the second logical channel for transmission after receiving the control command due to the second state of the second logical channel.

In one or more of the above-disclosed methods, the first state means data duplication is activated, and the second state means data duplication is deactivated.

In one or more of the above-disclosed methods, the second logical channel is not suspended before receiving the control command and the second logical channel is suspended after receiving the control command.

In one or more of the above-disclosed methods, the first logical channel is not suspended after receiving the control command.

In one or more of the above-disclosed methods, the radio bearer is not suspended after receiving the control command.

In one or more of the above-disclosed methods, the UE uses a first communication link to serve the first logical channel, and uses a second communication link to serve the second logical channel.

In one or more of the above-disclosed methods, the first and/or second communication link is a serving cell, a component carrier, a serving beam, a HARQ process or a HARQ entity.

In one or more of the above-disclosed methods, the network node is a base station.

In one or more of the above-disclosed methods, the first, second, or third RLC SDU is a PDCP PDU.

In one or more of the above-disclosed methods, the first and/or second packet is a PDCP PDU.

In one or more of the above-disclosed methods, the control command is a RRC signaling, a PDCP signaling, a RLC signaling, a MAC control element, or a physical signaling.

Referring back to FIGS. 3 and 4, in one embodiment, the device 300 includes a program code 312 stored in memory 310. The CPU 308 could execute program code 312 to enable the UE configured with data duplication to (i) duplicate a data unit into a first data unit and a second data unit; (ii) construct a second Radio Link Control (RLC) Protocol Data Unit (PDU) used for transmitting the second data unit, wherein the second data unit is a second RLC Service Data Unit (SDU); (iii) receive a control command from a network node, wherein the control command is used to deactivate the data duplication; and (iv) discard the second RLC PDU if the second RLC PDU includes the second RLC SDU.

Furthermore, the CPU 308 can execute the program code 312 to perform all of the above-described actions and steps or others methods described herein.

In the various methods and embodiments disclosed herein, the activation or deactivation of data duplication allows for the performance of relevant mechanisms and corresponding reactions to increase the robustness of a wireless system by reducing signaling overhead, power consumption, and transmission delay as well as increasing reliability and resource usage.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a user equipment (UE) configured with data duplication, the method comprising:
   duplicating a data unit into a first data unit and a second data unit;
   constructing a second Radio Link Control (RLC) Protocol Data Unit (PDU) used for transmitting the second data unit, wherein the second data unit is a second RLC Service Data Unit (SDU);
   receiving a control command from a network node, wherein the control command is used to deactivate the data duplication; and
   discarding the second RLC PDU if the UE is indicated to deactivate the data duplication based on the control command and the second RLC PDU includes the second RLC SDU.

2. The method of claim 1, further comprising:
   not discarding the second RLC PDU if the second RLC PDU includes only a segment of the second RLC SDU.

3. The method of claim 1, wherein the second RLC SDU is a complete RLC SDU.

4. The method of claim 2, wherein the segment of the second RLC SDU is not a complete RLC SDU.

5. The method of claim 2, wherein the first byte of the second RLC SDU is not included in the second RLC PDU.

6. The method of claim 1, further comprising:
   establishing a first logical channel and a second logical channel, wherein the first logical channel and the second logical channel are associated with a radio bearer; and
   establishing a first RLC entity and a second RLC entity, wherein the first RLC entity is associated with the first logical channel and the second RLC entity is associated with the second logical channel.

7. The method of claim 6, wherein the first RLC entity is a first Unacknowledged Mode (UM) RLC entity and the second RLC entity is a second UM RLC entity.

8. The method of claim 6, further comprising:
   using a first serving cell to serve the first logical channel; and
   using a second serving cell to serve the second logical channel.

9. The method of claim 1, further comprising:
   constructing a first RLC PDU used for transmitting the first data unit, wherein the first data unit is a first RLC SDU.

10. The method of claim 9, wherein the first RLC PDU is constructed in a first RLC entity.

11. The method of claim 1, wherein the second RLC PDU is an Unacknowledged Mode Data (UMD) PDU.

12. The method of claim 1, wherein the second RLC PDU is constructed in a second RLC entity.

13. The method of claim 1, wherein the data unit is a Packet Data Convergence Protocol (PDCP) PDU.

14. The method of claim 1, wherein the content of the first data unit is the same as the content of the second data unit.

15. The method of claim 1, wherein the control command is a Medium Access Control (MAC) control element.

16. The method of claim 1, wherein the control command is used to switch data duplication from an activated state to a deactivated state.

17. The method of claim 1, further comprising:
not discarding the RLC SDU in a first RLC entity when the UE receives the control command from the network node.

18. The method of claim 1, further comprising:
discarding RLC SDU(s) in a second RLC entity when the UE receives the control command from the network node.

19. The method of claim 1, wherein the data duplication is a mechanism that a Packet Data Convergence Protocol (PDCP) entity of the UE duplicates a PDCP PDU into a first PDCP PDU and a second PDCP PDU, delivers the first PDCP PDU to a first RLC entity, and delivers the second PDCP PDU to a second RLC entity.

20. A UE configured with data duplication comprising:
a control circuit;
a processor installed in the control circuit;
a memory installed in the control circuit and coupled to the processor;
wherein the processor is configured to execute a program code stored in the memory to:
duplicate a data unit into a first data unit and a second data unit;
construct a second Radio Link Control (RLC) Protocol Data Unit (PDU) used for transmitting the second data unit, wherein the second data unit is a second RLC Service Data Unit (SDU);
receive a control command from a network node, wherein the control command is used to deactivate the data duplication; and
discard the second RLC PDU if the UE is indicated to deactivate the data duplication based on the control command and the second RLC PDU includes the second RLC SDU.

* * * * *